US011915265B2

(12) United States Patent
Miller

(10) Patent No.: US 11,915,265 B2
(45) Date of Patent: Feb. 27, 2024

(54) SYSTEM AND METHOD FOR ACCURATE PREDICTIONS USING A PREDICTIVE MODEL

(71) Applicant: RAADZ INC., Louisville, KY (US)

(72) Inventor: Matthew Clark Miller, Louisville, KY (US)

(73) Assignee: RAADZ INC., Louisville, KY (US)

( * ) Notice: Subject to any disclaimer, the term of this patent is extended or adjusted under 35 U.S.C. 154(b) by 0 days.

(21) Appl. No.: 18/305,322

(22) Filed: Apr. 21, 2023

(65) Prior Publication Data

US 2023/0342813 A1    Oct. 26, 2023

Related U.S. Application Data

(63) Continuation-in-part of application No. 17/727,695, filed on Apr. 22, 2022, now Pat. No. 11,669,848.

(51) Int. Cl.
G06Q 30/0251 (2023.01)
G06Q 30/0241 (2023.01)
G06Q 30/0203 (2023.01)
G06Q 10/0637 (2023.01)

(52) U.S. Cl.
CPC ... *G06Q 30/0254* (2013.01); *G06Q 10/06375* (2013.01); *G06Q 30/0203* (2013.01); *G06Q 30/0277* (2013.01)

(58) Field of Classification Search
CPC ......... G06Q 30/0203; G06Q 10/06375; G06Q 30/0254; G06Q 30/0277
USPC ....................................................... 705/7.31
See application file for complete search history.

(56) References Cited

U.S. PATENT DOCUMENTS

| 5,916,024 A | 6/1999 | Von Kohorn |
| 6,529,878 B2 | 3/2003 | De Rafael et al. |
| 8,554,601 B1 | 10/2013 | Marsh |
| 8,639,573 B2 | 1/2014 | Wilen |
| 2002/0120504 A1 | 8/2002 | Gould et al. |

(Continued)

OTHER PUBLICATIONS

"Human Factors in the Design of Longitudinal Smartphone-based Wellness Surveys", Vhaduri et al., 2016 (Year: 2016).*

(Continued)

*Primary Examiner* — Charles Guiliano
*Assistant Examiner* — Po Han Lee
(74) *Attorney, Agent, or Firm* — HOLLOWELL PATENT GROUP; Kelly J. Hollowell

(57) ABSTRACT

Apparatus and methods present a content item and question from an inquirer to a group of users in a first feedback session with a requirement for the users to provide predictions of how a member of a distinct target group will respond to the content item, receiving, during the first feedback session, the first group's prediction of the target group's responses, presenting, during a second feedback session, the same content item and the same question to the target group with a requirement for the target group to provide responses directed to their own responses, constructing a predictive model of the target group based on responses received from the target group during the second feedback session, measuring accuracy of the first group's predictions using the target group predictive model and providing the inquirer access to an ordered visual representation of the first group users arranged as a function of accuracy.

25 Claims, 25 Drawing Sheets

(56) References Cited

U.S. PATENT DOCUMENTS

| | | |
|---|---|---|
| 2005/0075923 A1 | 4/2005 | Kolsky |
| 2006/0224452 A1 | 10/2006 | Ng |
| 2007/0290878 A1 | 12/2007 | Maggio |
| 2008/0021783 A1 | 1/2008 | Verghese |
| 2008/0033790 A1 | 2/2008 | Nickerson |
| 2008/0195460 A1 | 8/2008 | Varghese |
| 2008/0196060 A1 | 8/2008 | Varghese |
| 2010/0022861 A1 | 1/2010 | Cinbis et al. |
| 2010/0131356 A1 | 5/2010 | Stevens |
| 2010/0306028 A1 | 12/2010 | Wagner |
| 2013/0041840 A1 | 2/2013 | Gross |
| 2013/0151332 A1 | 6/2013 | Yan |
| 2014/0257931 A1 | 9/2014 | Rinzler |
| 2014/0304654 A1 | 10/2014 | Gross |
| 2014/0304657 A1 | 10/2014 | Biswas |
| 2015/0213483 A1 | 7/2015 | Mallon |
| 2017/0287348 A1 | 10/2017 | Mosher |
| 2018/0373991 A1 | 12/2018 | Rosenberg |
| 2021/0326674 A1 | 10/2021 | Liu |

OTHER PUBLICATIONS

"Analysis and Accurate Prediction of User's Response Behavior in Incentive-Based Demand Response", Liu et al., Jan. 11, 2019 (Year: 2019).

* cited by examiner

600

Welcome Matt    Balance: 1033.22

Company:    [Raadz Inc.] [Save]
Select Ad Type:    Video    Image    Audio     — 602

Company Name:    Raadz Inc.
Ad Title:    [          ]
More Info Link:    [          ]     — 604
Select Image File:    [Choose File] No file selected Select FOUR (4) Questions for feedback:
☐ How well does the ad explain the product?
☐ How funny will the typical person find this ad?
☐ How emotional will the typical person find this ad?     — 606
☐ How offensive will the typical person find this ad?
☐ How attention-grabbing is this ad for the typical person?
☐ Overall effectiveness of this ad?
☐ Predicted effectiveness of seeing this ad again?
☐ Ability for this ad to go viral?
☐ Chance of increased business because of this ad?

Gender Targeting? ⦿ No
    ○ Male    ○ Female
Age Targeting? ⦿ No
☐ <18  ☐ 18-25  ☐ 26-40  ☐ 41-60  ☐ 61+
Location Targeting?  [No ▾]     — 608
User Interest Targeting? ⦿ No ☐ Music            ☐ Electronics        ☐ Cars         ☐ Movies & TV Shows
☐ Home Improvement ☐ Clothing & Apparel ☐ Books        ☐ Beauty & Personal Care
☐ Video Games      ☐ Pets               ☐ Sports       ☐ Outdoor Activities
☐ Nightlife        ☐ Travel             ☐ Charities    ☐ Restaurants & Food Select number of views:

| 20 | 30 | 50 | 75 | 100 |
|----|----|----|----|-----|
| $0.070 | $0.065 | $0.060 | $0.055 | $0.050 |

— 610

☐ Receive email list of targeted users that opt in. ($0.030 per view)
The list can also be purchased after ad completion for a higher per user price.
Promo Code: [   ] [Apply]
Total Cost: $5.00
[Preview]

1210 located anywhere in the States ⌄
(location)

| ☐ Alabama | ☐ Alaska | ☐ Arizona |
| ☐ Arkansas | ☐ California | ☐ Colorado |
| ☐ Connecticut | ☐ Delaware | ☐ District Of Columbia |
| ☑ Florida | ☐ Georgia | ☐ Hawaii |
| ☐ Idaho | ☑ Illinois | ☑ Indiana |
| ☐ Iowa | ☐ Kansas | ☐ Kentucky |
| ☐ Louisiana | ☐ Maine | ☐ Maryland |
| ☐ Massachusetts | ☐ Michigan | ☐ Minnesota |
| ☐ Mississippi | ☐ Missouri | ☐ Montana |
| ☐ Nebraska | ☐ Nevada | ☐ New Hampshire |

FIG. 12

Summary-2

Respondents by Location 1910

| Location | Respondents | % of All |
|---|---|---|
| *United States | 147 | 99.3% |
| Pennsylvania | 12 | 8.1% |
| New York | 11 | 7.4% |
| Texas | 8 | 5.4% |
| North Carolina | 7 | 4.7% |
| Ohio | 7 | 4.7% |
| Florida | 7 | 4.7% |
| California | 7 | 4.7% |
| Virginia | 7 | 4.7% |
| Kentucky | 6 | 4.1% |
| Georgia | 5 | 3.4% |
| Michigan | 5 | 3.4% |
| Indiana | 5 | 3.4% |
| Missouri | 5 | 3.4% |
| Tennessee | 4 | 2.7% |
| Arkansas | 4 | 2.7% |
| Maryland | 4 | 2.7% |
| Arizona | 4 | 2.7% |
| Washington | 3 | 2% |
| Alabama | 3 | 2% |
| South Carolina | 3 | 2% |
| Oklahoma | 3 | 2% |
| Colorado | 3 | 2% |
| Nevada | 2 | 1.4% |
| North Dakota | 2 | 1.4% |
| New Jersey | 2 | 1.4% |
| Oregon | 2 | 1.4% |
| Illinois | 2 | 1.4% |
| Hawaii | 2 | 1.4% |
| Wisconsin | 2 | 1.4% |
| Minnesota | 2 | 1.4% |
| Nebraska | 1 | 0.7% |
| Utah | 1 | 0.7% |
| Idaho | 1 | 0.7% |
| *Outside of USA | 1 | 0.7% |
| Mississippi | 1 | 0.7% |
| Vermont | 1 | 0.7% |
| Louisiana | 1 | 0.7% |
| Connecticut | 1 | 0.7% |
| Maine | 1 | 0.7% |

Respondents by Interest 1920

| Interest | Respondents | % of All | Interest | Respondents | % of All |
|---|---|---|---|---|---|
| Food & Drink | 103 | 69.6% | Nightlife | 25 | 16.9% |
| Movies | 99 | 66.9% | Dating | 25 | 16.9% |
| Internet | 98 | 66.2% | Fishing | 25 | 16.9% |
| Cooking | 96 | 64.9% | Charity | 21 | 14.2% |
| Music | 95 | 64.2% | Cameras | 21 | 14.2% |
| Restaurants | 89 | 60.1% | Advertising & Marketing | 19 | 12.8% |
| Clothing | 87 | 58.58% | Biking | 14 | 9.5% |
| Games | 80 | 54.1% | Weddings | 12 | 8.1% |
| Pets | 79 | 53.4% | Motorcycles | 9 | 6.1% |
| TV | 79 | 53.4% | Real Estate | 8 | 5.4% |
| Shopping | 78 | 52.7% | Hunting | 5 | 3.4% |
| Electronics | 73 | 49.3% | Boats | 4 | 2.7% |
| Family | 68 | 45.9% | | | |
| Smartphones | 68 | 45.9% | | | |
| Alcoholic Beverages | 67 | 45.3% | | | |
| Health & Wellnes | 62 | 41.9% | | | |
| Beauty | 62 | 41.9% | | | |
| Computers | 61 | 41.2% | | | |
| Video Games | 60 | 40.5% | | | |
| Reading | 58 | 39.2% | | | |
| Fashion | 54 | 36.5% | | | |
| Home & Garden | 54 | 36.5% | | | |
| Travel | 52 | 35.1% | | | |
| Fitness & Exercise | 47 | 31.8% | | | |
| Health Care | 45 | 30.4% | | | |
| Televisions | 40 | 27% | | | |
| Camping | 37 | 25% | | | |
| Politics & Social Issues | 37 | 25% | | | |
| Toys | 36 | 24.3% | | | |
| Live Events | 36 | 24.3% | | | |
| Home Improvement | 35 | 23.6% | | | |
| Sports | 35 | 19.6% | | | |
| Parenting | 29 | 19.6% | | | |
| Science | 29 | 19.6% | | | |
| Education | 29 | 19.6% | | | |
| Entrepreneurship | 29 | 19.6% | | | |
| Car & Trucks | 26 | 17.6% | | | |
| Personal Finance | 25 | 16.9% | | | |

FIG. 19

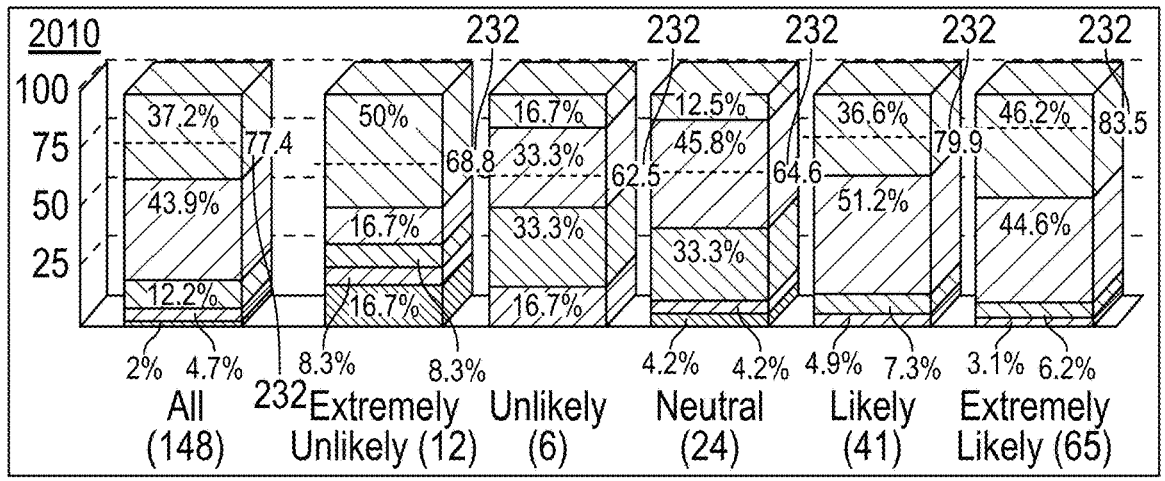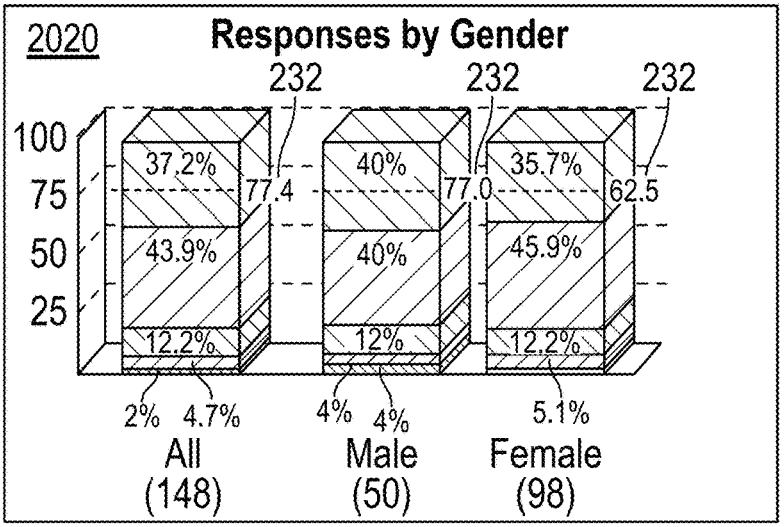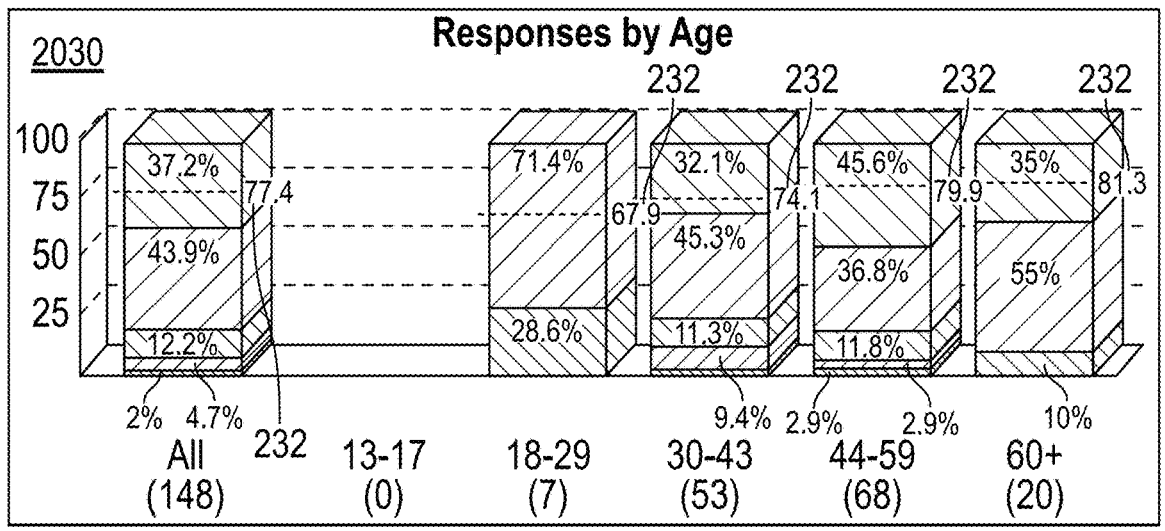
FIG. 20

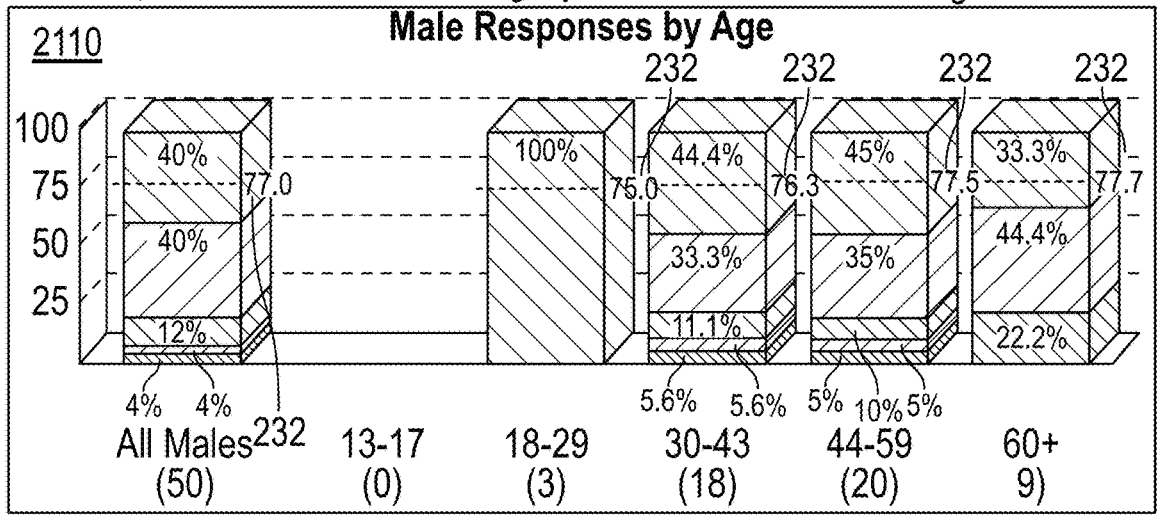
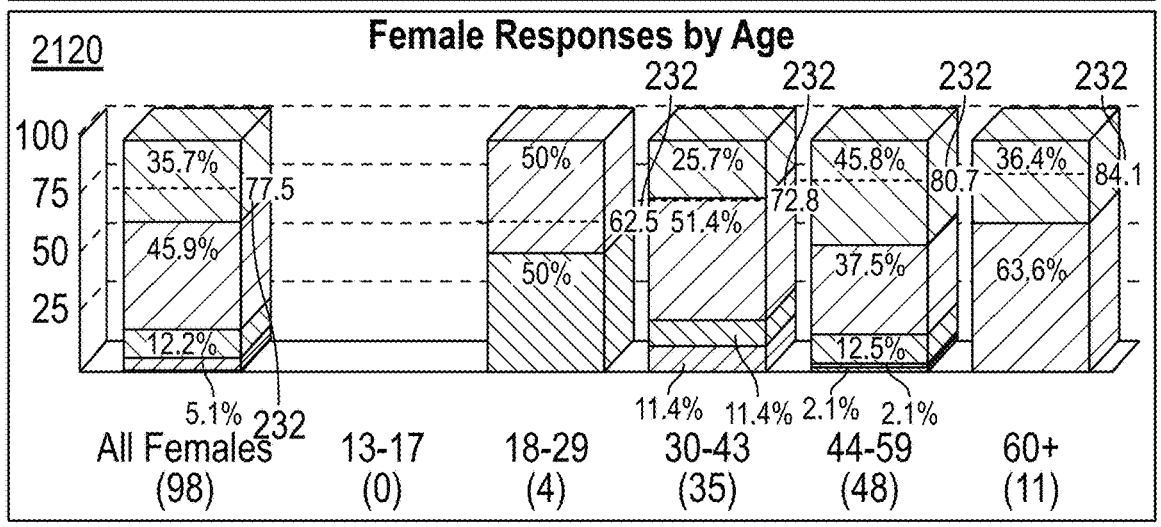
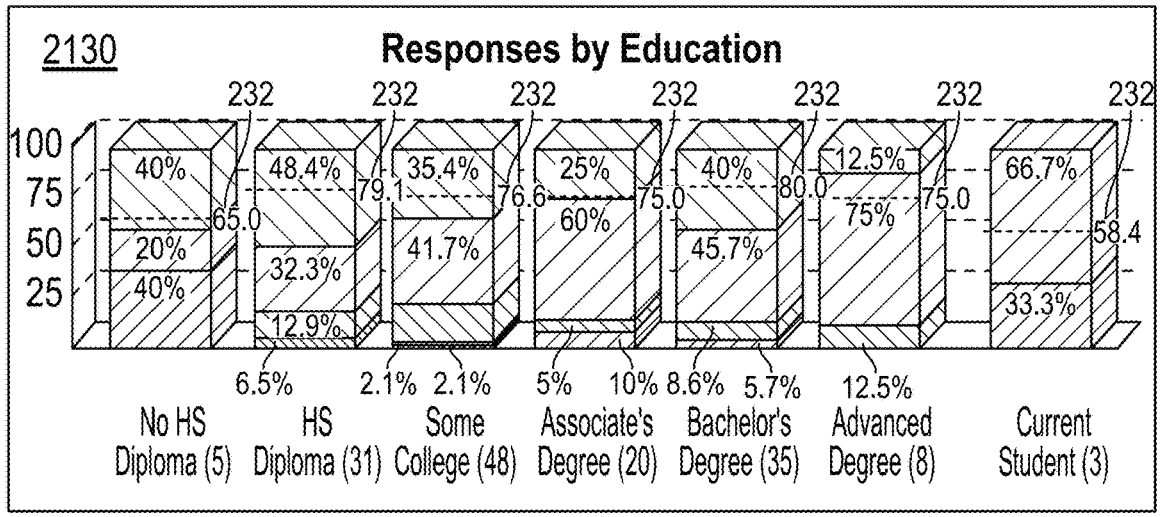
FIG. 21

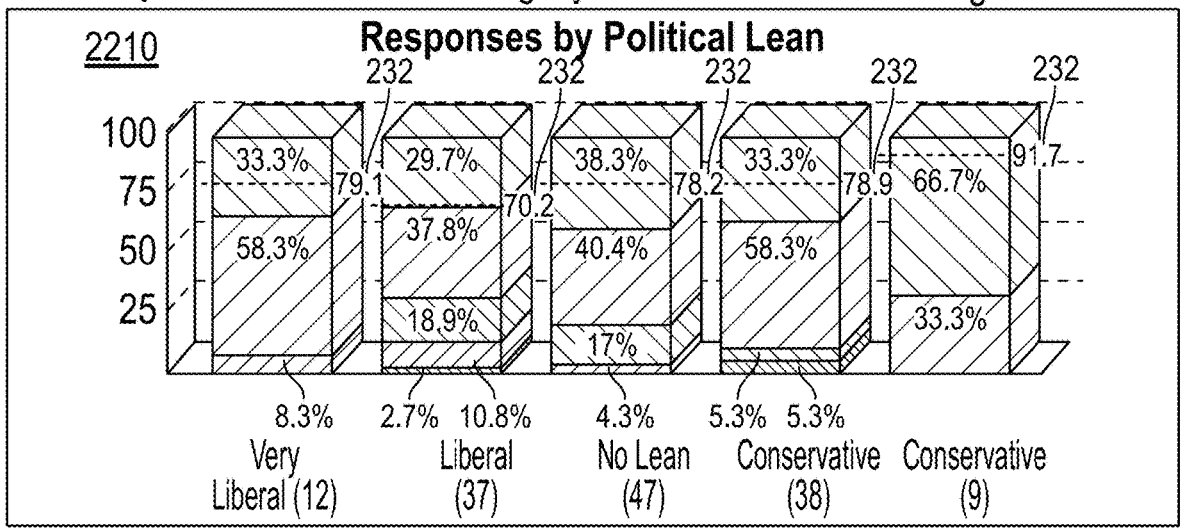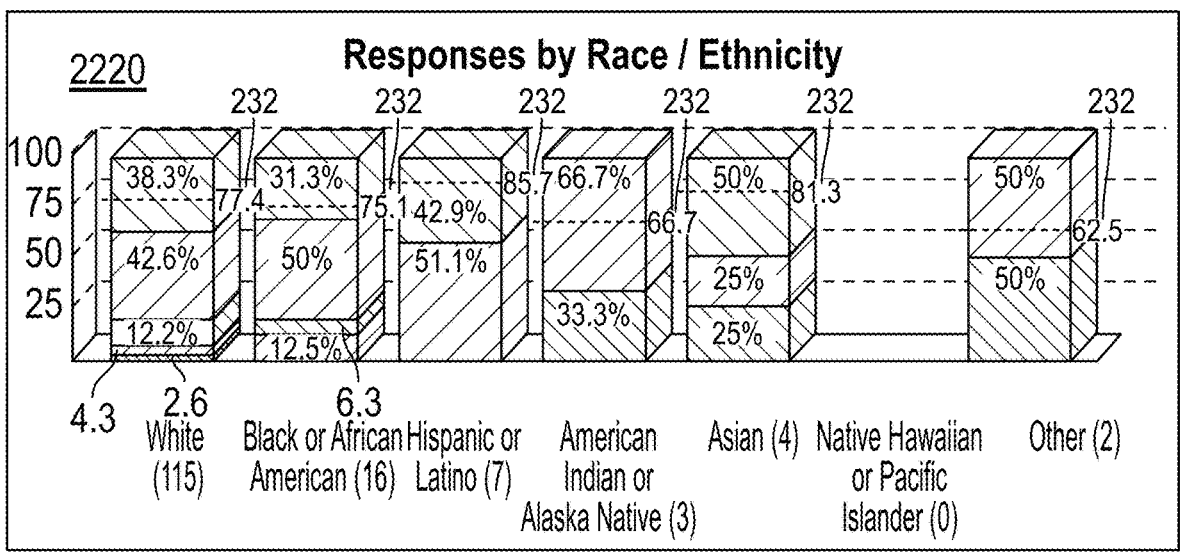
FIG. 22

Q7-1
Response:
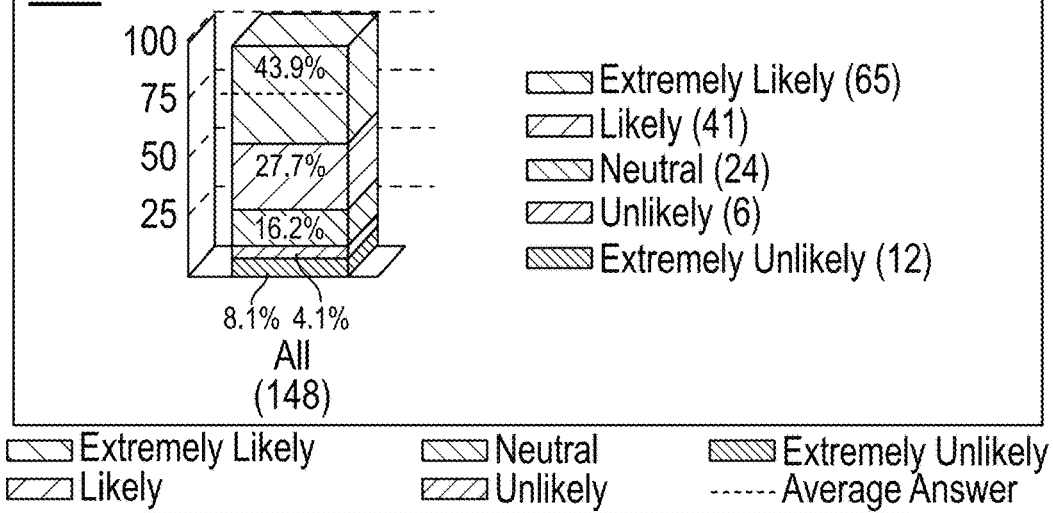
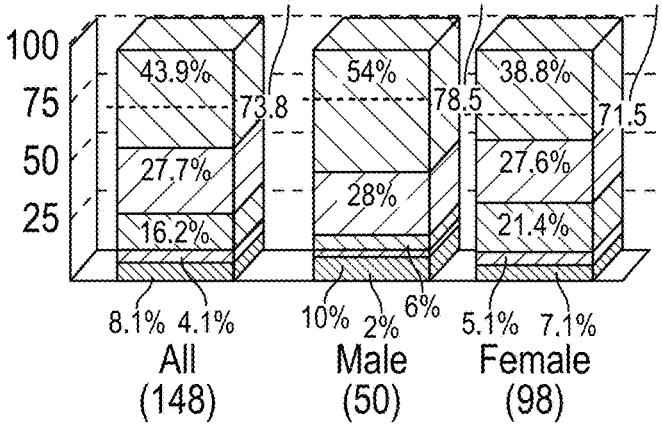
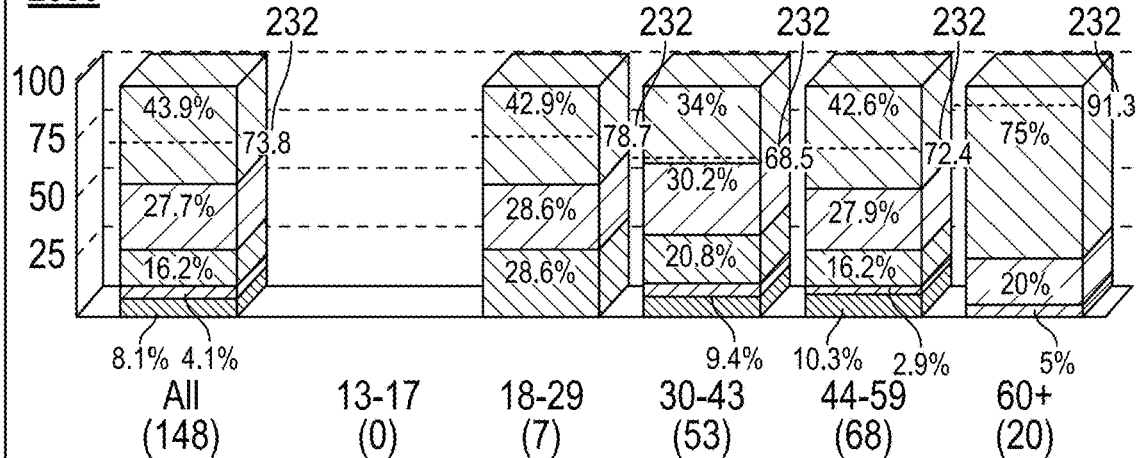
FIG. 23

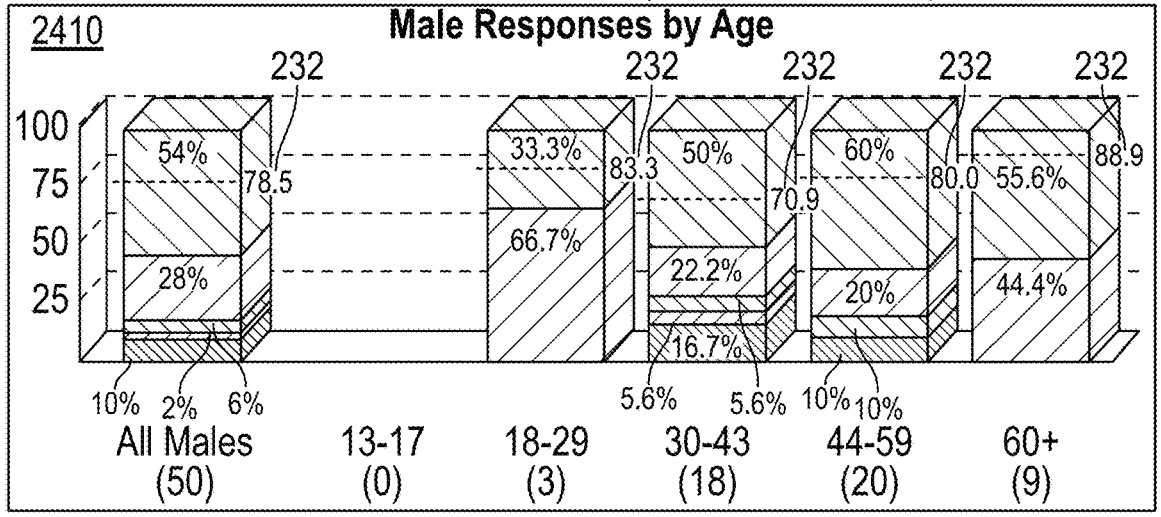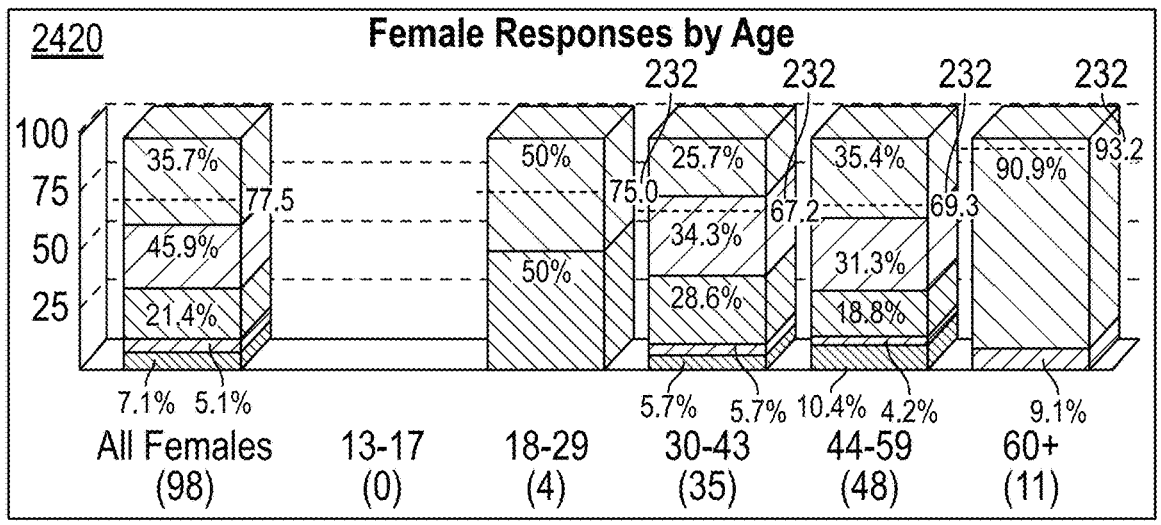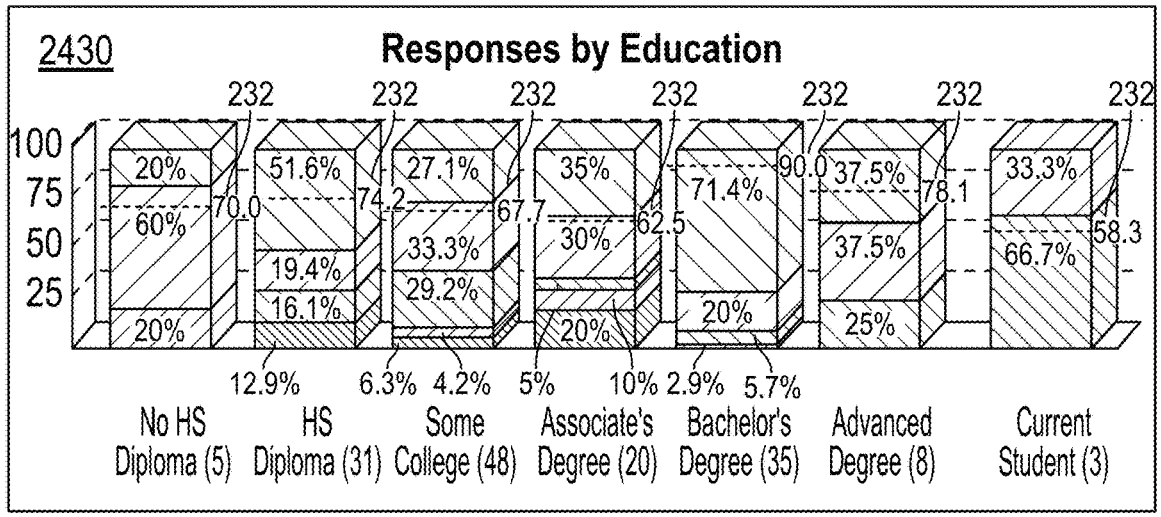
FIG. 24

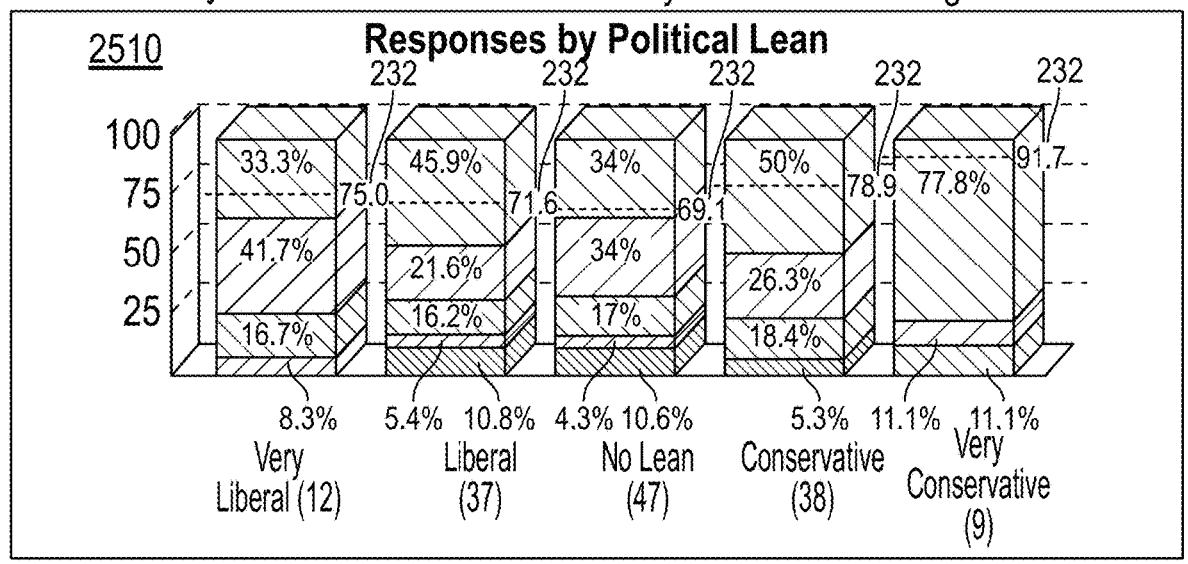
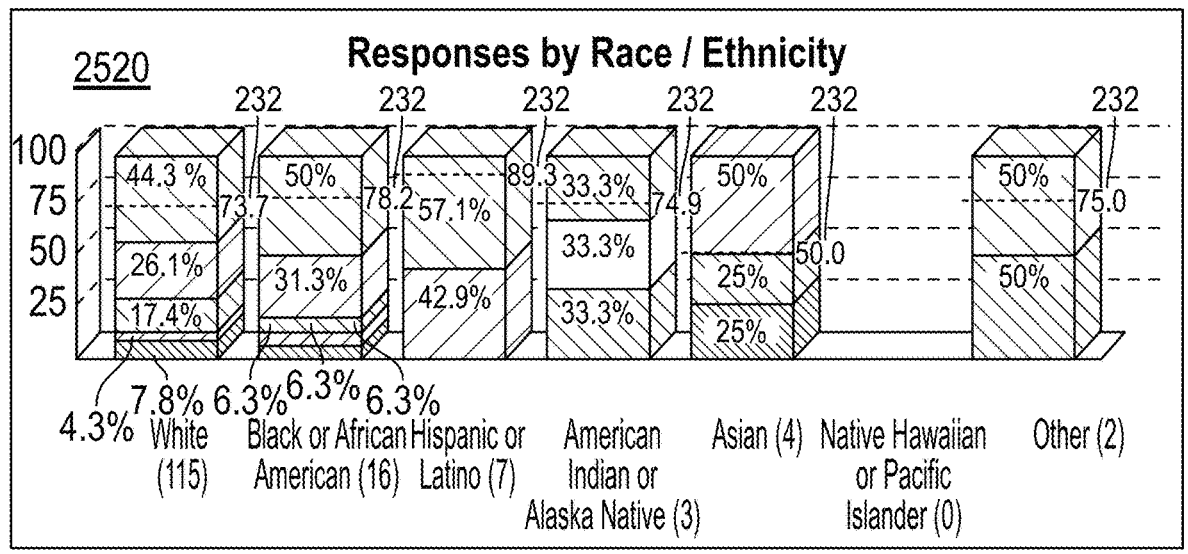
FIG. 25

SYSTEM AND METHOD FOR ACCURATE PREDICTIONS USING A PREDICTIVE MODEL

PRIORITY CLAIM

The present application is a continuation-in-part and claims the benefit of U.S. patent application Ser. No. 17/727,695, filed Apr. 22, 2022. The entire content of the above cited application is incorporated herein by reference.

TECHNICAL FIELD

The present disclosure relates generally to selecting accurate predictions using a predictive model, creating an interactive visual representation of the selected predictions arranged according to accuracy and providing access to the interactive visual representation and the predictive model for generating predictive analytic output.

BACKGROUND

Content items such as advertisements, video, images, or songs can be seen and heard everywhere. For instance, images, songs, videos, and advertisements can be online or on television, websites, radio, billboards, sports arenas, etc. Generally, content presenters spend billions of dollars annually on the content items they present. However, frequently these content items go unnoticed or unviewed. Many individuals may change the channel or station, switch their attention to something else, close out of pop-up ads, etc. instead of viewing the content. Because the audience may not be paying attention, content items may not effectively be reaching their intended audience.

Further, an organization or individual may desire feedback from viewers who do view their content. Such an organization or individual desiring feedback concerning their content may request viewers for feedback. However, users may not want to participate in telephone surveys, mail surveys, or online surveys as they may be time consuming, and require individuals to mail documents. Or, if the users do participate in the surveys, they may give rushed answers to complete the survey as quickly as possible. Often, rushed answers do not provide an accurate representation of the viewers' opinion regarding an advertisement.

Likewise, parties other than advertisers may desire feedback from the public regarding a variety of items. For example, a company may want to conduct market research on a new product design. Or, a company may be considering changing its logo and want feedback on which logo will best resonate with individuals. In another example, a company or organization may want thoughtful feedback on the quality of service they provide to individuals. An individual or organization desiring thoughtful feedback concerning content or service they provide may be referred to as an inquirer. An inquirer may be, for example, an advertiser, social media influencer, pollster, or politician. An inquirer may waste significant resources obtaining unreliable feedback from users that are not focused on the content.

SUMMARY

Apparatus and methods present a content item and question from an inquirer to a group of users in a first feedback session with a requirement for the users to provide predictions of how a member of a distinct target group will respond to the content item, receiving, during the first feedback session, the first group's prediction of the target group's responses, presenting, during a second feedback session, the same content item and the same question to the target group with a requirement for the target group to provide responses directed to their own responses, constructing a predictive model of the target group based on responses received from the target group during the second feedback session, measuring accuracy of the first group's predictions using the target group predictive model and providing the inquirer access to an ordered visual representation of the first group users arranged as a function of accuracy.

As used herein the terms "response," "answer," and "answer value" are interchangeable and synonymous. A response may comprise an answer. A response may comprise an answer value. An answer may comprise an answer value.

The advantages discussed herein may be found in one, or some, and perhaps not all of the embodiments disclosed herein. Additional features and advantages are described herein and will be apparent from the following Detailed Description and the figures.

BRIEF DESCRIPTION OF THE DRAWINGS

FIG. 6 is an example inquirer platform interface for selecting users and configuring content items and questions regarding the content items to be presented to the selected users, according to one aspect of the present disclosure.

FIG. 12 depicts an exemplary targeting interface implementation configured to target individuals located within selectable predetermined geographic areas.

FIG. 19 depicts an exemplary inquirer platform interface implementation presenting another portion of the results summary for the feedback session referenced by FIG. 17.

FIG. 20 depicts an exemplary inquirer platform interface implementation presenting an ordered visual representation of a portion of a plurality of individual predictions from a plurality of predicting group users directed to how the target group will respond arranged as a function of accuracy.

FIG. 21 depicts an exemplary inquirer platform interface implementation presenting an ordered visual representation of another portion of a plurality of individual predictions from a plurality of predicting group users directed to how the target group will respond arranged as a function of accuracy.

FIG. 22 depicts an exemplary inquirer platform interface implementation presenting an ordered visual representation of another portion of a plurality of individual predictions from a plurality of predicting group users directed to how the target group will respond arranged as a function of accuracy.

FIG. 23 depicts an exemplary inquirer platform interface implementation presenting an ordered visual representation of a portion of a plurality of individual answers from a plurality of target group members directed to the individual target group members' own responses arranged as a function of accuracy.

FIG. 24 depicts an exemplary inquirer platform interface implementation presenting an ordered visual representation of another portion of a plurality of individual answers from a plurality of target group members directed to the individual target group members' own responses arranged as a function of accuracy.

FIG. 25 depicts an exemplary inquirer platform interface implementation presenting an ordered visual representation of another portion of a plurality of individual answers from a plurality of target group members directed to the individual target group members' own responses arranged as a function of accuracy.

DETAILED DESCRIPTION

Figure 1:
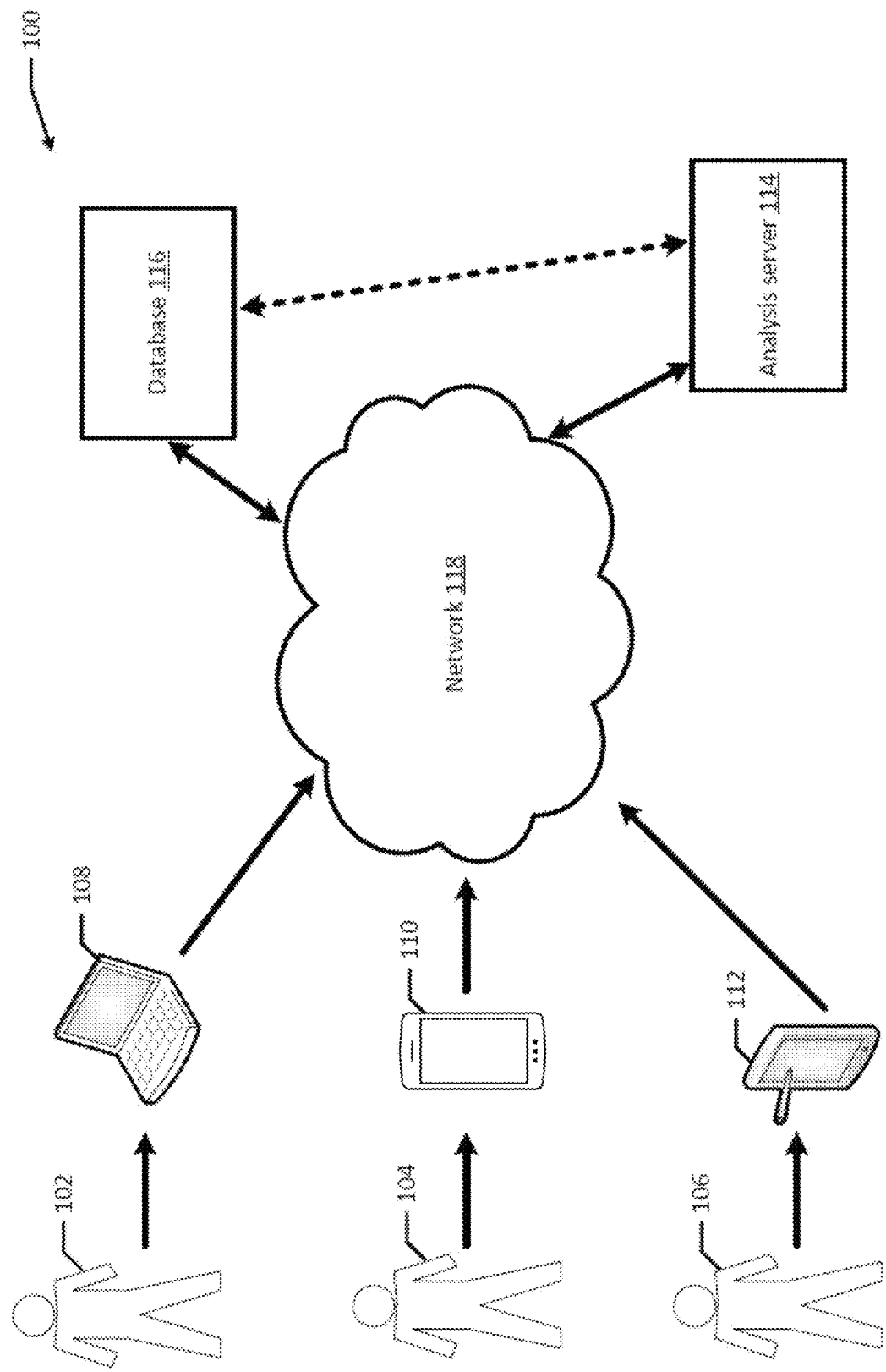
FIG. 1 illustrates an example diagram of a system for evaluating responses from users that view content items, according to one aspect of the present disclosure.

The present disclosure relates in general to a method, system, and apparatus configured to identify users that provide the most thoughtful responses to questions regarding content items. While the disclosure discusses a single operator of a web platform to enable the viewing and answering of questions/queries relating to content items, the example method, system, and apparatus disclosed herein enables multiple entities, operators, managers, etc. to view/track/upload/manage/sell space on the web platform for obtaining feedback regarding content. Further, while the disclosure discusses a single web platform to enable the viewing and answering of questions/queries relating to advertisements, the example method, system, and apparatus disclosed herein may be implemented on multiple web platforms to enable the viewing and responding to questions relating to content items. The example method, system, and apparatus may be used for virtually any type of content item a party desires a review of, such as an advertisement. The presently disclosed method, system, and apparatus may be used with virtually any type of advertisement, for example, billboards, television ads, radio ads, newspaper and magazine ads, internet ads, pop-up ads, direct mail advertising, posters, displays, signs, banner ads, etc.

It should be understood that while the presently disclosed method, system, and apparatus may be described using examples concerning advertisements, an implementation according to the present disclosure may be used for various content items that an inquirer may wish to receive thoughtful reviews for. For example, an inquirer may wish to conduct a market review for a new product design and may present different alternative designs to the public in a survey format. In another example, a company may be considering changing its logo and may seek feedback from the public. In another example still, a company or organization may want thoughtful feedback on the service it provided to a group of individuals. It should be appreciated that these are merely examples, and there are many more instances in which an inquirer may want to issue questions and evaluate the thoughtfulness of answers in response. Additionally, it should be appreciated that the described advantages herein of the disclosed system, method, and apparatus for inquirers can be correlated with the other described uses of the disclosed system, method, and apparatus.

Answering survey questions, if properly contemplated and truthfully answered, may often be time consuming and test the patience of participants in surveys and studies. However, these surveys, questionnaires, and focus groups may be invaluable to inquirers such as advertisers in developing advertisements or selecting which advertisements or elements of advertisements to use. Focus groups also provide important feedback on released ad campaigns. The goal in using focus groups and questionnaires/surveys may be to make advertisements as appealing as possible prior to launch, so that advertisements reach and impact their target audience. Recently, advertisers or third-party companies have been compensating participants for their time participating in these surveys. However, these programs and surveys frequently compensate all participants, without analyzing the quality of their feedback. Therefore, many individuals may rush through the questions or discussion, without providing truthful or thoughtful answers.

The provided system and method may encourage individuals to participate using compensation but may limit the number of participants that receive compensation. An example of the disclosed system, method, and apparatus rewards thoughtful and truthful answers, by compensating individuals whose numerical answers fall closest to a comparison value calculated from the answers of all participants. The comparison value is meant to be a representation of a truthful or thoughtful answer. For example, the comparison value may be the average, median, or mode of all the answers received from users for a question in some embodiments. Therefore, in the example, as individuals answer survey questions relating to ads, they may more carefully and thoughtfully answer questions in order to analyze how the typical viewer or listener of an advertisement may think about a viewed advertisement in relation to a particular question. This is because only a portion of participants with answers closest to the comparison value may receive compensation.

Further, one feature of the present disclosure may include that the "correct" answers to the questions presented to participants are not known when the user answers questions related to the viewed advertisements. The user's answers may not be compared to right or wrong answers, but rather to the answers of other users/participants reviewing the same advertisements and being asked similar or identical questions. Therefore, a correct answer may be unknown until after all participants have submitted an answer. Once submitted, participants may then be evaluated, sorted, and compared to other users, and this comparison may play a role in the compensation and/or rewards received by participants.

Reference is made herein to content items to be presented. As disclosed herein, a content item may include anything that a party wants rated or reviewed, such as advertisements, images, videos, text, product designs, company logos, movies, books, or anything else that a user can view. As disclosed herein, an item may comprise any content. In the present disclosure, the terms "item," "content," and "content item" are intended to be interchangeable and synonymous. Items may also include a set of questions regarding the content item that the inquirer requests responses to. If there is not a tangible item an individual may view, such as a set of questions regarding the quality of service a company or organization provided a group of individuals, questions may be provided without a content item. Reference is also made herein to a feedback session. As disclosed herein, a feedback session may include an individual completing a review on his or her own at any given time, an organized meeting of individuals for the purpose of completing one or more reviews, or any other period of time set aside for completing a review. As disclosed herein, an implementation may be configured to conduct a plurality of feedback sessions. At least a portion of a result or a predictive model determined from one or more feedback session may be used by another feedback session.

System Embodiment

FIG. 1 shows an example diagram of a system 100 for evaluating and selecting users that provided thoughtful responses to questions regarding content items, according to one aspect of the present disclosure. In the example system 100, a user 102, a user 104, and a user 106 provide answer values 224, 228 (FIG. 2) into a device 108, 110, 112, such as a computer 108, a smart phone 110, or a tablet 112. It should be appreciated, however, that the device may be any device and is not limited to the devices disclosed herein. For example, the device may include any personal computer, smart phone, tablet, Personal Digital Assistant (PDA), television, gaming console, etc. The devices 108, 110, 112 may be configured with a mobile app deployed to the devices 108, 110, 112. The mobile app may be configured to display to the users 102, 104, and 106 a website or application that users may access in order to provide their input (e.g., answer values 224, 228) regarding prompts or questions presented to users concurrently with, prior to, or after perceiving an advertisement.

Figure 2:
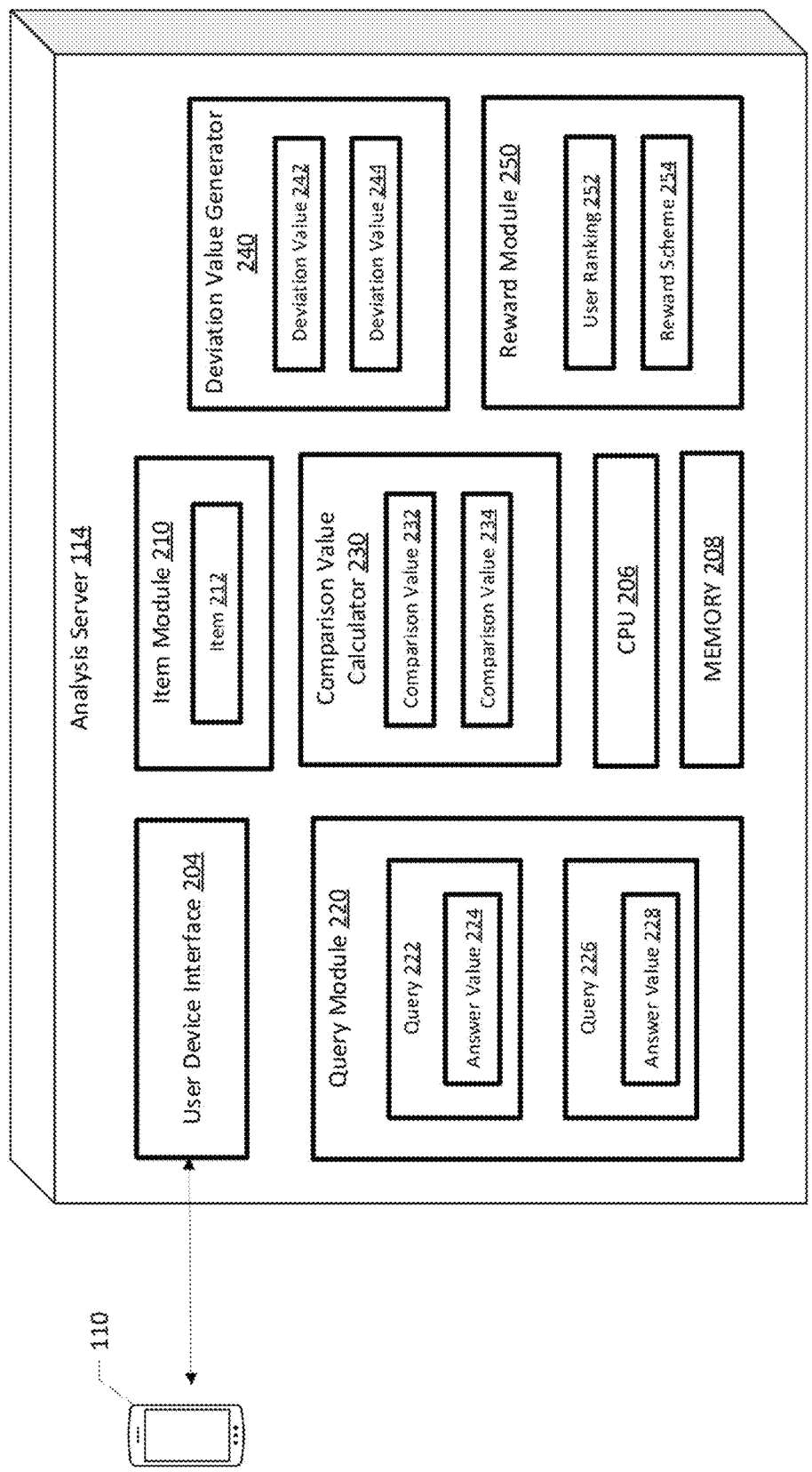
FIG. 2 illustrates an example embodiment of an analysis server of the present disclosure.

The answer values 224, 228 received at the devices 108, 110, 112 may be directed to an analysis server 114 via a network 118. The network 118 may be wired or wireless. The analysis server 114 may execute calculations or instructions based on the answer values 224, 228 of the users 102, 104, 106. The calculations and instructions executed by the analysis server 114 determine which users 102, 104, 106 should be selected as providing thoughtful responses by comparing the answer values 224, 228 of the users 102, 104, 106 and sorting the users 102, 104, 106 based on how their answer values 224, 228 deviate from a comparison value 232, 234 (FIG. 2). It should be understood that each device 108, 110, 112 and the analysis server 114, may include a processor and/or memory.

As used herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the system 100. In an example, all of the disclosed methods and procedures described herein can be implemented by the one or more processors. Further, the system 100 may be distributed over multiple processors, memories, and networks.

The analysis server 114 may be in communication with or coupled to a database 116. The database 116 may be connected to the network 118. The database 116 may be a memory device as described above. Database 116 may store a variety of information. Specifically, database 116 may store the answer values 224, 228 from the users 102, 104 and 106; the equations, calculations, predictive models, or instructions used by the analysis server 114; the results of any analysis performed by the analysis server 114, etc. As indicated with the bi-directional dotted arrow between the analysis server 114 and the database 116, information may be communicated between them in both directions.

FIG. 2 shows an example diagram of the analysis server 114, according to an example embodiment of the present disclosure. The analysis server 114 includes different components that are representative of computational processes, routines, and/or algorithms. In some embodiments, the computational processes, routines, and/or algorithms may be specified in one or more instructions stored on a computer readable medium that, when executed by a processor of the analysis server 114, cause the analysis server 114 to perform the operations discussed below. For example, all or part of the computational processes, routines, and/or algorithms may be implemented by the CPU 206 and the memory 208. It should be appreciated that in other embodiments the components of the analysis server 114 may be combined, rearranged, removed, or provided on a separate device or server.

The analysis server 114 includes a user device interface 204 configured to be communicatively coupled to one or more devices 108, 110, 112. For example, the user device interface 204 is illustrated as being communicatively coupled to a device 110 (e.g., a smart phone). It should be appreciated, however, that the user device interface 204 may be communicatively coupled to any of the devices 108, 110, 112 discussed above. The analysis server 114 may also include an item module 210 which causes the processor of the analysis server 114 to present one or more content items 212 to one or more users 102, 104, 106 via the user device interface 204 and a device 108, 110, 112. For the duration of this disclosure, content item 212 will be referred to as ad 212. The analysis server 114 may also include a query module 220 which causes the processor of the analysis server 114 to present one or more queries 222, 226 to one or more users 102, 104, 106 via the user device interface 204 and a device 108, 110, 112. The query module 220 may also store the answer values 224, 228 provided by one or more users 102, 104, 106 in response to the one or more queries 222, 226. For example, the query module 220 may cause query 222 and query 226 to be presented to a user 102 and may store the answer value 224 and answer value 228 received in response to the queries 222 and 226, respectively.

The analysis server 114 may also include a comparison value calculator 230 which may analyze the answer values 224, 228 received from the users 102, 104, 106 to calculate a comparison value 232, 234 for each query 222, 226. The analysis server 114 may also include a deviation value generator 240 which compares the respective answer values 224, 228 from each user 102, 104, 106 with the calculated comparison value 232, 234 for a given query 222, 226 in order to generate deviation values 242, 244. The analysis server 114 may comprise one or more predictive model generated by the deviation value generator 240. The one or more predictive model may be any type of predictive model as might be known by one of ordinary skill. The one or more predictive model may be referred to as a predictive analytic model. The one or more predictive model may comprise one or more comparison value 232, 234 and a plurality of deviation values 242, 244. The analysis server 114 may also include a reward module 250 which may compare the deviation values 242, 244 of the users 102, 104, 106 and generate a user ranking 252 of sorted users 102, 104, 106 with lower deviation values 242, 244 for selecting users having a lower ranking corresponding to more thoughtful responses. The reward module 250 may also apply a stored reward scheme 254 to determine which users 102, 104, 106 to select as having provided more thoughtful responses to questions regarding the ad 212.

User Interface Embodiment

Figure 3:
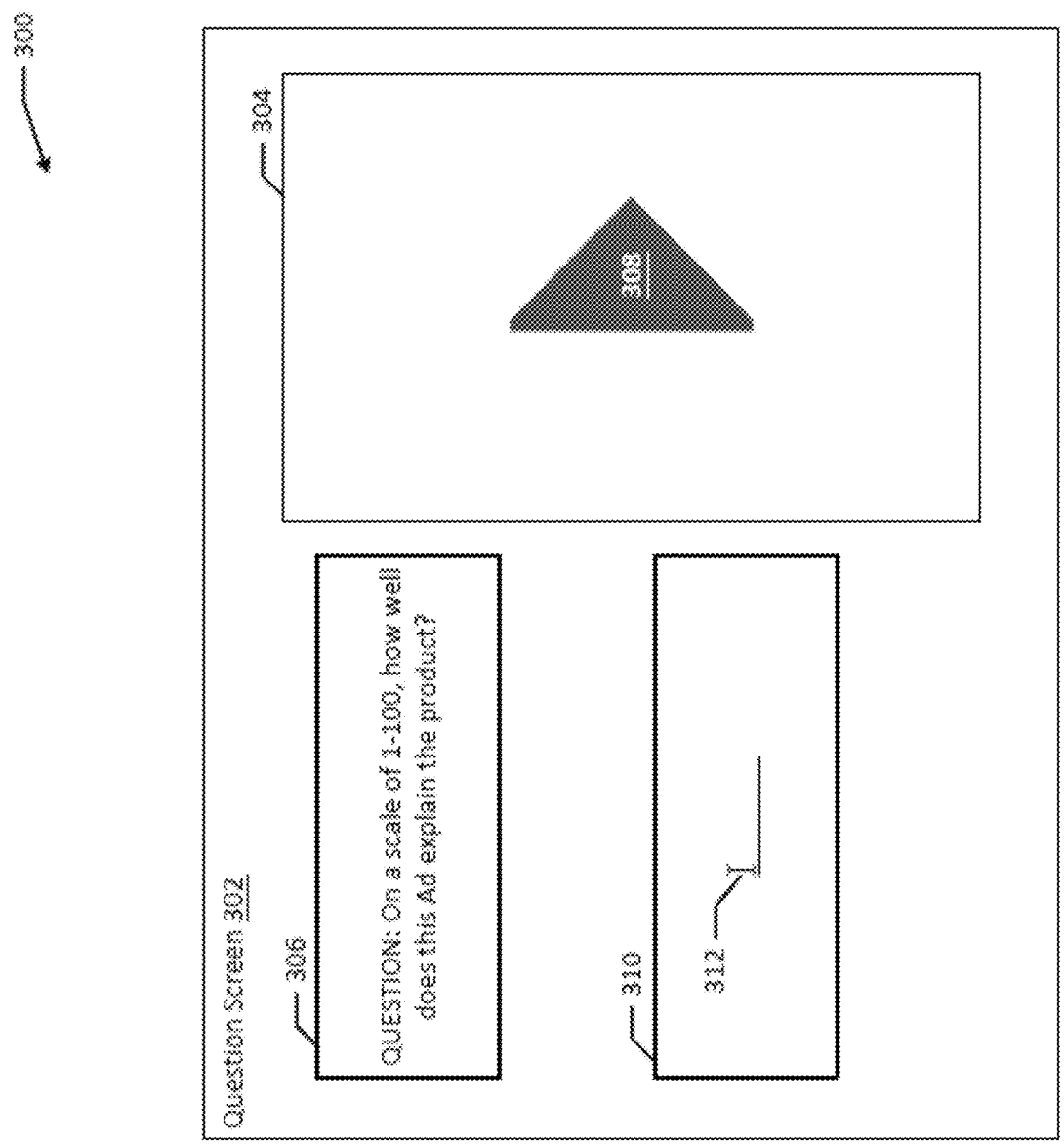
FIG. 3 illustrates an example question user interface of a system for evaluating responses from users that view content items, according to one aspect of the present disclosure.

FIG. 3 illustrates an example question user interface of the example system 100 for evaluating and selecting users that provide thoughtful responses to questions regarding content items, according to one aspect of the present disclosure. Specifically, a device 300 may display a user interface such as the question interface 302 in order to prompt users 102, 104, 106 for their answer values 224, 228. In the illustrated example, a user 102, 104, 106 is presented with an advertisement 304 on the question interface 302. The advertisement 304 may be in the form of a video, as suggested by the play button 308 located on the advertisement 304. In an alternate example, the advertisement 304 may be any type of advertisement users 102, 104, 106 may encounter, including, banner ads, radio ads, television ads, displays, billboards, newspaper and magazine ads, etc. There is no limit to the type of advertisement 304 that may be viewed, listened to, or encountered in the question interface 302.

After viewing the advertisement 304, the user 102, 104, 106 may read a question prompt 306 that will include a question for the user 102, 104, 106. In the illustrated example, the user 102, 104, 106 may enter his or her answer (i.e., an answer value 224, 228) in the answer user interface 310. This answer may be typed, as indicated by the text cursor 312 located in the answer user interface 310. In one example, the question prompt 306 and the answer user interface 310 may be displayed on the question interface 302 while the user 102, 104, 106 is watching the advertisement 304. In an alternative example, the question prompt 306 and the answer user interface 310 may not be presented to the user 102, 104, 106 until after the user 102, 104, 106 has finished watching the advertisement 304 or until the user 102, 104, 106 has indicated that he or she is ready to answer questions.

Figure 4:
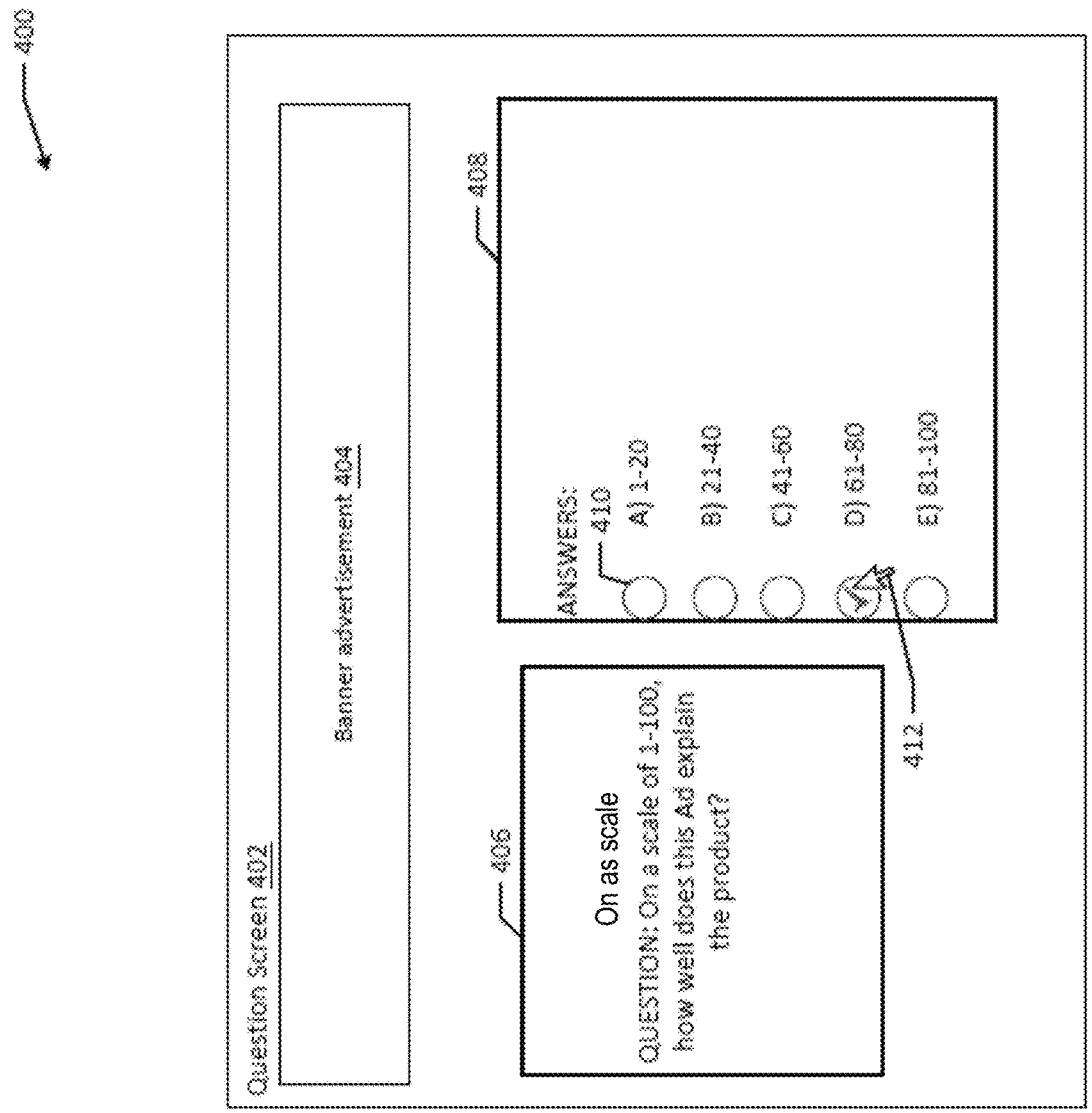
FIG. 4 illustrates an example question user interface of a system for evaluating responses from users that view content items, according to one aspect of the present disclosure.

FIG. 4 shows an alternate example question user interface of the example system 100 for evaluating and selecting users that provide thoughtful responses to questions regarding content items, according to one aspect of the present disclosure. In the illustrated example, a device 400 may display a question interface 402 to a user 102, 104, 106. The question interface 402 may be presented to the user 102, 104, 106 in a mobile application, on a website, etc. The question interface 402 may include a banner advertisement 404. After viewing the banner advertisement 404, or simultaneously with viewing the banner advertisement 404, a user 102, 104, 106 may be presented with or prompted to answer a question in a question prompt 406. The user 102, 104, 106 may be presented with an answer user interface 408 containing multiple choice answers. Each answer in the answer user interface 408 may be associated with a bubble 410. A user 102, 104, 106 may select his or her answer (i.e., an answer value 224, 228) from the bubbles 410 using a cursor 412. For example, the user 102, 104, 106 is illustrated as having selected answer choice "D" in the answer user interface 408. In an alternate example, users 102, 104, 106 may be presented with boxes to check, may be able to select the answer itself, or may be presented with a sliding scale instead of being presented with the bubbles 410. In an alternate example, the answer user interface 408 may include a fill in or type in option in case none of the multiple-choice answers are relevant to the user 102, 104, 106.

Figure 5:
FIG. 5 illustrates an example interface for presenting a content item and a question regarding the content item and receiving a response either directed to the responder's own response to the content item and question or directed to the responder's prediction of how a target group might respond to the content item and question in the future, according to one aspect of the present disclosure.

FIG. 5 illustrates an example interface 500 that a user 102, 104, 106 may be presented with on a device 108, 110, 112 for evaluating and selecting users that provide thoughtful responses to questions regarding content items such as for example ads 212, according to one aspect of the present disclosure. The example interface 500 may include a select ad type user interface 502 at which users 102, 104, 106 may select which type of ad 212 they would like to rate. For example, in the illustrated example interface 500, users 102, 104, 106 have the option of a video, image, or audio ad 212. It should be appreciated, however, that the ad type may be any of the types of advertisements previously mentioned in this disclosure. The example interface 500 may also include an ad user interface 504 for displaying an ad 212. For example, a video is displayed on the example ad user interface 504, indicated by the volume scale, pause button, play button, and full-size button. In various embodiments, a user 102, 104, 106 may select the full-size button in order to make the ad 212 fit the entirety of the interface 500.

The example interface 500 may also include a query user interface 506 which may list any number of queries that a user 102, 104, 106 may answer about the ad 212. For example, in the illustrated query user interface 506 there are four queries with numerical sliding scales and one question with bubbles. It should be appreciated that the query user interface 506 may take any of the forms previously discussed in relation to the question interface 302 and the question interface 402. In some embodiments, the query user interface 506 may be inoperable until the user 102, 104, 106 completes viewing the ad 212. In other embodiments, the user 102, 104, 106 may be able to answer queries in the query user interface 506 while viewing the ad 212.

In the depicted implementation the exemplary interface 500 comprises target group criteria description 508 presented to the user. The target group criteria description 508 presented to the user describes the target group selection criteria used for selecting the target group via the selection and targeting user interface 608, depicted for example at least by FIG. 6. In the depicted implementation the target group criteria description 508 presented to the user states "The target group is females from 30 to 40 years of age in New York City with college degrees." The target group criteria description 508 is presented to the user to enable the user to focus on the target group, based on the description of the target group selection criteria. The user may focus on the target group while answering a question regarding a content item from the perspective of a target group member. The user may focus on the target group while providing a response directed to predicting a future response by a target group member to a question regarding a content item.

The query user interface 506 may be configured to present a request to the user for the user to provide a prediction of how a member of the target group will respond to at least one question regarding the content item if members of the target group were presented the content item in the future. The request to the user for the user to provide a prediction of how a member of the target group will respond may be a requirement enforced by processor executable program instructions configured to execute on CPU 208. For example, the system may be configured so that the response is not accepted if the user does not indicate the responses are the user's predictions of how a member of the target group will respond in the future by selecting the selectable prediction indication 510. The query user interface 506 may be configured to prompt the user to indicate the responses are the user's predictions of the target group's future responses. The user may indicate the responses are the user's predictions of how a member of the target group will respond in the future by selecting the selectable prediction indication 510. In the depicted implementation the user has selected the selectable prediction indication 510. In the depicted implementation the user's responses comprising the predictions are received by the CPU 208 with the user selected selectable prediction indication 510.

The query user interface 506 may be configured to present a request to the user for the user to provide a response directed to the user's own individual response to at least one question regarding the content item. The request to the user for the user to provide a response directed to the user's own individual response may be a requirement enforced by processor executable program instructions configured to execute on CPU 208. For example, the system may be configured so that the response is not accepted if the user does not indicate the responses are the user's own individual responses by selecting the selectable individual response indication 512. The query user interface 506 may be configured to prompt the user to indicate the responses are the user's own individual responses. The user may indicate the responses are the user's own individual responses by selecting the selectable individual response indication 512. In the depicted implementation the user has allowed the selectable individual response indication 512 to remain unselected. In the depicted implementation only one of the selectable prediction indication 510 and the selectable individual response indication 512 may be selected at a time, enforced by processor executable instructions executing on the CPU 208. In a case where the user would have selected the selectable individual response indication 512, the user's responses comprising the user's own individual responses would be received by the CPU 208 with the user selected selectable individual response indication 512.

Inquirer Interface Embodiment

FIG. 6 shows an example inquirer platform interface 600, according to one aspect of the present disclosure. Inquirers desiring users 102, 104, 106 to rate their content items with the presently disclosed system, method, and apparatus may submit their content items using the example interface 600. The example interface 600 may include a content item type user interface 602 at which inquirers may choose the type of content item they would like to submit. The content item may be virtually any type of content item, for example, video, an image, music, billboards, television ads, radio ads, newspaper and magazine ads, internet ads, pop-up ads, direct mail advertising, posters, displays, signs, banner ads, etc. The example interface 600 may also have a company information user interface 604 which may have entries for an inquirer to input information about the inquirer and the content item.

The example interface 600 may include a query user interface 606 for an inquirer to decide which queries 222, 226 the inquirer would like the users 102, 104, 106 to answer. In the illustrated embodiment, the query user interface 606 includes a list of queries 222, 226 from which an inquirer may choose. In other embodiments, the query user interface 606 may present input fields for an inquirer to type its own queries and/or possible answers. In other embodiments still, the query user interface 606 may present both a list of queries 222, 226 and one or more input fields. It should be appreciated that an inquirer may select or create any number of queries 222, 226 at the query user interface 606 when submitting a content item.

The query user interface 606 may be configured to present a request to the user for the user to provide a prediction of how a member of the target group will respond to at least one question regarding the content item if members of the target group were presented the content item in the future. The query user interface 606 may be configured to prompt the user to indicate the responses are the user's predictions of the target group's future responses, using a distinct user selectable indication configured in the user interface for this purpose. The query user interface 606 may be configured to present a request to the user for the user to provide a response directed to the user's own individual response to at least one question regarding the content item. The query user interface 606 may be configured to prompt the user to indicate the responses are the user's own individual responses, using a distinct user selectable indication configured in the user interface for this purpose.

The example interface 600 may also include a selection and targeting user interface 608 at which the inquirer may select a number of options concerning selection criteria for the audience the inquirer is selecting. For example, the selection and targeting user interface 608 may include an option for targeting a specific gender, or age, or location, or user interest. It should be appreciated, however, that any type of selection criteria may be provided as an option on the selection and targeting user interface 608. For example, a predicting group and a responding target group may be distinct and exclusive from each other as a result of independent selection criteria distinguishing the predicting group from the responding target group.

The system may be configured to implement independent instantiations of the selection and targeting user interface 608, to permit independently configuring selection criteria for distinct predicting and target groups. The selection criteria distinguishing the predicting group from the target group may be criteria chosen using the selection and targeting user interface 608. The selection criteria distinguishing the predicting group from the target group may comprise demographic criteria such as, for example, location, gender, age, occupation, education, or any other useful selection and targeting criteria as may be known by one of ordinary skill in the pertinent art. The distinct groups may be selected based on criteria chosen so that no user of the predicting group would be a member of the target group. The users of the predicting group may be presented, via a user interface, with a description of criteria identifying the target group, to enable the predicting group to focus on the target group based on the criteria.

The example interface 600 may also include a views selection user interface 610 at which an inquirer may select the number of views for which the inquirer would like responses. For example, the views selection user interface 610 illustrates that the inquirer may select either 20, 30, 50, 75, or 100 views. It should be appreciated, however, that any number of views may be offered on the views selection user interface 610 and/or there may be an input for selecting a custom number of views. The content item submitted will only be shown to the number of views purchased. Accordingly, the more views the inquirer purchases, the more data the inquirer will collect from users 102, 104, 106. In an alternate example, rather than selecting a certain number of users 102, 104, 106 or views for reviewing an ad 212, an advertiser may determine the feedback session on a particular ad 212 may be open for a certain period of time, such as, for example, one week, two days, one hour, one year, etc.

Method Embodiment

Figure 7:
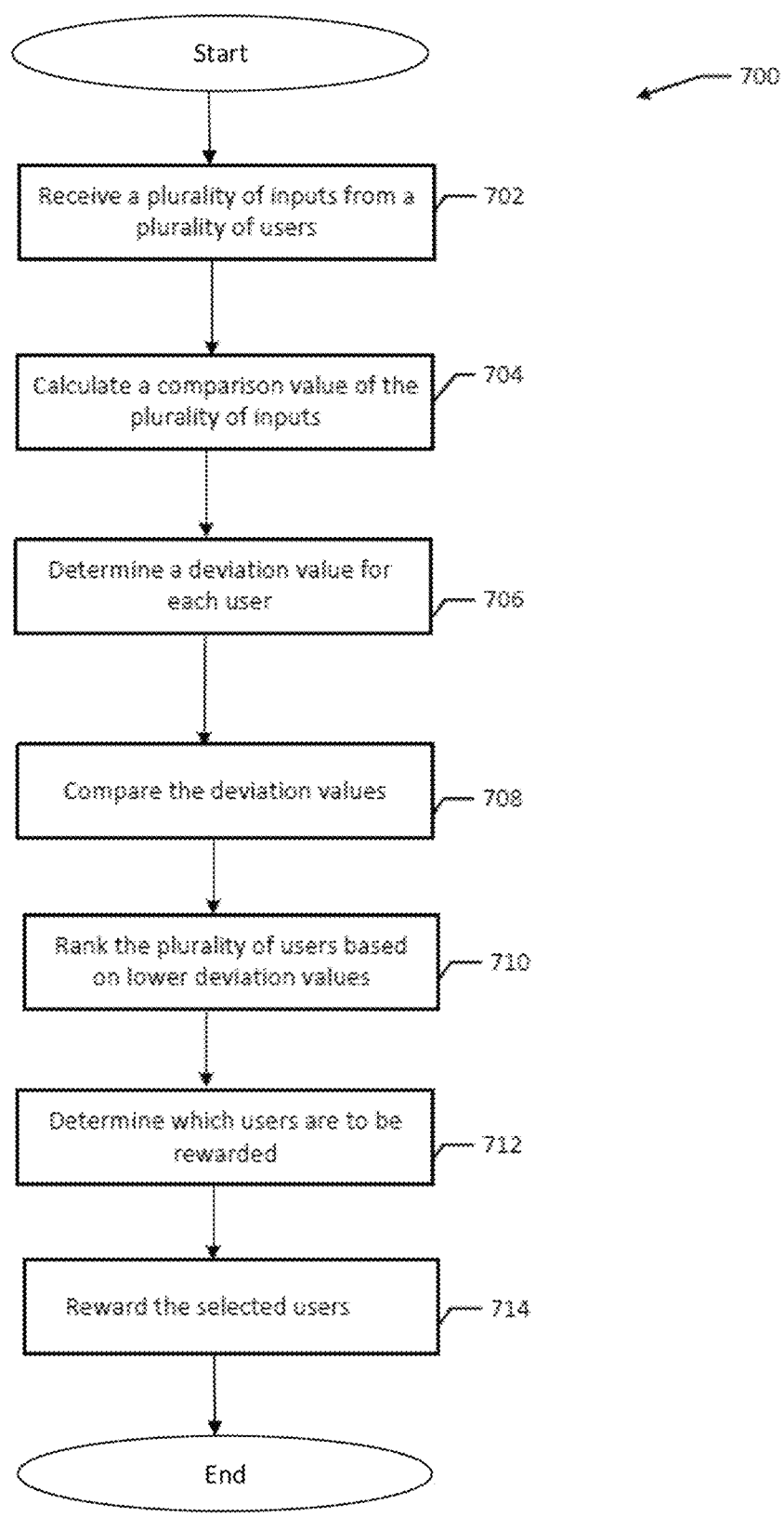
FIG. 7 is a flowchart illustrating an example method for using a system for evaluating responses from users that view content items, according to one aspect of the present disclosure.

FIG. 7 shows an example method 700 for evaluating and selecting users 102, 104, 106 that provide thoughtful responses to questions regarding content items, according to an example embodiment of the present disclosure. The method 700 may be implemented on a computer system, such as the analysis server 114 and/or the devices 108, 110, 112. For example, the method 700 may be implemented by the item module 210, the query module 220, the comparison value calculator 230, the deviation value generator 240, and/or the reward module 250 of the analysis server 114. The method 700 may also be implemented by a set of instructions stored on a computer readable medium that, when executed by a processor, cause the computer system to perform the method. For example, all or part of the method 700 may be implemented by the CPU 206 and the memory 208. Although the examples below are described with reference to the flowchart illustrated in FIG. 7, many other methods of performing the acts associated with FIG. 7 may be used. For example, the order of some of the steps may be changed, certain steps may be combined with other steps, one or more of the steps may be repeated, and some of the steps described may be optional.

The example method 700 begins by receiving a plurality of answer values 224, 228 from a plurality of users (step 702). For example, as depicted in FIG. 1, a first user may be the user 102, a second user may be the user 104, and a third user may be the user 106. The user 102 may provide a first answer value 224, 228 via the device (computer) 108, the user 104 may provide a second answer value 224, 228 via the device (smart phone) 110, and the user 106 may provide a third answer value 224, 228 via a device (tablet) 112. The answer value 224, 228 provided by the users 102, 104 and 106 may correspond to answer value 224, 228 inserted in, for example, the answer user interface 210 in FIG. 2 or the answer user interface 308 in FIG. 3.

In the example, the user 102 may have been presented with the question interface 202 of FIG. 2 on the device 108, and input the number "77" in the answer user interface 210 after viewing advertisement 204. Similarly, in the example, the user 104 may have been presented with question interface 202 on device 110, and input the number "20" in the answer user interface 210 after viewing advertisement 204. Similarly, in the example, the user 106 may have been presented with the question interface 202 on the device 112, and input the number "37" in the answer user interface 210 after viewing the advertisement 204.

Next, a comparison value 232, 234 of the plurality of answer values 224, 228 may be calculated (step 704). A comparison value 232, 234 may be any number calculated from the plurality of answer values 224, 228 that is treated as a "typical" or "average" answer that the answer values 224, 228 of the users 102, 104, 106 may be compared to in order to determine if the users 102, 104, 106 gave thoughtful answers. For example, a comparison value 232, 234 may be based on a statistic such as, for example, the average, mean, or mode of a set of answer values 224, 228 given in response to a query 222, 226.

In other embodiments, a comparison value 232, 234 may be an average of a set of answer values 224, 228 after any outliers are removed from the set. In some embodiments, a comparison value 232, 234 may be calculated from only the answer values 224, 228 received after presenting the ad 212 to a set number of users 102, 104, 106. In other embodiments, a comparison value 232, 234 may be calculated from a larger population of answer values 224, 228, for example, by including the answer values 224, 228 received after previously presenting the ad 212 to a different set of users 102, 104, 106 or to the general population. In other embodiments still, a comparison value 232, 234 may be calculated from historical data received when testing a different advertisement. Or, a comparison value 232, 234 may be a number chosen by an advertiser that the advertiser deems to be a thoughtful answer, according to an embodiment.

In some embodiments, a comparison value 232, 234 is not calculated until an answer value 224, 228 has been received from every user 102, 104, 106. In other words, a comparison value 232, 234 is calculated when the survey/feedback session is over and users 102, 104, 106 can no longer submit answer values 232, 234. In an alternative embodiment, a comparison value 232, 234 may be calculated when a threshold number of answer values 224, 228 has been received, even if more answer values 224, 228 are received after the threshold number is met. The calculated comparison value 232, 234 is not affected by the answer values 224, 228 received after the threshold number is met, in the alternative embodiment, and is used for the users 102, 104, 106 submitting the respective answer values 224, 228 after the threshold number is met.

In a non-limiting example, an advertiser may leave feedback open for two weeks. After one week, two hundred users 102, 104, 106 may submit answer values 224, 228 to the respective one or more queries 222, 226, which may be considered a threshold number of answer values 224, 228 sufficient to calculate a comparison value 232, 234. In the second week, one hundred more users 102, 104, 106 may submit answer values 224, 228; however, these answer values 224, 228 do not affect the already calculated comparison value 232, 234. The deviation values 242, 244 for each of the one hundred more users 102, 104, 106 are calculated based on the already calculated comparison value 232, 234 (as discussed in more detail below). In one aspect of the present disclosure, the threshold number of answers 224, 228 is a number of answer values 224, 228 sufficient to calculate a comparison value 232, 234 representative of a thoughtful answer. For example, fifty, one hundred, or two hundred answer values 232, 234 rather than one, two, or three answer values 232, 234. It should be appreciated, however, that the threshold number of answer values 224, 228 may be any number. It should also be appreciated that the threshold number may be of users 102, 104, 106 rather than answer values 224, 228, in some embodiments.

As previously discussed, a comparison value 232, 234 is meant to represent a truthful or thoughtful answer that the answer values 224, 228 of users 102, 104, 106 may be compared against. A user 102, 104, 106 does not know what the comparison value 232, 234 is for any given query 222, 226. In some embodiments, as discussed above, the comparison value 232, 234 is not calculated until all answer values 224, 228 are submitted from all users 102, 104, 106 and thus is not even calculated at the time a user 102, 104, 106 submits his or her answer value 224, 228. Therefore, if a query 222, 226 shown to fifty users 102, 104, 106 presents a scale from 0-100 for how effective a user 102, 104, 106 thought the ad 212 was, those fifty users 102, 104, 106 will choose many different answer values 224, 228 if answered thoughtfully. Sometimes the answer values 224, 228 received may be clustered in a certain range because the users 102, 104, 106 had similar opinions. Other times, the answer values 224, 228 may be over a wide range because the users 102, 104, 106 had differing opinions.

It is not likely, however, that most or all users 102, 104, 106 will select "0" or "100" on the scale and therefore the comparison value 232, 234 will likewise not be "0" or "100" for a query 222, 226. A user 102, 104, 106 who is careless when answering the query 222, 226 and quickly enters "0" or "100," or quickly enters random numbers for a series of queries 222, 226, therefore runs the risk of not being near the comparison value or values 232, 234. Rather, the disclosed system, method, and apparatus encourages users 102, 104, 106 to answer the queries 222, 226 thoughtfully and carefully in order to attempt to be near the comparison value 232, 234. Accordingly, it should be appreciated that the comparison value 232, 234 may be calculated in any manner such that the calculated value serves this purpose of a thoughtful answer.

Continuing with the example in which the user 102 input the number "77," the user 104 input the number "20," and the user 106 input the number "37," the comparison value 232, 234 may be the average of the three numbers in some embodiments. For example, 77, 20, and 37 are added, and then the total will be divided by three, as there are three users. Therefore, the average is 44.667. Rounding up, the average is 45. This average may be calculated by the analysis server 114. It should be appreciated that the analysis server 114 may execute all comparison value 232, 234 calculations. The analysis server 114 may use the exact average (e.g., 44.667), the nearest whole number average (e.g., 45), or the base number average (e.g., 44) when determining the average. It should be appreciated that if the exact average is directly in between two whole numbers (e.g., 44.5), then the analysis server 114 may either round up to 45 or round down to 44 in various embodiments. In this example, the analysis server 114 will use the nearest whole number average (e.g., 45).

It should also be understood that, in various embodiments, more than one query 222, 226 will be presented to the users 102, 104, 106 for a given ad 212. In such embodiments, a comparison value 232, 234 is calculated for each query 222, 226. For example, if thirty users 102, 104, 106 are presented with query 222 and query 226 in response to ad 212, then a comparison value 232 is calculated for the thirty answer values 224 in response to query 222 and a comparison value 234 is calculated for the thirty answer values 228 in response to query 226. It should be appreciated that any number of queries 222, 226 may be presented and a comparison value 232, 234 will be calculated for each one.

Next, a deviation value 242, 244 is generated for each user 102, 104, 106 based on the comparison value 232, 234 calculated (step 706). A deviation value 242, 244 may be the difference between the answer value 222, 226 of a user 102, 104, 106 and the comparison value 232, 234, according to an aspect of the present disclosure. For example, continuing with the example in which the comparison value 232, 234 calculated was "45," a deviation value 242, 244 for the first answer value 224, 228 ("77") by the first user 102 is "32." A deviation value 242, 244 for the second answer value 224, 228 ("20") by the second user 104 is "25." A deviation value 242, 244 for the third answer value 224, 228 ("37") by the third user 106 is "8." The deviation values 242, 244 may be calculated by the analysis server 114.

It should be understood that in various embodiments in which more than one query 222, 226 is presented to the users 102, 104, 106, a deviation value 242, 244 is generated for each query 222, 226 for the first user 102, for each query 222, 226 for the second user 104, and for each query 222, 226 for the third user 106. In such embodiments, the deviation values 242, 244 for the first user 102 are added together to generate a total deviation value. The same is done for the second user 104 and the third user 106. It should be appreciated that the disclosed system, method, and apparatus may be used with any number of users 102, 104, 106 and the above example is merely for illustrative purposes.

The deviation values 242, 244 are then compared (step 708), and the users 102, 104, 106 are sorted based on lower deviation values 242, 244 (step 710). For example, the first deviation value 242, 244 of "32" for the first user 102 is greater than the second deviation value 242, 244 of "25" for the second user 104. Further, the second deviation value 242, 244 of "25" for the second user 104 is greater than the third deviation value 242, 244 of "8" for the third user 106. Therefore, these deviation values 242, 244 are compared to rank the users 102, 104, 106. The users 102, 104, 106 with the lowest deviation value 242, 244 may be at the top of the sorted users, as they may have the better score. Therefore, in this example, the third user 106 may come in first place, the second user 104 in second place, and the first user 102 in third place, when sorted according to the thoughtfulness of their respective responses.

The rankings may be utilized to determine which users 102, 104, 106 should be rewarded for their participation according to a reward scheme 254 (step 712). For example, a reward scheme 254 may require that only the first-place user 102, 104, 106 be rewarded. Alternately, the lowest 10%, 20%, 30% etc. of deviation values 242, 244 may be rewarded. For example, an advertiser may only be concerned with extreme outliers and may reward the lowest 90% of deviation values 242, 244, only excluding 10% of users 102, 104, 106, according to an embodiment. In an alternate example, the top five users may be rewarded. In another example, a first set of users with the lowest deviation values 242, 244 (e.g., lowest 10%) may receive a first reward, a second set of users with the next lowest deviation values 242, 244 (e.g., lowest 11-20%) may receive a second, different reward, and so on for any number of sets of users.

By only rewarding a portion of the participating users 102, 104, 106, there may be further encouragement for the users 102, 104, 106 to provide thoughtful answer values 222, 226 in order to attempt to have the lowest deviation value 242, 244. Accordingly, it should be appreciated that any reward scheme 254 may be used to generate that encouragement by only compensating a portion of the participating users 102, 104, 106. An example reward scheme 254 is detailed in the following paragraphs.

Based on User Rank, a Video Ad May Pay:
Top 5% of users: $1.00
Top 5%-10% of users: $0.75
Top 10%-15% of users: $0.50
Top 15%-25% of users: $0.25
Based on User Rank, an Image Ad May Pay:
Top 5%: $0.50
Top 5%-10%: $0.25
Based on User Rank, an Audio Ad May Pay:
Top 5%: $0.75
Top 5%-10%: $0.50
Top 10%-15%: $0.25

It should also be understood that in various embodiments in which more than one query 222, 226 is presented to the users 102, 104, 106, the users 102, 104, 106 will be ranked according to their total deviation values. As such, the reward scheme 254 described above will apply in the same manner to the ranking of total deviation values as it does to the ranking of deviation values 242, 244.

For example, the Table 1 below illustrates the answer values 224, 228 for the users 102, 104, and 106 in response to four queries 222, 226 (i.e., Q1-Q4). The users 102, 104, and 106 had to answer on a 1-100 scale after viewing the ad in the example and the comparison value 232, 234 for each query 222, 226 was calculated as the average of the answer values 224, 228 received. The comparison values 232, 234 for the four queries 222, 226 were calculated as 75, 76, 74, and 75 respectively.

TABLE 1

Example User Query Answers:

| USER | Q1 | Q2 | Q3 | Q4 |
|---|---|---|---|---|
| 102 | 70 | 75 | 65 | 71 |
| 104 | 74 | 75 | 78 | 80 |
| 106 | 81 | 78 | 79 | 74 |
| AVERAGE | 75 | 76 | 74 | 75 |

Table 2 below illustrates the determined deviation values 242, 244 for each user 102, 104, and 106 for each query 222, 226. For example, the user 102 has an answer value of "70" for query 1 (i.e., Q1) and the comparison value 232, 234 for Q1 is "75." Therefore, the deviation value 242, 244 for the user 102 for Q1 is "5." Table 2 also illustrates the total deviation values for each user 102, 104, and 106. The total deviation value for each user 102, 104, 106 is the sum of their deviation values 242, 244 for each query 222, 226. Based on the determined total deviation values in this example, the user 104 had the lowest total, the user 106 had the second lowest total, and the user 102 had the highest total.

TABLE 2

Example User Scores (sum of individual queries):

| USER | Q1 | Q2 | Q3 | Q4 | TOTALS |
|---|---|---|---|---|---|
| 102 | 5 | 1 | 9 | 4 = | 19 |
| 104 | 1 | 1 | 4 | 5 = | 11 |
| 106 | 6 | 2 | 5 | 1 = | 14 |

After it is determined which users 102, 104, 106 should be rewarded, those determined users 102, 104, 106 are rewarded (step 714). For example, the advertisers, the platform, or the operators of the platform may determine that the lowest score (e.g., the third user 106) will receive $1.00, and the second lowest score (e.g., the second user 104) will receive $0.50. Thus, users 104 and 106 may be provided these rewards by the platform, operators of the platform, or the advertisers directly. It should be appreciated that the reward can also be gift cards, credits, goods, etc. in addition to money.

In many embodiments, a reward is not provided to any users 102, 104, 106 until after the feedback session is over and all users 102, 104, 106 are ranked based on their calculated deviation values 242, 244 or total deviation values. In an alternative embodiment, a reward may be provided to a user 102, 104, 106 immediately, or soon thereafter, if a deviation value 242, 244 of zero is determined for the user 102, 104, 106. This is with the understanding that a user 102, 104, 106 cannot do better than a deviation value 242, 244 of zero and thus is guaranteed a reward. It should also be appreciated that other deviation values 242, 244 or total deviation values may be chosen as an automatic reward benchmark other than zero (e.g., 1, 2, 3, . . . 10, etc.). For example, in instances when a comparison value 232, 234 is calculated prior to the feedback session closing, if a user 102, 104, 106 then submits one or more answer values 224, 228, a deviation value 242, 244 or total deviation value may be determined for that user 102, 104, 106 prior to the feedback session closing. If the deviation value 242, 244 or total deviation value for that user 102, 104, 106 is determined to be at or below the automatic reward benchmark, then the user 102, 104, 106 may automatically receive a reward and does not have to wait until the feedback session closes.

Figure 8:
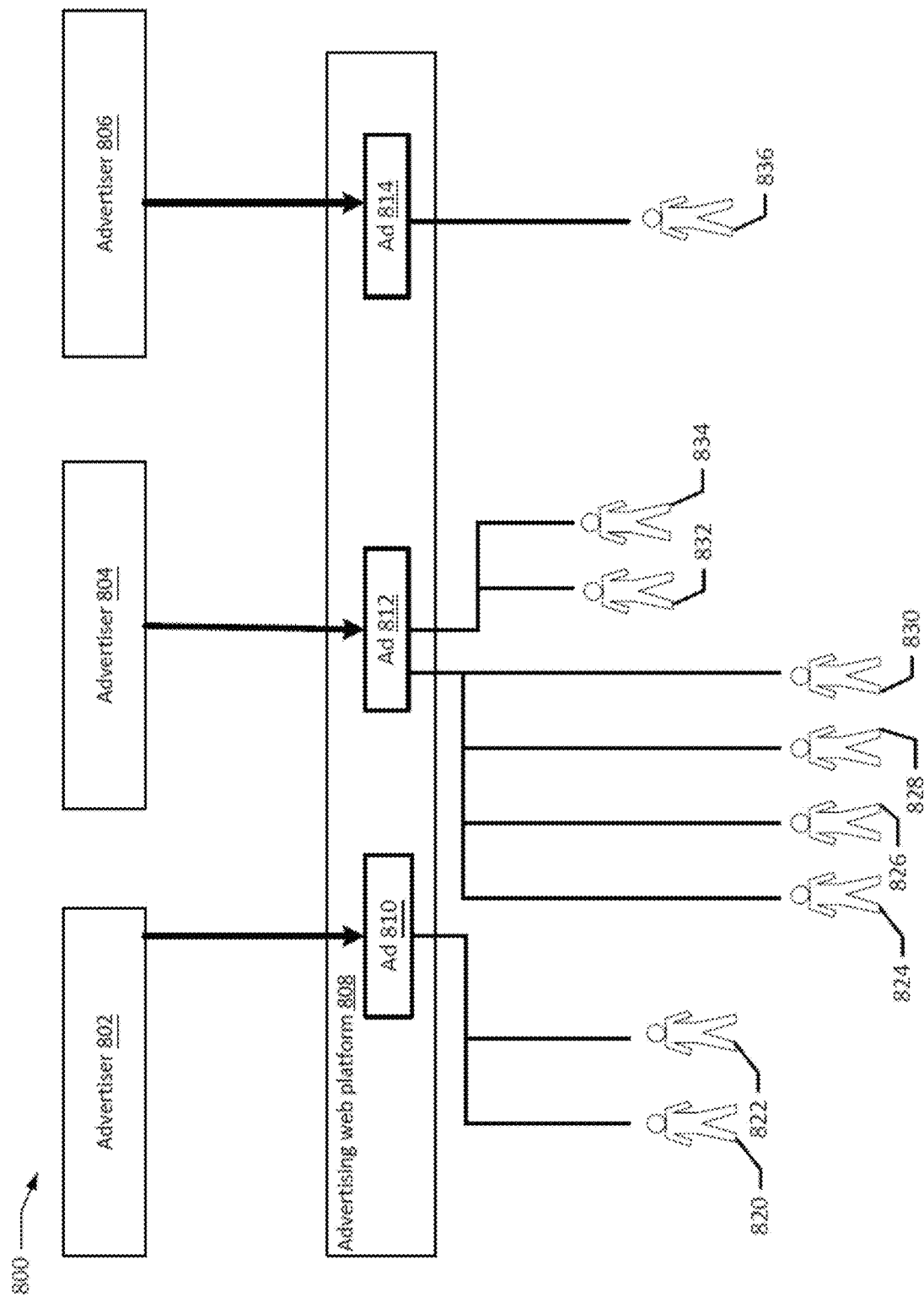
FIG. 8 is an example network diagram of a system for evaluating responses from users that view content items, according to one aspect of the present disclosure.

FIG. 8 shows an example diagram of a system for evaluating and selecting users that provided thoughtful responses to questions regarding content items, according to one aspect of the present disclosure. In the example, the advertisers 802, 804, and 806 may provide advertisements that they would like to reward users for watching and answering queries 222, 226 about. These advertisements, or Ads 810, 812, and 814 are placed onto an advertising web platform 808 either directly by the advertisers 802, 804, 806 (e.g., using the example inquirer platform interface 600) or indirectly by a party controlling access to the advertising web platform 808. In the example, the advertiser 802 placed the Ad 810 onto the advertising web platform 808, while the advertisers 804 and 806 provided their Ads 812 and 814, respectively, to a third party to place onto the advertising web platform 808.

The advertisers 802, 804, and 806 in the example, may provide instructions as to how many users 102, 104, 106 may view ads 212, how many users 102, 104, 106 may answer a specific set of queries 222, 226, how many results are required before receiving a reward, who the target audience is for each advertisement, etc. For example, the advertiser 802 may specify that only two users, the users 820 and 822, are needed to view and answer questions regarding the Ad 810. Or, in an alternate example, the advertiser 802 may have specified that seven females should review the Ad 810. In this alternative example, the advertising web platform 808 may be waiting for five more females to sign into the web platform 808 and answer questions regarding the Ad 810 before beginning computations for one or more comparison values 232, 234. It should be appreciated that, rather than selecting a certain number of users 102, 104, 106 for reviewing an ad 212, an advertiser may also determine the feedback session on a particular ad 212 may be open for a certain period of time, such as, for example, one week, two days, one hour, one year, etc.

The advertiser 804, in the example, may have specified two separate sets of queries 222, 226 regarding the Ad 812, and therefore required two groups of user 102, 104, 106. The advertiser 804 may have specified that one group may contain four users 824, 826, 828, and 830, and the average should be calculated for the comparison value 232, 234 with the reward going to the one user with the lowest deviation value 242, 244 from the average, according to an embodiment. The advertiser 804 may have also specified that the second set of queries 222, 226 only requires two users 832 and 834, and they both will receive rewards regardless of their answer values 224, 228, according to an embodiment.

Continuing with the example, the advertiser 806 may have specified only one user 836 may view and answer queries 222, 226 relating to the Ad 814. Therefore, the user 836 may automatically receive a reward. It should be appreciated that any number of users 102, 104, 106 may be utilized by advertisers in answering queries 222, 226 related to viewed ads 212. For example, there may be 50, 100, 10,000 users, etc. that answer queries 222, 226 for advertisers.

Figure 9:
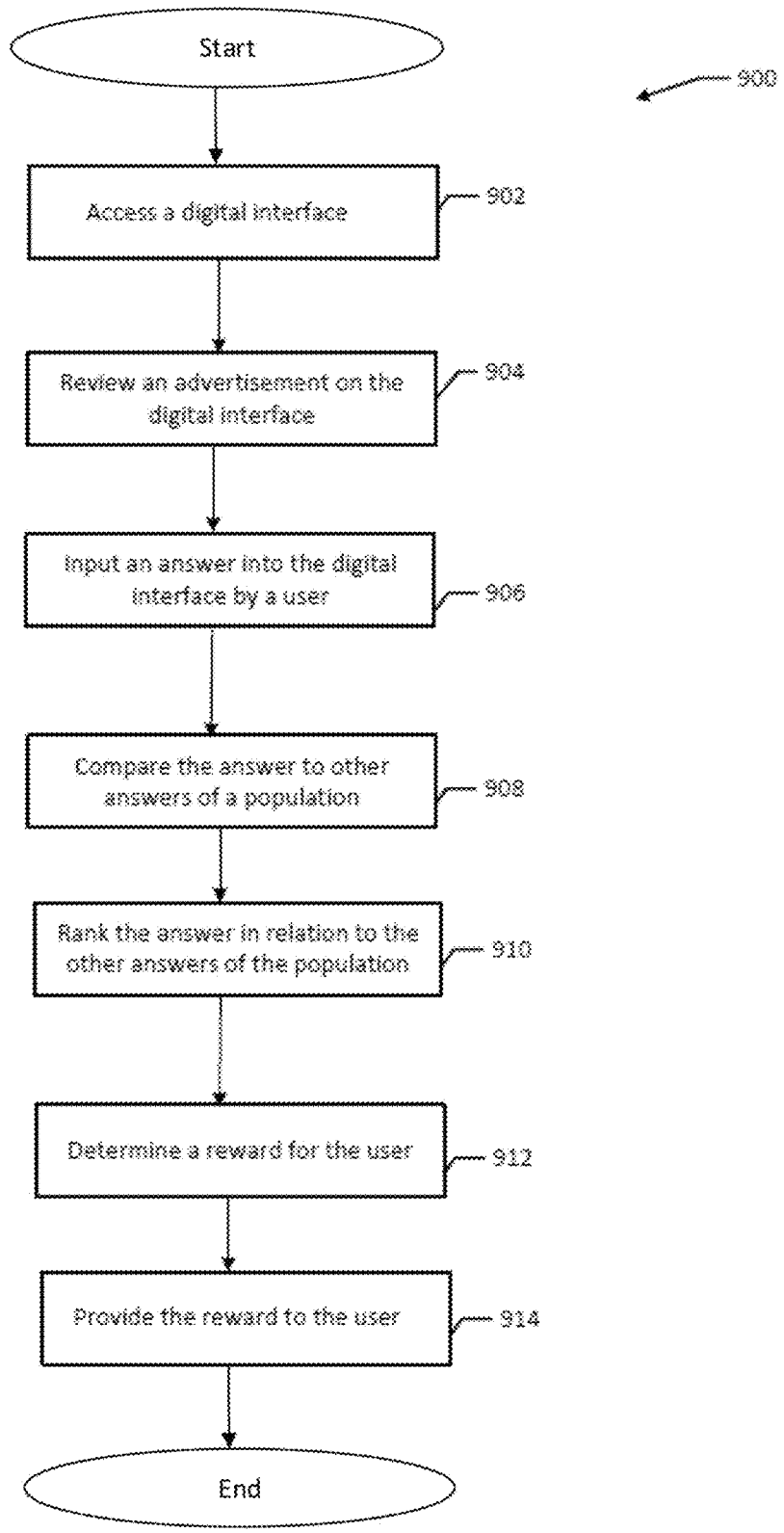
FIG. 9 is a flowchart illustrating an example method for using a system evaluating responses from users that view content items, according to one aspect of the present disclosure.

FIG. 9 illustrates an example method 900 for using a system for evaluating and selecting users that provided thoughtful responses to questions regarding content items, according to one aspect of the present disclosure. The method 900 may be implemented on a computer system, such as the analysis server 114 and/or the devices 108, 110, 112. For example, the method 900 may be implemented by the item module 210, the query module 220, the comparison value calculator 230, the deviation value generator 240, and/or the reward module 250 of the analysis server 114. The method 900 may also be implemented by a set of instructions stored on a computer readable medium that, when executed by a processor, cause the computer system to perform the method. For example, all or part of the method 900 may be implemented by the CPU 206 and the memory 208. Although the examples below are described with reference to the flowchart illustrated in FIG. 9, many other methods of performing the acts associated with FIG. 9 may be used. For example, the order of some of the steps may be changed, certain steps may be combined with other steps, one or more of the steps may be repeated, and some of the steps described may be optional.

The example method begins by accessing a digital interface (step 902). For example, a user such as the user 102 in FIG. 1 may access a digital interface such as digital interface (computer) 108. Next, an ad 212 is reviewed on the digital interface (step 904). For example, the user 102 may review an ad 212 on the digital interface (computer) 108. This may be by accessing a website, portal, application, or program loaded onto or accessible via the digital interface (computer) 108. The user 102 may, for example, be viewing the banner advertisement 404 of FIG. 4 on the digital interface (computer) 108.

In various embodiments, an answer value 224, 228 is then input into the digital interface by a user (step 906). For example, the user 102 may select/input an answer value 224, 228 from the answer user interface 408 about the viewed banner advertisement 404 after reviewing a question prompt 406. Next, the answer value 224, 228 is compared to other answer values 224, 228 of a population (step 908). For example, if answer D is selected from the answer user interface 408 by the user 102, the answer values 224, 228 selected by other user 102, 104, 106 (the population) may be compared to the answer values 224, 228 of the user 102. Advertisers may select as many user 102, 104, 106 as desired to review ads 212 and provide feedback. For example, the answer values 224, 228 of the population may include answer values 224, 228 from the user 104 and the user 106.

The answer values 224, 228 of the user 104 and the user 106 may be compared to the answer values 224, 228 of the user 102. This comparison may include taking the average of all the answers values 224, 228, and calculating a deviation value 242, 244 from the average for each answer value 224, 228. It should be appreciated that the comparison may include any of the previously discussed methods for calculating comparison values 232, 234 and deviation values 242, 244. In an alternate example, rather than selecting a certain number of users 102, 104, 106 for reviewing an ad 212, an advertiser may determine the feedback session on a particular ad 212 may be open for a certain period of time, such as, for example, one week, two days, one hour, one year, etc.

Next, the answer value 224, 228 is sorted in relation to the other answer values 224, 228 of the population (step 910). For example, the participants in the population (the users 104 and 106) and the user 102 may be sorted according to their deviation values 242, 244 calculated previously. The participant with the lowest deviation score may have the "best" score. In this example, the user 102 may be in the top 20% of lowest deviation scores, but not in the top 10% as compared to the population (e.g., including the users 104 and 106).

Next, a reward is determined for the user 102, 104, 106 (step 912). In the example, the users 102, 104, 106 (population) with the top 10% of lowest deviation values 242, 244 may receive $0.50, and the participants not in the top 10% but in the top 20% of lowest deviation values 242, 244 may receive $0.25. Therefore, it may be determined that the user 102 may receive $0.25, as the user 102's scores are in the top 20% of lowest deviation values 242, 244. Next, the reward is provided to the user 102, 104, 106 (step 914). In the example, the user 102 may receive $0.25.

Figure 10:
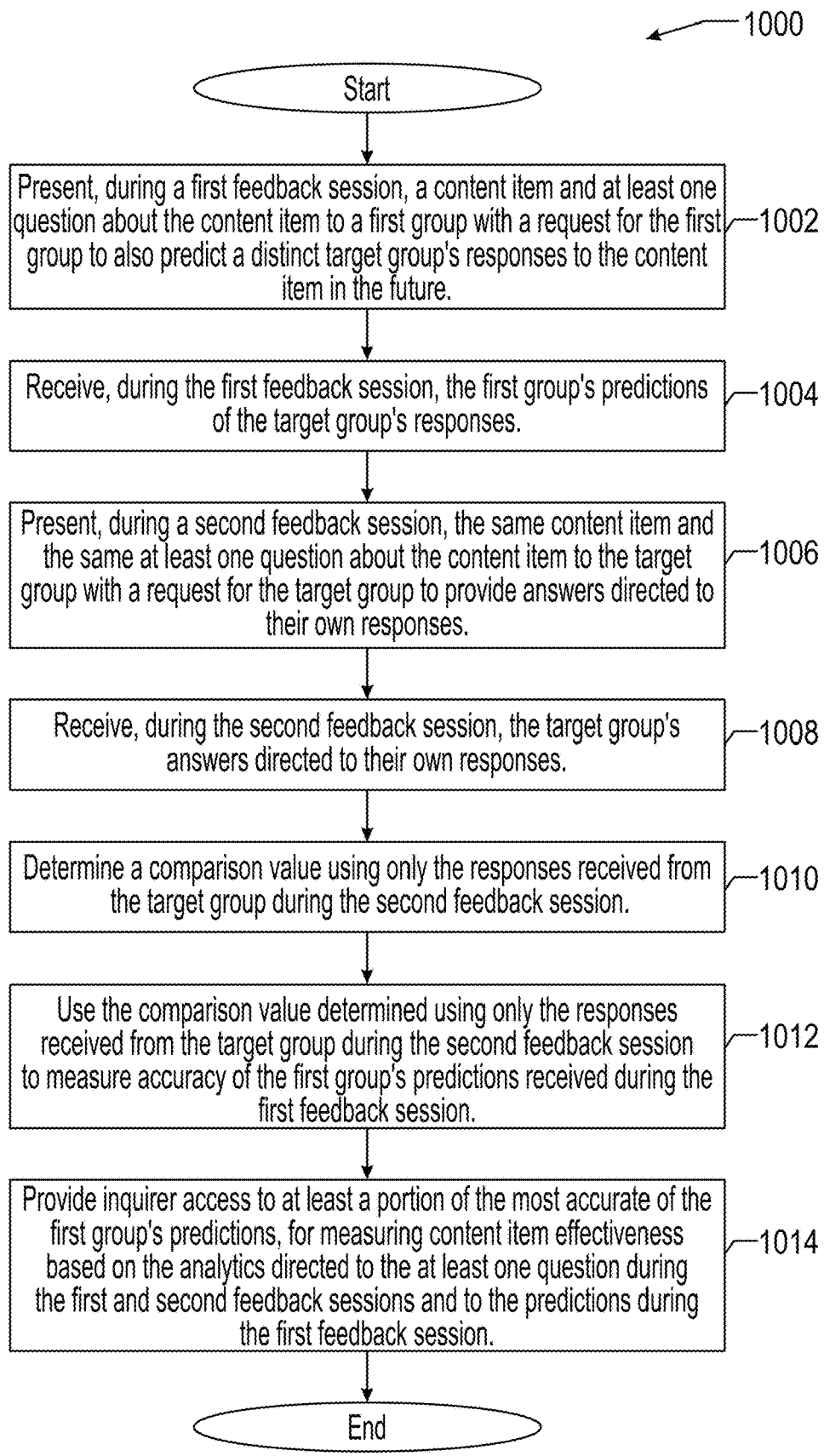
FIG. 10 is a flowchart illustrating an example method for using a system configured to provide an inquirer access to market research from users that most intensely focused on content, based on using a predictive model constructed for a target group to measure accuracy of a predicting group's predictions of answers from the responding target group, for the same content and question about the content, selecting as most intensely focused the predicting group users that most accurately predicted the responding target group member's responses, and providing the inquirer with access to market research results from the most intensely focused users of the predicting group.

FIG. 10 illustrates an example method 1000 for using a system configured to provide an inquirer access to market research from users that most intensely focused on content, based on using a predictive model constructed for a responding target group to measure accuracy of a predicting group's predictions of answers from the responding target group, according to one aspect of the present disclosure. The method 1000 may be implemented on one or more computer system, such as the analysis server 114 and/or the devices 108, 110, 112.

For example, the method 1000 may be implemented by the item module 210, the query module 220, the comparison value calculator 230, the deviation value generator 240, and/or the analysis server 114, and/or the database 116. The method 1000 may also be implemented by a set of instructions stored on one or more computer readable medium that, when executed by a processor, cause the computer system to perform the method. For example, all or part of the method 1000 may be implemented by the CPU 206 and the memory 208. Although the examples below are described with reference to the exemplary process illustrated by the flowchart in FIG. 10, other methods of performing the acts associated with FIG. 10 may be used. For example, the order of some of the steps may be changed, certain steps may be combined with other steps, one or more of the steps may be repeated, and some of the steps described may be optional.

In the depicted implementation, the example method 1000 begins by presenting, during a first feedback session, a content item and at least one question about the content item to a predicting group with a request for the predicting group to also predict a distinct target group's responses to the content item in the future (step 1002). The content item and at least one question about the content item may be presented via interface 500 (FIG. 5) to a predicting group chosen using selection and targeting user interface 608 (FIG. 6). The predicting group may be distinct from the target group and the groups may be selected based on criteria chosen so that no user of the predicting group would be a member of the target group. The users of the predicting group may be presented, via interface 500 (FIG. 5), with a description of criteria identifying the target group, to enable the predicting group to focus on the target group based on the criteria.

In the depicted implementation, the example method 1000 continues by receiving, during the first feedback session, the predicting group's predictions of the target group's future responses (step 1004). In the depicted implementation, the user's responses comprising the predictions are received by the CPU 208 with the user selected selectable prediction indication 510, indicating the responses are the user's predictions of how a member of the target group will respond in the future.

In the depicted implementation, the example method 1000 continues by presenting, during a second feedback session, the same content item and the same at least one question about the content item to the target group with a request for the target group to provide answers directed to their own individual responses (step 1006). The content item and at least one question about the content item may be presented via interface 500 (FIG. 5) to the target group chosen using selection and targeting user interface 608 (FIG. 6). The target group may be distinct from the predicting group and the groups may be selected based on criteria chosen so that no user of the predicting group would be a member of the target group.

In the depicted implementation, the example method 1000 continues by receiving, during the second feedback session, the target group's answers directed to their own individual responses (step 1008). In the depicted implementation the target group's answers comprising their own individual responses are received by the CPU 208 with the user selected selectable individual response indication 512.

In the depicted implementation, the example method 1000 continues by constructing a predictive model of the target group comprising a comparison value determined using only the responses received from the target group during the second feedback session (step 1010). The predictive model of the target group may comprise one or more comparison value 232, 234 and a plurality of deviation values 242, 244. The predictive model of the target group may be constructed by the analysis server 114 using the deviation value generator 240. The system may be configured to store the predictive model of the target group using the database 116 and provide inquirer access to the stored predictive model of the target group.

In the depicted implementation, the example method 1000 continues by using the predictive model of the target group constructed using only the responses received from the target group during the second feedback session to measure accuracy of the first group's predictions received during the first feedback session (step 1012). In the depicted implementation the accuracy of the predicting group's predictions received during the first feedback session may be measured using deviations determined as a function of a comparison value calculated from the responses received from the target group during the second feedback session.

The accuracy of the predicting group's predictions of the target group's answers represent how intensely a user in the predicting group focused on the target group while the user in the first group also focused on the content to answer a question about the content from the perspective of the target group. The predicting group user's level of intensity focusing on the target group correlates with the predicting group user's level of intensity focusing on the content. The predictions by the users of the predicting group that most accurately predicted the target group's responses may be selected as predictions from the users of the predicting group that focused most intensely on the content and which selected predictions and users are most useful to providing access to more accurate market research.

In the depicted implementation, the example method 1000 continues by providing inquirer access to the predictive model of the target group and at least a portion of the most accurate of the predicting group's predictions, for measuring content item effect based on the predictive analytics directed to the at least one question during the first and second feedback sessions and to the predictions during the first feedback session (step 1014).

Figure 11:
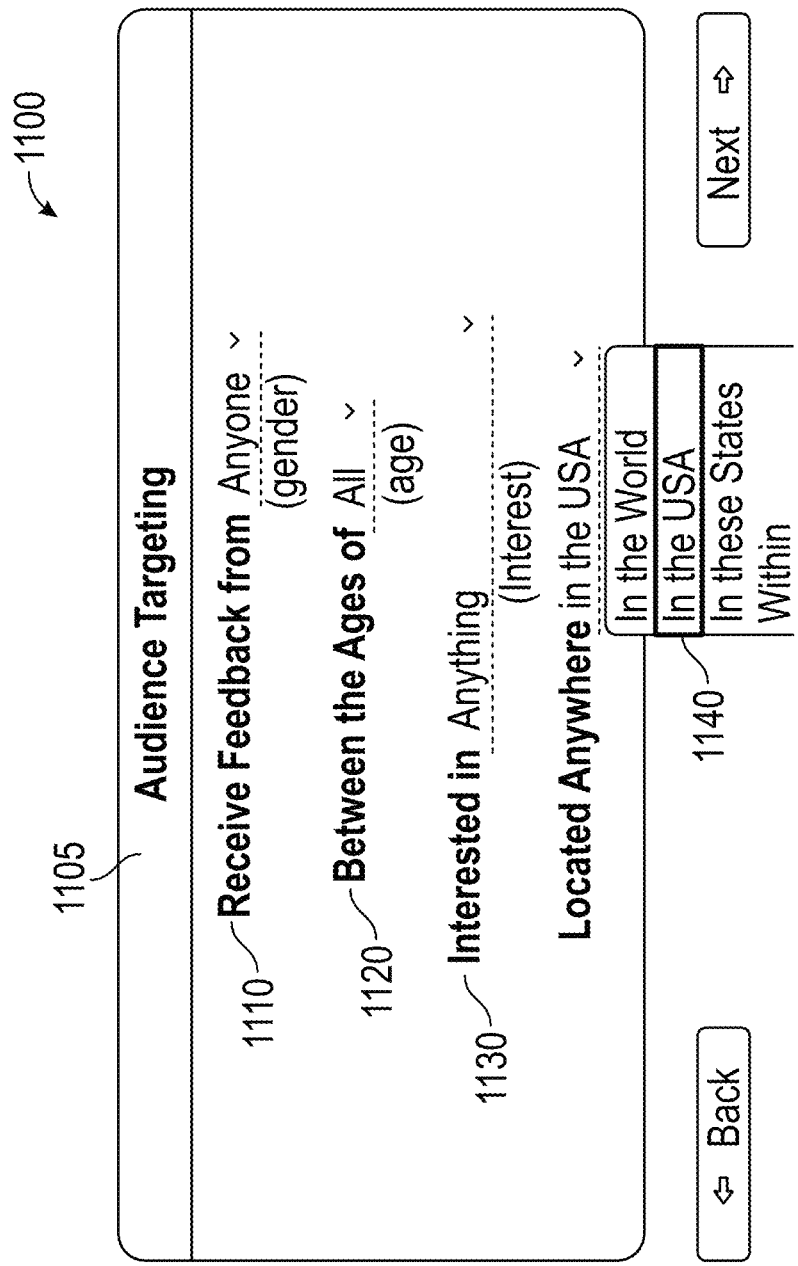
FIG. 11 depicts an exemplary targeting interface implementation configured to permit targeting individuals identified as a function of a plurality of characteristics.

In FIG. 11 the exemplary targeting interface implementation 1100 is configured with selectable audience targeting features 1105 permitting an inquirer to target individuals selected as a function of a plurality of targeting characteristics including gender 1110, age 1120, interest 1130 and location 1140. In the implementation example depicted by FIG. 11 each targeting characteristic is selectable using a drop-down menu comprising a range of choices pertinent to the respective selectable targeting characteristic. For example, the location 1140 targeting characteristic drop-down menu permits selection from locations comprising "in the World", "in the USA", "in these States," and "Within". In an illustrative example, the targeting interface implementation 1100 may be configured to display additional menus or targeting options depending on user input. For example, the targeting interface implementation 1100 may be configured to display a selection of States or a map with a selectable location and radius when a user selects "in these States" or "Within", respectively from the location 1140 drop-down menu. In any case, targeting characteristics received as user input to an exemplary targeting interface implementation 1100 may be communicated to one or more processor. The one or more processor may be configured in the analysis server 114, depicted for example at least by FIG. 1. The one or more processor may use the received targeting characteristics to target individuals having those characteristics for a feedback session. In one embodiment, the inquirer or user may choose a selectable set of interests 1130 for the target. In one embodiment, users (respondents) may select up to 20 interests 1130 when establishing an account. An inquirer may target respondents according to the selected interests 1130. Selected interests 1130 may include interests such as music, movies, television, reading, video games, games, live events, travel, camping, fishing, hunting, biking, sports, cars & trucks, motorcycles, boats. health & wellness, fitness & exercise, alcoholic beverages, food & drink, restaurants cooking, home improvement, home & garden, family, pets, dating, parenting, weddings, beauty, clothing, fashion, shopping, toys, electronics, computers, cameras, smartphones, televisions, entrepreneurship, education, science, health care, personal finance, real estate, internet, advertising & marketing, politics & social issues, charity, and nightlife. A list of interests may be referred to as a user attribute.

In FIG. 12 the exemplary States targeting interface implementation 1200 is configured to target individuals located within selectable predetermined geographic areas 1210 comprising one or more individual States of the United States of America. In the example States targeting interface implementation 1200 depicted by FIG. 12 one or more States may be selected. The selected States may be communicated to one or more processor. The one or more processor may be configured in the analysis server 114. The analysis server 114 may use the received States targeting selections to target individuals located within the selected States for a feedback session. In an illustrative example depicted by FIG. 12, three States are selected: Florida, Illinois and Indiana.

Figure 13:
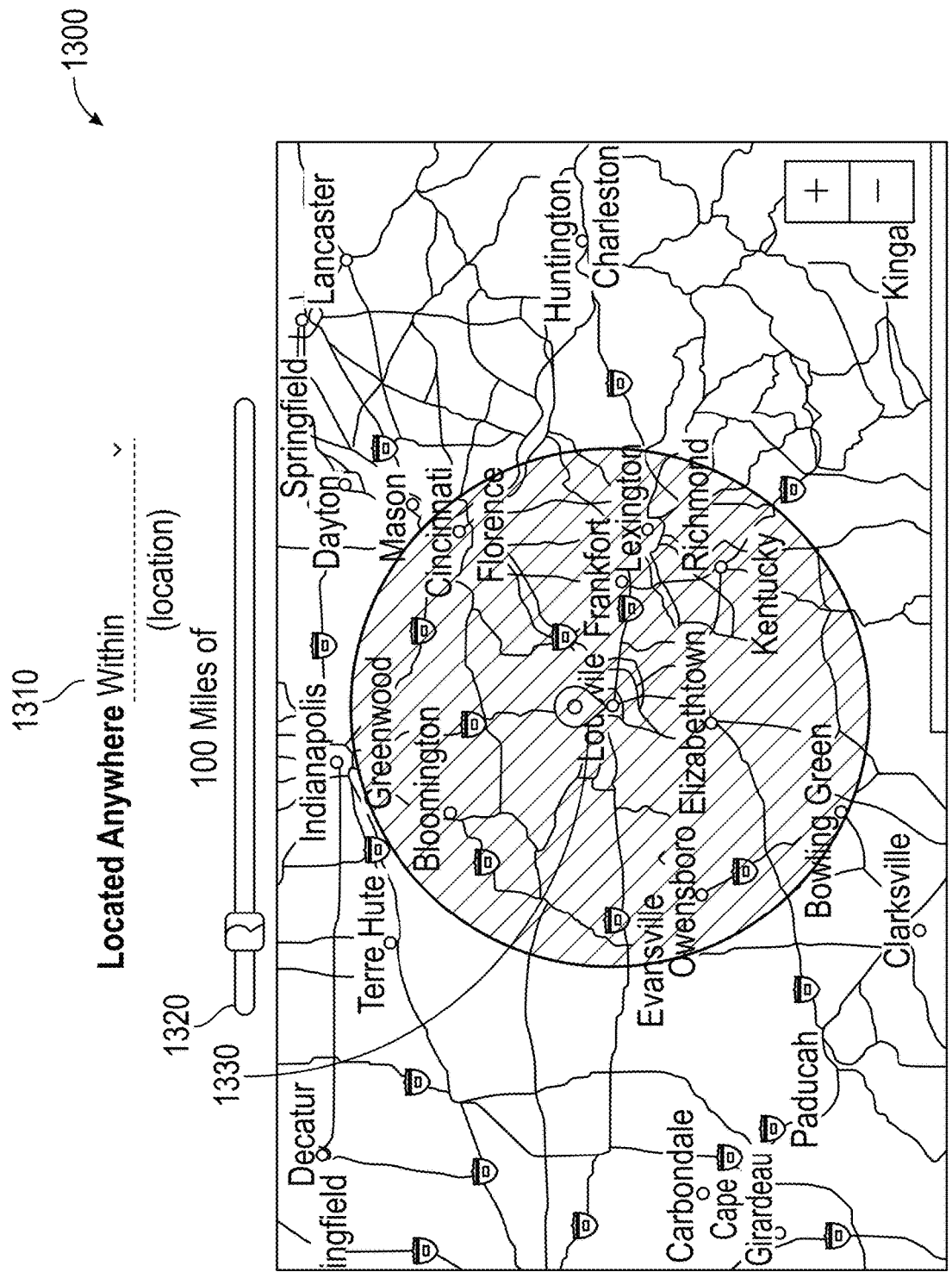
FIG. 13 depicts an exemplary targeting interface implementation configured to target individuals located within a variable radius of a location selected by positioning a point on a map.

In FIG. 13 the exemplary location targeting interface implementation 1300 is configured to target individuals by location 1310 within a variable radius 1320. In the example depicted by FIG. 13 the location 1310 may be selected by positioning the point location 1330 on a map. The selected point location 1330 and radius 1320 may be communicated to one or more processor. The one or more processor may use the received location targeting characteristics comprising point location 1330 and radius 1320 to target individuals within the radius 1320 from the point location 1330 for a feedback session. Referring to FIG. 1, user devices 108, 110, 112 may be configured to capture location data and communicate the location data to the analysis server 114. The user devices 108, 110, 112 may be configured to capture location data from one or more of a GPS sensor, a satellite orbiting Earth, a wireless network access point, a motor vehicle, an electronic billboard or a wireless communication interface configured in a mobile computing device. The analysis server 114 may be configured to use the location data received from the user devices 108, 110, 112 to determine if one or more of the respective users 102, 104, 106 are within the radius 1320 of the point location 1330.

Figure 14:
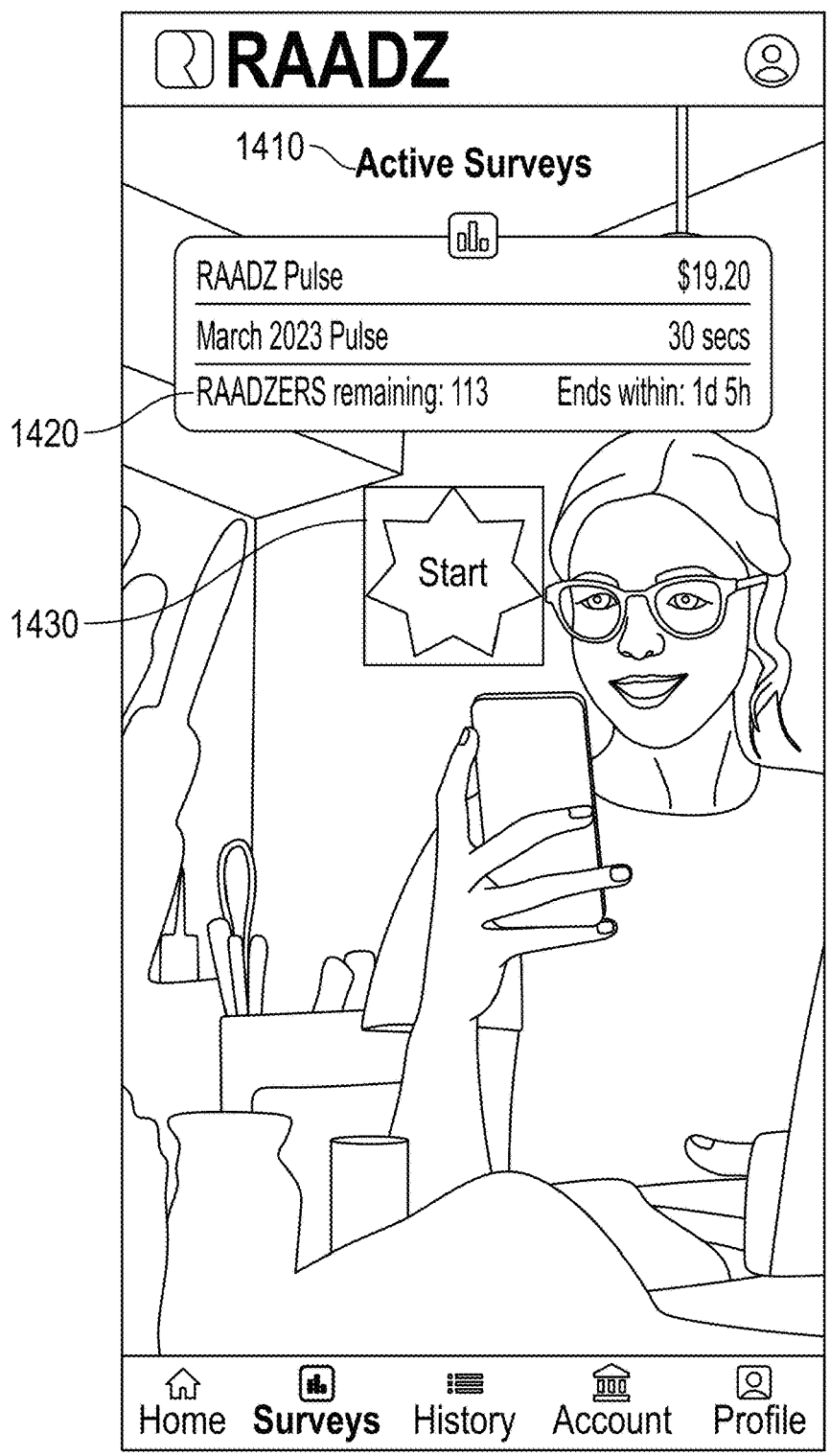
FIG. 14 depicts an exemplary user interface implementation configured to provide an initial visual indication comprising a graphic displayed on an individual user's mobile device to notify the user their feedback session has been initiated and they can proceed to submit predictions or answers in the feedback session.

In FIG. 14 the exemplary user interface implementation 1400 is configured in a mobile app deployed to the user devices 108, 110, 112 (depicted at least by FIG. 1). The depicted user interface implementation 1400 is configured to provide feedback session status to the device user. In FIG. 14 the user interface implementation 1400 presents a user with an indication of feedback session status 1410 comprising the time remaining 1420. In the implementation depicted by FIG. 14 the mobile app shows the initial visual indication 1430 comprising the graphic displayed on the individual user's mobile device. Displaying the initial visual indication 1430 notifies the user their feedback session has been initiated. Notifying the user their feedback session has been initiated informs the user they can proceed to submit predictions or answers in the feedback session.

In the implementation depicted by FIG. 14 the initial visual indication 1430 may remain hidden from the user before the feedback session is initiated. The mobile app may be configured to make the initial visual indication 1430 visible to the user of the mobile device when the feedback session is initiated. The analysis server 114 (depicted at least by FIG. 1) may be configured to indicate to the mobile device user that the feedback session has been initiated. The analysis server 114 may communicate with the mobile app to activate the initial visual indication 1430. The mobile app may configure the initial visual indication 1430 to be visible to the user of the mobile device when the analysis server 114 signals to the mobile app that the feedback session has been initiated.

Figure 15:
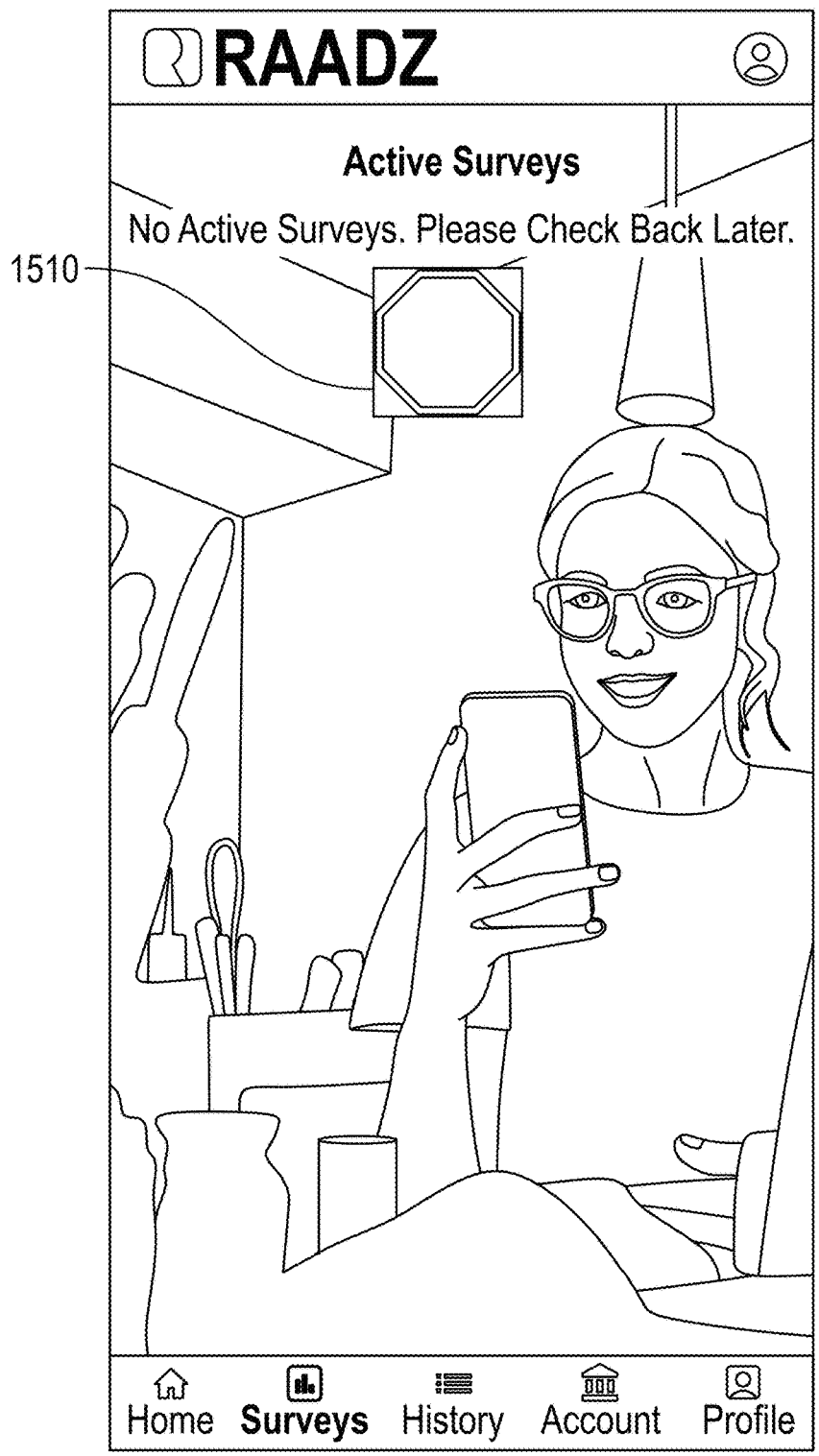
FIG. 15 depicts an exemplary user interface implementation configured to provide a session ending visual indication comprising a graphic displayed on an individual user's mobile device to notify the user their feedback session has concluded and they cannot submit predictions or answers in the feedback session any longer.

In FIG. 15 the exemplary user interface implementation 1500 is configured in a mobile app deployed to the user devices 108, 110, 112 (depicted at least by FIG. 1). The depicted user interface implementation 1500 is configured to provide feedback session status to the device user. In the implementation depicted by FIG. 15 the mobile app shows the session ending visual indication 1510 comprising the graphic displayed on the individual user's mobile device. Displaying the session ending visual indication 1510 notifies the user their feedback session has been concluded or ended. Notifying the user their feedback session has been concluded or ended informs the user they cannot submit predictions or answers in the feedback session any longer. In the implementation depicted by FIG. 15 the session ending visual indication 1510 may remain hidden from the user before a feedback session is initiated. In an illustrative example the mobile app may be configured to display the session ending visual indication 1510 only when a feedback session was active and the active feedback session then ended. In such an example the session ending visual indication 1510 may be hidden when no feedback session is active for the individual user. The mobile app may be configured to make the session ending visual indication 1510 visible to the user of the mobile device when an active feedback session ends.

The analysis server 114 (depicted at least by FIG. 1) may be configured to indicate to the mobile device user that the feedback session has ended. The analysis server 114 may communicate with the mobile app to deactivate the session ending visual indication 1510, thereby hiding the session ending visual indication 1510 from the individual user. For example, the analysis server 114 may be configured to cause the mobile app to hide the session ending visual indication 1510 from the mobile device user while a feedback session is active or when no feedback session has been initiated. The analysis server 114 may be configured to cause the mobile app to display the session ending visual indication 1510 to the mobile device user when the analysis server 114 signals to the mobile app that the feedback session has ended or concluded. An active feedback session may end for a user that moves outside of the selected radius 1320 from a selected point location 1330 (depicted at least by FIG. 13).

For example, the analysis server 114 may use location data received from the user devices 108, 110, 112 to determine if the user device moved outside of the selected radius 1320 from the selected point location 1330. Upon determining the user device moved outside the selected radius 1320 the analysis server 114 may signal the mobile app the active feedback session for that individual user has ended. The mobile app may receive location tracking configuration from the analysis server 114. The location tracking configuration received by the mobile app may comprise the selected point location 1330 and selected radius 1320. The mobile app may be configured to track the device location using the received location tracking configuration.

The mobile app may track the location of the user device based on the received location tracking configuration and real time location data from one or more sensor configured in the user device hosting the mobile app. The mobile app may be configured to display the session ending visual indication 1510 to the mobile device user during an active feedback session when the mobile app determines the user device moved outside of the selected radius 1320 from the selected point location 1330. The mobile app may determine the user device moved outside of the selected radius 1320 from the selected point location 1330 using the received location tracking configuration and real time location data from one or more sensor configured in the user device.

Figure 16:
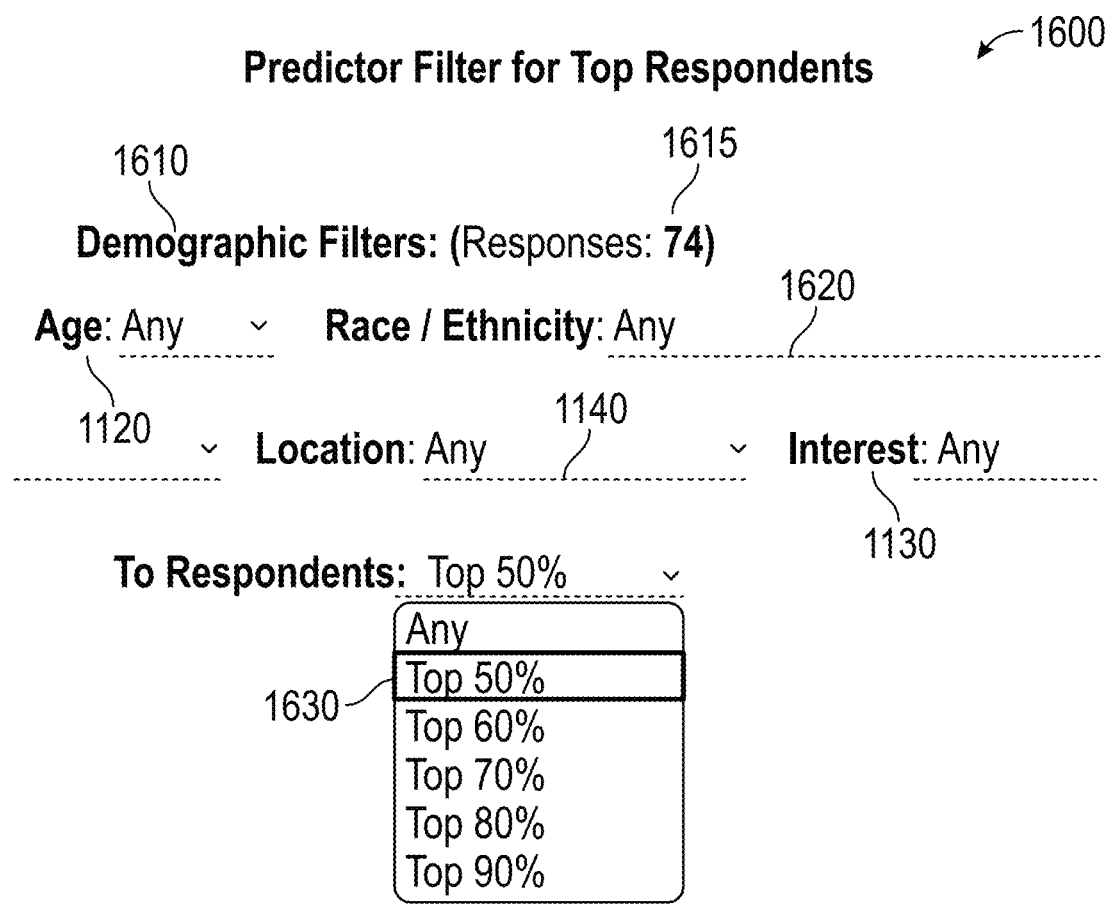
FIG. 16 depicts an inquirer platform interface implementation configured to permit an inquirer to select a portion of top respondents filtered as a function of prediction accuracy.

In FIG. 16 the exemplary inquirer platform interface implementation 1600 is configured to permit an inquirer to select a portion of top respondents filtered as a function of prediction accuracy. The depicted inquirer platform interface implementation 1600 comprises the demographic filters 1610 configured to select a portion of top respondents. In the implementation depicted by FIG. 16 the inquirer platform interface implementation 1600 displays the number of responses 1615 matching the selected characteristics comprising race/ethnicity 1620, age 1120, location 1140 and interest 1130. In the implementation depicted by FIG. 16 the top respondents filter 1630 drop-down menu is configured to select a portion of top respondents filtered as a function of accuracy. For example, in the implementation depicted by FIG. 16 a group of responders has been selected using the demographic filters 1600. The group may be a target group.

The group may be a predicting group. In the depicted embodiment, the drop-down menu offers choices of top 50%, 60%, 70%, 80%, 90%, or anyone. In any case, the group has been selected using the demographic filters 1600 including age 1120 "Any", race/ethnicity 1620 "Any", location 1140 "Any" and interest 1130 "Any". The demographic filters 1600 may be other filters permitting selection by other characteristics in accordance with what would be known by one of ordinary skill.

The demographic filters 1600 may comprise drop-down menus configured to select respondents using multiple different values in line with what has been disclosed herein at least with reference to FIG. 11 for example. In the example depicted by FIG. 16 the number of responses 1615 shows the group selected by the demographic filters 1600 has submitted seventy-four responses. The analysis server 114 (described with reference to at least FIG. 1) may determine a comparison value 232 (described with reference to at least FIG. 2) and sort the responses from the group selected by the demographic filters 1600. The analysis server 114 may sort the responses as a function of a deviation of each response from the comparison value 232. In the example depicted by FIG. 16 the top respondents filter 1630 is configured to select a portion of top respondents filtered as a function of accuracy. In the depicted example the top respondents filter 1630 is shown selecting the top 50% of the responses that were sorted as a function of the deviation of each response from the comparison value 232. In an illustrative example, the top 50% of the responses that were sorted as a function of the deviation of each response from the comparison value 232 are the most accurate 50% of responses.

The analysis server 114 may provide an inquirer with access to the respondents that submitted the most accurate responses, enabling the inquirer to determine content item effect using the most focused responders. For example, the analysis server 114 may provide the inquirer access to an ordered visual representation of the most accurate responders. The ordered visual representation of the most accurate responders may be presented to an inquirer using a graphical display. The ordered visual representation of the most accurate responders may be arranged as a function of accuracy. In an illustrative example individual responders or groups of responders may be represented as graphical objects or icons displayed in a graphical user interface.

The graphical objects or icons representing the individual responders or groups of responders may be displayed or presented to the inquirer in a selection and targeting interface and/or a results display. The graphical objects or icons representing the individual responders or groups of responders may be interactively presented to the inquirer using the selection and targeting interface and the results display. For example, the selection and targeting interface may be configured to permit an inquirer user to display and combine individual user icons by their known characteristics into groups on the selection interface. The selection and targeting interface may be configured to enable the inquirer user to click or select, drag and drop individual user icons into group icons. The individual user icons may display responder characteristics when the inquirer user hovers over or selects one of the icons. In some examples a group icon may display aggregate characteristics of the group of multiple individual responders.

The selection and targeting interface may be configured to permit an inquirer to initiate a feedback session using a group created from individual responders by dragging and dropping individual responder icons into a group. In some examples, a selection and targeting interface may be configured to permit an inquirer user to create responder groups with predetermined characteristics. The predetermined characteristics may be represented by an interactive three-dimensional pie chart showing the distribution of individual characteristics of the responders as segments or slices of the pie, with the vertical dimension of each segment or slice representing the accuracy of the responders. For example, an inquirer may find a rare responder segment that is significantly more accurate than more common responder segments. The disclosed three-dimensional pie chart may enable an inquirer user to identify highly accurate and correspondingly highly focused responders, providing the inquirer access to the most focused responders to determine content item effect.

The results display may be configured to present the inquirer user with an interactive display of individual user icons spatially arranged as a function of prediction accuracy. For example, the individual user icons may be spatially arranged on a scatter plot showing prediction accuracy for a plurality of individual responders on a dependent axis as a function of an ordinal number identifying each content item or question. The individual users' prediction accuracy may be presented on an interactive display showing three-dimensional bar charts or pie charts with the vertical dimension of the chart representing a parameter of the prediction or answer distributions of the responders. The results display may be configured to update the group icons and responder icons as a result of a feedback session or in real time as a feedback session progresses.

For example, individual responders that provide predictions or answers that are statistical outliers may blink, flash, or change color to direct the inquirer user's attention to the outlier. The results display may be configured to update the spatial arrangement of the responder icons from an initial visual arrangement representing historical data obtained from similar responders to visually reorganized responder icons rearranged as a function of prediction accuracy determined from the feedback session. For example, the individual responders could be filtered by various criteria, and the inquirer user could click and drag the individual responders into a potential group and show a prediction for what that potential group might answer to a particular content. The prediction may be based on machine learning using historical data and/or a model trained to infer what a potential group would think about particular content, using content-based and group prediction models). The inquirer may activate such a group for a feedback session. The results display might reorganize the user icons spatially, based on accuracy and location. Icons on the selection and results display might change colors or blink to indicate a result or characteristic, and a user might click into or drill down into groups to individual users and their associated data to display and understand the response characteristics of the individuals and groups.

Prediction group users may be asked multiple questions asking how each prediction group user predicts a population of target members (other users) will answer a survey, and at least one question asking what the prediction group user themselves thinks. Examples of such techniques are described at least with reference to FIGS. 7-25.

Figure 17:
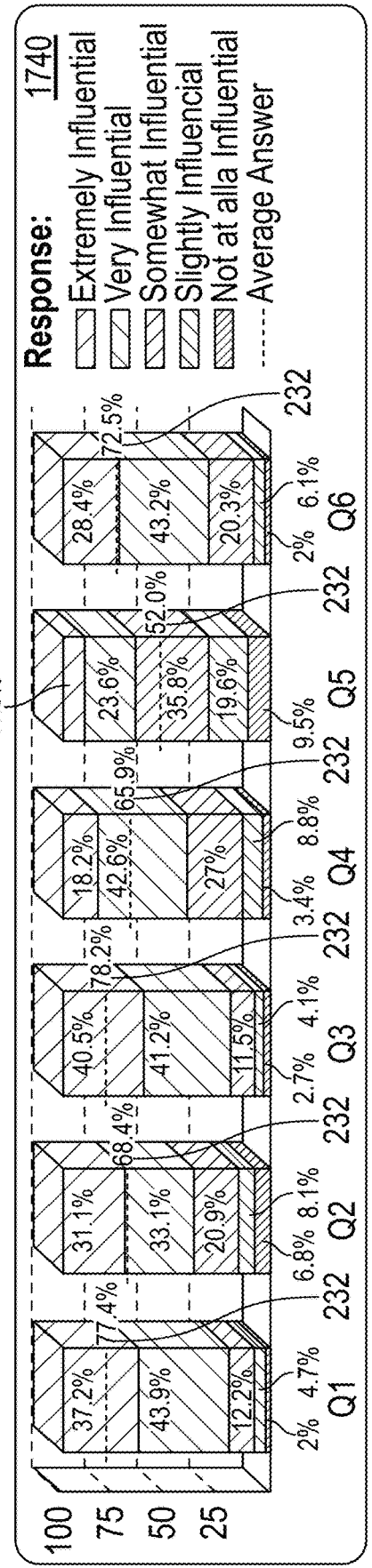
FIG. 17 depicts an exemplary inquirer platform interface implementation presenting exemplary analysis of feedback session results.

In FIG. 17 the exemplary inquirer platform interface feedback session results analysis display implementation 1700 presents results from a feedback session configured by an inquirer using techniques disclosed herein. The analysis display implementation depicted by FIG. 17 includes metadata comprising the assigned feedback session name 1710 and the feedback session summary 1720. The feedback session summary 1720 includes the title/subject, number of responses received and date completed. In the example depicted by FIG. 17 the analysis display implementation 1700 includes the question listing 1730 showing the completed feedback session comprised seven total questions Q1-Q7. In this example answers to the seven questions were recorded from each responder of a selected group. One of the seven questions was directed to each responder personally.

For example, questions 1-6 were directed to each responder's answer concerning their preferences (e.g., the importance of a topic to the responder in an upcoming election) and the 7th question was directed to how likely the responder will be to individually express their preferences by voting in the election. In the example depicted by FIG. 17 the results display 1740 shows the response distribution from the group as a whole for each of the questions 1-6 directed to each responder's answer concerning their preferences. In this present embodiment, responses to the seven questions display graphically listing percentages according to the categories: (1) extremely influential; (2) very influential; (3) somewhat influential; (3) slightly influential; (4) not influential; and (5) an average response 232. As described above, the inquirer selects users according to a specific geographic location using location sensor data for a real time analysis of user preferences and survey question answers. In one embodiment, the graphical analysis 1740 is color coded. In the implementation depicted by FIG. 17 the responses to the questions directed to each responder's answer concerning their preferences (i.e. questions 1-6) are presented spatially organized as a function of the individual responses' deviation from the comparison value 232.

Figure 18:
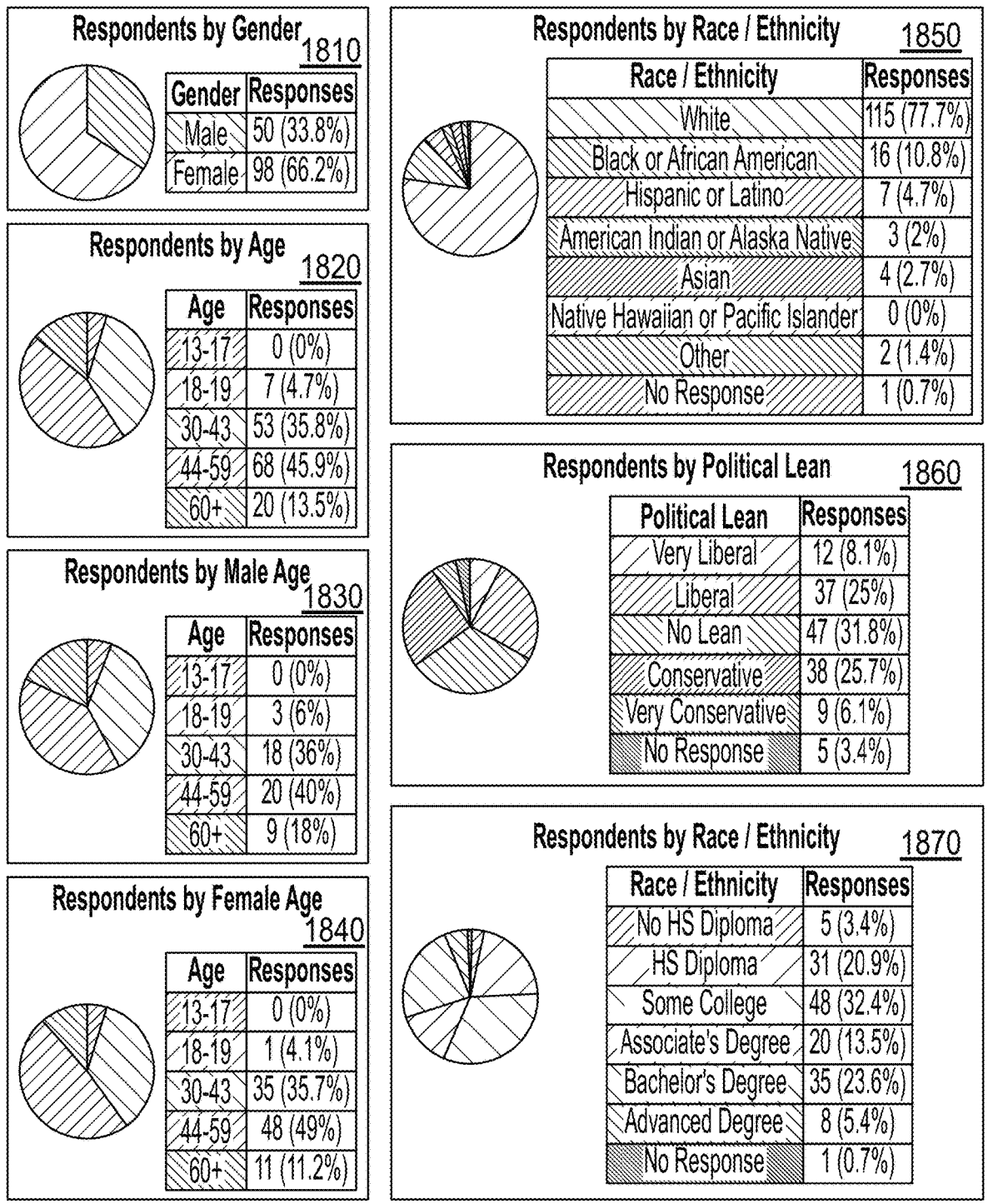
FIG. 18 depicts an exemplary inquirer platform interface implementation presenting a portion of a results summary for the feedback session referenced by FIG. 17.

In FIG. 18 the exemplary inquirer platform interface implementation 1800 presents a portion of a results summary for the feedback session referenced by FIG. 17. The inquirer platform interface implementation 1800 results summary includes pie chart and tabular distributions of respondents independent of accuracy and without reference to a comparison value. In the example depicted by FIG. 18 the results summary includes pie chart and tabular distributions of respondents by gender 1810, age 1820, male ages 1830, female ages 1840, race/ethnicity 1850, political lean 1860 and education 1870.

In FIG. 19 the exemplary inquirer platform interface implementation 1900 presents another portion of the results summary for the feedback session referenced by FIG. 17. The inquirer platform interface implementation 1900 results summary includes tabular distributions of respondents by location 1910 and respondents by interest 1920. FIG. 19 illustrates an example of a second summary screen for a feedback session response of users, according to one aspect of the present disclosure. In the example 1900, shows an analysis of states 1910 and interests 1920.

FIGS. 20-22 depict an exemplary inquirer platform interface implementation presenting ordered visual representations of portions of a plurality of individual predictions from a plurality of predicting group users directed to how the target group will respond, arranged as a function of accuracy. FIG. 20 illustrates an example inquirer screen showing a first feedback response to a first question. FIG. 21 illustrates an example inquirer screen showing a second feedback response to a first question. FIG. 22 illustrates an example inquirer screen showing a third feedback response to a first question Q1-1. The exemplary predictions depicted by FIGS. 20-22 represent responses to the first (Q1) of the six (Q1-Q6) questions in the feedback session that were directed to each responder's answer concerning their preferences, described at least with reference to FIG. 17. That is, the responses depicted by FIGS. 20-22 are responses to Q1 (depicted by FIG. 17). In FIGS. 20-22 the depicted responses are presented spatially organized as a function of the individual responses' deviation from the comparison value 232. In an illustrative example, responses to the questions Q2, Q3, Q4, Q5 and Q6 from the same feedback session as Q1 could be presented in ordered visual representations similar to FIGS. 20-22 (not shown). In FIG. 20, the results display 2000 includes three-dimensional bar chart distributions of the responses to Q1 for the group 2010, by gender 2020 and by age 2030. In FIG. 21, the results display 2100 includes three-dimensional bar chart distributions of the responses to Q1 by male age 2110, by female age 2120 and by education 2130. In FIG. 22, the results display 2200 includes three-dimensional bar chart distributions of the responses to Q1 by political lean 2210 and by race/ethnicity 2220. In FIGS. 20-22 the responses are presented spatially organized as a function of the individual responses' deviation from the comparison value 232.

FIGS. 23-25 depict an exemplary inquirer platform interface implementation presenting ordered visual representations of portions of a plurality of individual answers from a plurality of target group members directed to the individual target group members' own responses arranged as a function of accuracy. The exemplary answers depicted by FIGS. 23-25 represent responses to the 7th question (Q7) in the feedback session directed to the individual target group members' own responses. FIG. 23 illustrates an example inquirer screen showing a first, second, and third feedback response to a seventh personal question. FIG. 24 illustrates an example inquirer screen showing a second feedback response to a seventh personal question. FIG. 25 illustrates an example inquirer screen showing a third feedback response to a seventh personal question. In FIG. 23 the results display 2300 includes a three-dimensional bar chart showing distributions of the individual answers 2310 from the group to the question directed to each member's own response, without reference to a comparison value. In FIG. 23, the results display 2300 includes three-dimensional bar chart distributions of the responses to Q7 by gender 2320 and age 2330. In FIG. 24, the results display 2400 includes three-dimensional bar chart distributions of the responses to Q7 by male age 2410, female age 2420 and education 2430. In FIG. 25, the results display 2500 includes three-dimensional bar chart distributions of the responses to Q7 by political lean 2510 and race/ethnicity 2520. In FIGS. 23-25 the responses by gender 2320, age 2330, male age 2410, female age 2420, education 2430, political lean 2510 and race/ethnicity 2520 are presented spatially organized as a function of the individual responses' deviation from the comparison value 232.

Although various features have been described with reference to the Figures, other features are possible. For example, an exemplary implementation in accordance with the present disclosure may comprise presenting a content item from an inquirer to a predicting group comprising users in a first feedback session, said content item comprising at least one question directed to the users' responses to the content and a request for each user to provide predictions of how a member of a distinct responding target group will respond to the content item if members of the target group were presented the content item in the future, receiving, during the first feedback session, the first group's predictions of the target group's future responses, presenting, during a second feedback session, the same content item and the same at least one question about the content item to the target group with a request for the target group to provide responses directed to their own responses, receiving, during the second feedback session, the target group's responses directed to their own responses, constructing a predictive model of the target group comprising a comparison value determined using only the responses received from the target group during the second feedback session, using the predictive model of the target group to measure accuracy of the first group's predictions received during the first feedback session, and providing inquirer access to the predictive model of the target group and at least a portion of the most accurate of the first group's predictions, for measuring content item effect based on the predictive analytics directed to the at least one question during the first and second feedback sessions and to the predictions during the first feedback session.

Various implementations may comprise a system, method, and apparatus configured to select and sort users that respond to content items. The disclosed system, method, and apparatus encourages individuals to respond to content items by allowing users to easily access content items and provide responses using a website, web application, or mobile app. For example, the disclosed system, method, and apparatus may encourage individuals to view content items and participate in questioning regarding the viewed content items. The disclosed system, method, and apparatus may also select the most thoughtful responses to questions regarding the content items and provide a content inquirer with access to the most thoughtful responses and a predictive model of the responding target group.

In one implementation, a method of selecting the most thoughtful responses to questions concerning content items includes causing, via a processor, a content item to be presented at a number of user devices to a number of users during a feedback session. The method then includes receiving, via the user devices, a response from each of the number of users in response to a query included in or regarding the item. A response may be a response directed to a user's own response to a question concerning content. A response may be a prediction directed to the user's prediction of how a member of a distinct target group might respond to the question concerning the content, in the future. The response may comprise a numeric, alphabetic, or alphanumeric, response. The response may comprise an input to a graphical user interface coupled with a processor.

A predictive model comprising a comparison value is then constructed, via the processor, for the responses from the number of users. The response from the number of users may comprise answer values. A deviation value is then determined, via the processor using the predictive model for each of the users, between the respective answer value for each user and the comparison value. The predictive model may further comprise a plurality of deviation values. The predictive model may be used by an inquirer for predictions of content item effectiveness based on classification, regression analysis, or other analytic techniques known in the art such as classification and regression trees (CART). The method then includes sorting, via the processor, the number of users based on their respective deviation values such that a lower position in the sorted list of deviation values corresponds to a lower deviation value and selecting at least one user associated with a lower position in the sorted list of deviation values as a user that provided a more thoughtful response, via the processor.

In another implementation, an apparatus is provided for selecting users that responded most thoughtfully to questions regarding content items including a processor and a memory storing instructions which, when executed by the processor, cause the processor to cause a content item to be presented at a number of user devices to a number of users during a feedback session. The instructions may then cause the processor to receive, via the user devices, a response comprising an answer value from each of the number of users in response to a query comprising at least one question included in or regarding the item. The instructions may then cause the processor to construct a predictive model comprising a comparison value and deviation values for the responses from the number of users. The processor then determines, for each of the users, the deviation values between the respective answer value for each user and the comparison value, using the comparison value. The instructions then cause the processor to sort the number of users based on their respective deviation values such that a lower position in the sorted list of deviation values corresponds to a lower deviation value, and to select at least one response from a user associated with a lower position in the sorted list of deviation values as a more thoughtful response.

Various implementations designed in accordance with the present disclosure may improve the accuracy of market research results provided to an inquirer, such as but not limited to a content provider, social media influencer, advertiser, politician, pollster, or publisher. Such improved market research results accuracy may be a result of providing an inquirer market research results from responders that focused most intensely on the content when giving their answers about the content. Such market research from responders that focused most intensely on the content when giving their answers about the content may be more accurate market research, improving an inquirer's efficiency of budget utilization and limiting exposure to wasted advertising funds that might have been spent on less effective content.

An implementation in accordance with the present disclosure may be configured for providing inquirers access to market research from users that most intensely focused on content, based on measuring accuracy of a first group's predictions of answers from a target group distinct and excluded from the first group, for the same content and question about the content, selecting as most intensely focused the first group users that most accurately predicted the target group member's answers, and providing an advertiser with access to market research results from the most intensely focused users of the first group. Providing an advertiser with access to market research from the users most intensely focused on the content may be a result of using a predictive model of the target group to measure the accuracy of the first group's predictions of the target group's answers, as a proxy for measuring how intensely the first group users focused on the content. The predictive model of the target group may be refined based on removing one or more outlier from data used to construct the predictive model, to improve accuracy of measuring the first group's predictions using the predictive model.

The accuracy of the first group's predictions of the target group's answers represent how intensely a user in the first group focused on the target group while the user in the first group also focused on the content to answer a question about the content from the perspective of the target group. The first group user's level of intensity focusing on the target group correlates with the first group user's level of intensity focusing on the content. An implementation in accordance with the present disclosure may measure the accuracy of the first group's predictions of the target group's answers by presenting the same content and question about the content to the first group and the target group, determining the first group's predictions of the target group's responses, determining the target group's responses, constructing a predictive model of the target group comprising a comparison value for the target group's responses, using the predictive model of the target group to evaluate the accuracy of the first group's predictions based on deviations of the first group's predictions from the comparison value determined for the target group's responses, and identifying those predictions of the first group that predicted the target group's responses most accurately. The predictions by the users of the first group that most accurately predicted the target group's responses may be selected as predictions from the users of the first group that focused most intensely on the content and which selected predictions and users are most useful to providing access to more accurate market research.

The first group and the target group may be distinct and exclusive from each other as a result of selection criteria distinguishing the first group from the target group. The selection criteria distinguishing the first group from the target group may be criteria chosen using a selection and targeting interface. The criteria distinguishing the first group and the target group may comprise demographic criteria such as, for example, location, gender, age, occupation, education, or any other useful selection and targeting criteria as may be known by one of ordinary skill in the pertinent art. The distinct groups may be selected based on criteria chosen so that no user of the first group would be a member of the target group. The users of the first group may be presented, via a user interface, with a description of criteria identifying the target group, to enable the first group to focus on the target group based on the criteria.

Content may be selectively presented to the first group and target group such that no selected member of the target group will have been presented with the content when the first group's predictions for the target group's answers are received. For example, account records that identify content that has been shown to particular responders may be used to automatically select responders that have not yet been presented with particular content. The first group may be specifically requested via a user interface to give a response representing the users' predictions of how a member of the target group might respond to the content item in the future. The first group or the target group may be specifically requested via a user interface to provide a response directed to their own response to the question regarding a content item. The first group may be presented with a user interface comprising a distinct user selectable indication that the response provided is the user's prediction of how a member of the target group will respond in the future. The predictions may be received by a processor with the user selected indication that the answer provided is the user's prediction of how a member of the target group will respond in the future. The first group may be presented with a user interface comprising a distinct user selectable indication that the response provided is directed to the first group user's own response to the question regarding a content item. The target group may be presented with a user interface comprising a distinct user selectable indication that the response provided is directed to the target group member's own response to one or more question regarding a content item. The response may be received by a processor with the user selected indication that the response provided is directed to the responder's own response to one or more question regarding a content item.

The first group and the target group may be presented with a user interface comprising a user selectable indication of the degree of difference between the responder's response and the response of an average user in their own group as selected by the implementation. The selection and targeting interface may be configured to select only users of the first group that are separated by a minimum distance or a maximum distance. The selection and targeting interface may be configured to select only members of the target group that are spatially separated by a minimum distance or a maximum distance. User location information based on sensor systems such as, for example, Global Positioning System (GPS) may be used by a processor to determine a minimum or maximum separation distance for selecting users. For example, the minimum distance or maximum distance may be any useful distance. The selection and targeting interface may be configured to select a minimum number or maximum number of users of the first group. The selection and targeting interface may be configured to select a minimum number or maximum number of members of the target group.

Some implementations may treat as an outlier one or more response from a user indicating their answer might deviate substantially from an average user of their own group, or from the majority of their own group. Such an answer from a user indicating their answer might deviate substantially from an average user of their own group may be removed before determining a comparison value. An implementation may be configured to identify as an outlier one or more answer or prediction that deviates more than a predetermined percentage from a comparison value. Such an outlier answer or prediction that deviates more than a predetermined percentage from a comparison value may be removed and a subsequent comparison value determined that does not take into account such outlier. Such a refined or purified comparison value may increase the usefulness of accuracy measurements in line with what has been discussed herein.

In an illustrative example, an implementation may be configured to select as a target group those users of a population that provided responses having deviations within the range of deviations of the responses provided by the majority of the population. In this example implementation the majority group may be identified by responses comprising a majority range of answer values, and the non-majority may be identified by responses comprising a non-majority range of answer values. In some scenarios, a non-majority range of answer values may not overlap a majority range of answer values. Continuing this example, the sense of the majority and non-majority ranges may be reversed. For example, the target group may be selected as a non-majority group, and the predicting group may be the non-majority. An exemplary method may construct a predictive model of a target group based on responses from the target group, use the predictive model to measure the accuracy of a predicting group's predictions of the target group's responses, and provide an inquirer access to the predictive model and the most accurate of the predicting group's predictions of the target group's responses, to generate predictive analytic content effectiveness output determined as a function of content item input.

An implementation in accordance with the present disclosure may be configured to provide Market Research with more accurate results, based on a new survey method disclosed and claimed herein. An implementation in accordance with the present disclosure may be referred to as RAADZ. An implementation of RAADZ may encourage respondents to provide more thoughtful responses. Questions may be answered by predicting the average response from all responses, and responses may be selected for market research based on the degree of thoughtfulness. RAADZ may ask users to respond providing an average response of selected others, instead of their own response. RAADZ may ask users to respond predicting the responses of a distinct and separate target group, instead of their own response.

In an illustrative example, an implementation of the RAADZ Methodology may be designed to focus on providing the response of the majority vs. the individual respondent, or one group's prediction of what another group's response about the same content will be in the future. In an illustrative example, the RAADZ Methodology focuses on leveraging the False Consensus Effect. In psychology, the false consensus effect, also known as consensus bias, is a pervasive cognitive bias that causes people to "see their own behavioral choices and judgments as relatively common and appropriate to existing circumstances." In an illustrative example, the RAADZ method may ask respondents to predict the average response from all respondents, providing a way to grade/evaluate responses that are closest. Grading/evaluating responses that are closest to an average response from all respondents or most accurately predict responses from a separate and distinct responding target group may provide more accurate market research as a result of limiting or mitigating effects of Social Desirability Bias. Social Desirability Bias is a type of response bias that is the tendency of survey respondents to answer questions in a manner that will be viewed favorably by others, taking the form of over-reporting "good behavior" or under-reporting "bad", or undesirable behavior, which may pose a serious problem by interfering with the interpretation of average tendencies as well as individual differences. In an illustrative example, the RAADZ method is particularly effective for topics that are controversial, as a result of mitigating effects of Social Desirability Bias and/or the False Consensus Effect.

In an illustrative example, consider a local business wants to build a park in a selected neighborhood to increase foot traffic to his local business and advertises for doing so in the selected neighborhood. To create the most effective advertising for building the park and using an implementation in accordance with the present disclosure, the business/advertiser would ask each person in the neighborhood not what they personally think of the advertisement for building the park in the neighborhood but what each individual thinks the other neighbors (users) in the neighborhood think of the advertisement for building the park. No one person could determine in their mind what each individual user thinks the plurality of neighbors (users) will think of the advertisement and respond. The personal favorable rating of the person predicting what their neighbors think may be different from what they personally think of the advertisement, perhaps as a result of False Consensus Effect and/or Social Desirability Bias. Accordingly, no individual could measure in their mind the cumulative responses of what individual users think the neighbors' responses to the advertisement will be, nor provide a measurement and subsequent ranking of those responses and limit or mitigate False Consensus Effect and/or Social Desirability Bias, to provide more accurate market research.

In illustrative examples, an exemplary RAADZ implementation may be configured with a unique platform design enabling quick and easy set-up and deployment through intuitive/non-technical content and question creation screens. An exemplary RAADZ implementation may be configured with a simple respondent user interface designed to be quick and easy to use when responding to questions, eliminating fatigue associated with other platforms. In some scenarios an exemplary RAADZ implementation may be configured with an on demand RAADZ respondent pool permitting access to RAADZ respondents willing to participate in a variety of scenarios. An exemplary RAADZ implementation may be deployed using a RAADZ App configurable in an Android or iOS platform environment to provide easy access to new available content and questions when respondents are on the go, for example, a respondent may be able to provide a response using RAADZ while waiting in line to get coffee.

In one embodiment, a graphical user interface displays icons configured to permit the inquirer to logically partition or segregate users into groups based on characteristics/interests and visualize the accuracy of the users' responses, enabling the inquirer to visually select and target the most accurate users. In one embodiment, the graphical user interface displays icons in the selection and targeting interfaces.

The user icons or group icons may be an extension of the inquirer platform interface. In one embodiment, user icons may be configured to move around or change color in a graphical user interface as users are selected, or as a function of accuracy or location as responses are evaluated. In one embodiment, user icons might move around or change color as an inquirer selects a location and radius, where at least one icon is created populating a user group and target member group. In one embodiment for icons, users and target members are located physically in a certain geographic location having a radius in real time as determined by a GPS device.

In one embodiment, a machine learning implementation may be configured to use a graphical user interface for displaying icons. The machine learning implementation may be configured to logically partition or segregate users into groups based on inquirer selected characteristics. The machine learning implementation may be configured to logically partition or segregate users into groups based on the accuracy of the users' responses to provide the inquirer the most accurate users and target members who are located physically in a certain geographic location having a radius in real time as determined by a GPS device. In one embodiment, the machine learning software may access a database to select from a plurality of users' responses for providing the inquirer the most accurate users and target members who are located physically in a certain geographic location having a radius in real time as determined by a GPS device.

In one embodiment, the machine learning implementation may be configured to use unsupervised learning for clustering, anomaly detection, dimensionality reduction, or recommender systems to create at least one icon of the most accurate users and/or target members who are located physically in a certain geographic location having a radius in real time as determined by a GPS device. In one embodiment, the machine learning implementation may be software configured to use supervised learning for multiple linear regression, logistic regression, neural networks, and decision trees to create at least one icon of the most accurate users and/or target members who are located physically in a certain geographic location having a radius in real time as determined by a GPS device.

In one embodiment, a prediction of what a potential group would think about particular content may be based on machine learning using historical data and/or a model trained to infer using content and group predictions to activate a group for a feedback session. The results display may be configured to reorganize the user icons spatially, based on accuracy and location.

In one embodiment, a machine learning implementation may be configured using TENSORFLOW to perform multi-class classification to infer what a potential group would think about particular content using content and group predictions to activate a group for a feedback session. In one embodiment, decision trees and tree ensemble methods, including random forests and boosted trees may be configured to perform multi-class classification to infer what a potential group would think about particular content using content and group predictions to activate a group for a feedback session.

Techniques disclosed herein may be implemented as a process, apparatus, or article of manufacture. For example a method implementation may comprise: receiving a content item from an inquirer, using a processor; deploying a mobile app to a plurality of devices associated with a plurality of users; placing the content item on an advertising web platform comprising an inquirer platform interface, using the processor, said inquirer platform interface comprising a selection and targeting interface configured to permit the inquirer to select from the plurality of users a predicting group comprising predicting group users, a predicting group location, gender, and age, a minimum number or maximum number of the predicting group users and a predetermined radius for a selected location corresponding to the predicting group users; said selection and targeting interface further configured to permit the inquirer to select, from the plurality of users, target group members of a responding target group, a target group location, gender, and age, a minimum number or maximum number of the target group members and a predetermined radius for a selected location corresponding to the target group members, wherein at least one member of the target group members has a location, gender, or age distinct from the predicting group location, gender and age and no user of the predicting group users is a member of the target group members; receiving user location information for the predicting group users and the target group members based on GPS sensor data from the devices of the predicting group users and the target group members, using the processor; initiating a first feedback session to the predicting group users within the predetermined radius based on the GPS sensor data from the devices of the predicting group users, so that the predicting group users can submit predictions, presenting the content item in the first feedback session to the predicting group users, using a plurality of content user interfaces, a plurality of answer interfaces operable in a plurality of displays configured in the deployed mobile app of the devices of the predicting group users, wherein each content user interface comprises a plurality of user operable content display controls comprising: a volume scale, pause button, play button, and full size button configured to make the content item fit the content interface display, wherein each answer interface of the plurality of answer interfaces is inoperable until a predicting group user of the predicting group users completes viewing the content item presented in the content user interface, said content item comprising at least one question directed to the predicting group users own responses concerning the content item and a requirement for each of the predicting group users to provide a prediction of how a member of the target group members will respond to the content item if the target group members are presented the content item in the future, using the processor, wherein the selection and targeting interface is further configured to ensure that no selected member of the target group members will have been previously presented with the content when the predicting group users' predictions are received by the processor, presenting, to the predicting group users via the content user interface, the target group location, gender and age, using the processor; receiving, from the predicting group users, a first plurality of responses in the plurality of answer interfaces to the at least one question and prediction, using the processor, wherein each of the first plurality of responses received by the processor comprise a user selected indication, from a user of predicting group users, a prediction of how a member of the target group members will respond in the future to the at least one question concerning the content item, and wherein each answer interface of the plurality of answer interfaces is configured to receive a response comprising at least one of: a bubble response selected from a plurality of bubble responses, a check box response selected from a plurality of checkbox responses, one or more sliding scale response, a response selected from a plurality of predetermined responses, or a fill in or type in response; concluding the first feedback session so that individual users of the predicting group users can no longer submit predictions if the individual users of the predicting group users moves beyond the predetermined radius, using the processor and the GPS sensor data from the devices of the predicting group users, otherwise, continuing the first feedback session, comprising: determining a first predictive model comprising a first comparison value calculated from the first plurality of responses, using the processor; determining a first plurality of deviation values in the first predictive model, wherein each deviation value of the first plurality of deviation values is respectively a deviation between each response of the first plurality of responses and the first comparison value, using the processor; sorting and storing in a database operably coupled with an analysis server operably coupled to the inquirer platform interface, the first plurality of responses according to the respective first plurality of deviation values, wherein a lower position in the sorted first plurality of responses corresponds to a lower deviation value, using the processor; and using the inquirer platform interface to provide the inquirer the stored data for the inquirer to measure content item effect.

The first plurality of responses may only comprise a plurality of responses directed to the predicting group users' own responses concerning the content item, wherein the responses may be received with a plurality of user selected indications that the responses are the predicting group user's own responses, using the processor, and wherein the method may further comprise: determining a second predictive model comprising a second comparison value calculated from the plurality of responses directed to the predicting group users' own responses concerning the content item, using the processor; determining a second plurality of deviation values in the second predictive model, wherein each deviation value of the second plurality of deviation values is respectively a deviation between the second comparison value and each response of the plurality of responses directed to the predicting group users' own responses concerning the content item, using the processor; sorting the first plurality of responses according to the respective second plurality of deviation values, wherein a lower position in the sorted first plurality of responses corresponds to a lower deviation value, using the processor; and providing the inquirer access to the second predictive model and at least a portion of the sorted first plurality of responses selected as a function of the second comparison value, using the processor, to measure content item effect based on the responses to the at least one question using the processor.

The first plurality of responses may only comprise a plurality of responses representing the predicting group users' prediction of how a member of the target group members will respond to the content item in the future, wherein the responses may be received with a plurality of user selected indications that the responses are the predicting group user's prediction of how a member of the target group members will respond in the future, using the processor, and wherein the method may further comprise: determining a third predictive model comprising a third comparison value calculated from the plurality of responses representing the predicting group users' prediction of how a member of the target group members will respond to the content item in the future, using the processor; determining a third plurality of deviation values in the third predictive model, wherein each deviation value of the third plurality of deviation values is respectively a deviation between the third comparison value and each response of the plurality of responses representing the predicting group users' prediction of how a member of the target group members will respond to the content item in the future, using the processor; sorting the first plurality of responses according to the respective third plurality of deviation values, wherein a lower position in the sorted first plurality of responses corresponds to a lower deviation value, using the processor; and providing the inquirer access to the third predictive model and at least a portion of the sorted first plurality of responses selected as a function of the third comparison value, using the processor, to measure content item effect based on the prediction, using the processor.

The method may further comprise: presenting the content item and the at least one question to a plurality of selected members of the target group members during a second feedback session with a requirement for each member of the target group members to provide a response representing their own response concerning the content item, using the processor; receiving, from the plurality of selected members of the target group members during the second feedback session, a second plurality of responses to the at least one question, using the processor, wherein the responses are received with a plurality of member selected indications that the responses are a member's, of the target group members, own responses; determining a fourth predictive model comprising a fourth comparison value calculated from the second plurality of responses, using the processor; and providing the inquirer access to the fourth predictive model to measure content item effect based on the responses to the at least one question during the second feedback session, using the processor.

The method may further comprise: determining a fourth plurality of deviation values in the fourth predictive model, wherein each deviation value of the fourth plurality of deviation values is respectively a deviation between the fourth comparison value and each response of the plurality of responses representing the users' prediction of how a member of the responding target group members will respond to the content item in the future, using the processor, wherein the prediction were received from users of the predicting group during the first feedback session; sorting the plurality of prediction received from users of the predicting group during the first feedback session according to the respective fourth plurality of deviation values, wherein a lower position in the sorted plurality of prediction corresponds to a lower deviation value, using the processor; and providing the inquirer access to at least a portion of the sorted plurality of prediction selected as a function of the fourth comparison value, using the processor, to measure content item effect based on the responses to the at least one question during the first and second feedback sessions and the prediction during the first feedback session, using the processor.

The method may further comprise providing the inquirer access to a portion of the sorted plurality of prediction that have respective deviations not greater than a predetermined percentage deviation from the fourth comparison value, using the processor.

The predetermined percentage deviation may be received from the inquirer.

The predetermined percentage deviation may be in a range of ten to twenty-five percent.

The content item may be selected by the inquirer from a plurality of content items.

The first comparison value may further comprise an average, median, or mode.

Each deviation value may be a difference between the first plurality of responses and the first comparison value.

The first comparison value may be calculated when a feedback session concludes, using the processor.

The method may further comprise concluding a feedback session when a predetermined number of responses have been received, using the processor.

The content item may further comprise an advertisement, a poll, a political question, a song, a lyric, a video, an image, a sound, a portion of text, a movie, a book, a title, a product design, or a logo.

The predicting group users may be selected based on a location distinct from a location of the target group members, using the processor.

The predicting group users may be selected based on a gender distinct from a gender of the target group members, using the processor.

The method may further comprise receiving an indication via a user interface from at least one responding target group member of the target group members that the respective response received from the at least one responding target group member might deviate substantially from an average response of a majority of the target group members, using the processor, wherein determining the first predictive model further comprises calculating the first comparison value when a predetermined number of responses from the target group members have been received, using the processor, wherein calculating the first comparison value further comprises removing the at least one responding target group member's response from the plurality of responses from the target group members before calculating the first comparison value.

A method implementation may comprise: receiving a content item from an inquirer, using a processor; deploying a mobile app configured to present and review the content item in at least one feedback session to a plurality of devices associated with a plurality of users; placing the content item on an advertising web platform comprising an inquirer platform interface, using the processor, said inquirer platform interface comprising a selection and targeting interface configured to permit the inquirer to select from the plurality of users, a predicting group comprising predicting group users identified by a plurality of characteristics comprising a predicting group location and a location radius; said selection and targeting interface further configured to permit the inquirer to select, from the plurality of users, a target group comprising target group members identified by a plurality of characteristics comprising at least one characteristic distinct from the predicting group plurality of characteristics and wherein no member of the target group members is a user of the predicting group users; receiving user location information for the predicting group users and the target group members based on sensor data from the devices of the predicting group users and the target group members, using the processor; initiating a first feedback session comprising: providing an initial visual indication comprising a graphic displayed on the mobile device of each user of the predicting group users within the location radius based on the sensor data from the devices of the predicting group users, said visual indication configured to notify the predicting group users they can submit predictions; presenting the content item and at least one of the plurality of characteristics of the target group in the first feedback session to the predicting group users, using a plurality of content user interfaces comprising a plurality of graphical user displays in a plurality of answer interfaces configured in each deployed mobile app of the devices of the predicting group users to receive responses to at least one question answered by the predicting group users during the first feedback session; receiving, from the predicting group users, a first plurality of responses in the plurality of answer interfaces to the at least one question and a prediction, using the processor, wherein each of the first plurality of responses received by the processor comprise the predictions of how the target group members will respond to the at least one question concerning the content item; and providing a session ending visual indication of the first feedback session comprising a graphic displayed on the mobile device of each of the predicting group users that moves beyond the location radius, using the processor and the sensor data from the devices of the predicting group users; otherwise, continuing the first feedback session, comprising: determining a first predictive model comprising a first comparison value calculated from the first plurality of responses, using the processor; determining a first plurality of deviation values in the first predictive model, using the processor; sorting the first plurality of responses according to the first plurality of deviation values; and creating and providing to the inquirer an ordered visual representation of the sorted first plurality of responses displayed in the graphical user interface of the inquirer platform interface, using the processor, whereby the inquirer determines content item effect.

The plurality of characteristics of the predicting group users may further comprise gender, age, and a minimum number or maximum number of the predicting group users.

The plurality of characteristics of the target members may further comprise gender, age, and a minimum number or maximum number of the target group members.

The sensor data from the devices may further comprise data selected from the group consisting of data received from a GPS sensor, data received from at least one satellite orbiting Earth, data received from a wireless network access point, data received from a motor vehicle, data received from an electronic billboard and data received from a wireless communication interface configured in a mobile computing device.

The sensor data from the devices may further comprise data received from a GPS sensor.

The sensor data from the devices may further comprise data received from a GPS signal transmitted by a satellite orbiting Earth.

The sensor data from the devices may further comprise data received from at least one satellite orbiting Earth.

The sensor data from the devices may further comprise data received from a wireless network access point.

The sensor data from the devices may further comprise data received from a motor vehicle.

The sensor data from the devices may further comprise data received from an electronic billboard.

The sensor data from the devices may further comprise data received from a wireless communication interface configured in a mobile computing device.

Each content user interface may comprise a plurality of user operable content display controls comprising at least one of a volume scale, a pause button, a play button, or a full-size button configured to make the content item fit the content user interface graphical display.

Each answer interface of the plurality of answer interfaces may be configured to be inoperable for receiving responses until the predicting group user completes viewing the content item presented in the content user interface, said content item comprising at least one question directed to a plurality of responses representing predicting group users' own responses concerning the content item and a requirement for each of the predicting group users to provide a prediction of how a member of the target group members will respond to the content item if the target group members are presented the content item, using the processor.

The selection and targeting interface may be further configured to ensure that no selected member of the target group members will have been previously presented with the content when predicting group users' predictions are received by the processor.

The graphical user display may be configured to receive a response comprising at least one of: a bubble response selected from a plurality of bubble responses, a check box response selected from a plurality of checkbox responses, one or more sliding scale response, a response selected from a plurality of predetermined responses, or a fill in or type in response.

Each deviation value of the first plurality of deviation values may be respectively a deviation between each response of the first plurality of responses and the first comparison value.

A lower position in the sorted first plurality of responses may correspond to a lower deviation value.

The first plurality of responses may only comprise a plurality of responses directed to predicting group users' own responses concerning the content item, wherein the responses may be received with a plurality of user selected indications that the responses are predicting group user's own responses, using the processor, and wherein the method may further comprise: determining a second predictive model comprising a second comparison value calculated from the plurality of responses directed to the predicting group users' own responses concerning the content item, using the processor; determining a second plurality of deviation values in the second predictive model, wherein each deviation value of the second plurality of deviation values is respectively a deviation between the second comparison value and each response of the plurality of responses directed to the predicting group users' own responses concerning the content item, using the processor; sorting the first plurality of responses according to the respective second plurality of deviation values, wherein a lower position in the sorted first plurality of responses corresponds to a lower deviation value, using the processor; and creating and providing to the inquirer an ordered visual representation of at least a portion of the sorted first plurality of responses selected as a function of the second comparison value, wherein the ordered visual representation is displayed in the graphical user interface of the inquirer platform interface, using the processor, whereby the inquirer determines content item effect.

The first plurality of responses may only comprise a plurality of responses representing predicting group users' predictions of how a member of the target group members will respond to the content item, wherein the responses may be received with a plurality of user selected indications that the responses are predicting group user's predictions of how a member of the target group members will respond, using the processor, and wherein the method further comprises: determining a third predictive model comprising a third comparison value calculated from the plurality of responses representing the predicting group users' predictions of how a member of the target group members will respond to the content item, using the processor; determining a third plurality of deviation values in the third predictive model, wherein each deviation value of the third plurality of deviation values is respectively a deviation between the third comparison value and each response of the plurality of responses representing the predicting group users' predictions of how a member of the target group members will respond to the content item, using the processor; sorting the first plurality of responses according to the respective third plurality of deviation values, wherein a lower position in the sorted first plurality of responses corresponds to a lower deviation value, using the processor; and creating and providing to the inquirer an ordered visual representation of at least a portion of the sorted first plurality of responses selected as a function of the third comparison value, wherein the ordered visual representation is displayed in the graphical user interface of the inquirer platform interface, using the processor, whereby the inquirer determines content item effect.

The method may further comprise: presenting the content item and the at least one question to a plurality of selected members of the target group members during a second feedback session with a requirement for each member of the target group members to provide a response representing their own response concerning the content item, using the processor; receiving, from the plurality of selected members of the target group members during the second feedback session, a second plurality of responses to the at least one question, using the processor, wherein the responses are received with a plurality of member selected indications that the responses are their own responses concerning the content item, using the processor; determining a fourth predictive model comprising a fourth comparison value calculated from the second plurality of responses, using the processor; and creating and providing to the inquirer an ordered visual representation of the second plurality of responses, wherein the ordered visual representation is displayed in the graphical user interface of the inquirer platform interface, using the processor, whereby the inquirer determines content item effect.

The method may further comprise: determining a fourth plurality of deviation values in the fourth predictive model, wherein each deviation value of the fourth plurality of deviation values is respectively a deviation between the fourth comparison value and each response of the plurality of responses representing the users' predictions of how a member of the responding target group members will respond to the content item, using the processor, wherein the predictions were received from users of the predicting group during the first feedback session; sorting the plurality of predictions received from users of the predicting group during the first feedback session according to the respective fourth plurality of deviation values, wherein a lower position in the sorted plurality of predictions corresponds to a lower deviation value, using the processor; and creating and providing to the inquirer an ordered visual representation of at least a portion of the sorted plurality of predictions selected as a function of the fourth comparison value, wherein the ordered visual representation is displayed in the graphical user interface of the inquirer platform interface, whereby the inquirer determines content item effect based on the ordered visual representation comprising the responses to the at least one question during the first feedback session and the second feedback session and the predictions during the first feedback session, using the processor.

The at least a portion of the sorted plurality of predictions may further comprise predictions that have respective deviations not greater than a predetermined percentage deviation from the fourth comparison value, using the processor.

The predetermined percentage deviation may be received from the inquirer.

The predetermined percentage deviation may be in a range of ten to twenty-five percent.

The content item may be selected by the inquirer from a plurality of content items.

The first comparison value may further comprise an average, median, or mode.

Each deviation value may be a difference between the first plurality of responses and the first comparison value.

The first comparison value may be calculated when the first feedback session concludes, using the processor.

The method may further comprise concluding the first feedback session when a predetermined number of responses have been received, using the processor.

The content item may further comprise an advertisement, a poll, a political question, a song, a lyric, a video, an image, a sound, a portion of text, a movie, a book, a title, a product design, or a logo.

The predicting group users may be selected based on a location, gender or age distinct from a respective location, gender or age of the target group members, using the processor.

The method may further comprise receiving an indication via a user interface from at least one responding target group member of the target group members that the respective response received from the at least one responding target group member might deviate substantially from an average response of a majority of the target group members, using the processor, wherein determining the first predictive model further comprises calculating the first comparison value when a predetermined number of responses from the target group members have been received, using the processor, and wherein calculating the first comparison value further comprises removing the respective response received from the at least one responding target group member from the plurality of responses from the target group members before calculating the first comparison value.

An exemplary apparatus may comprise: a processor; an inquirer platform interface operably coupled with the processor; and a memory that is not a transitory propagating signal, the memory is operably coupled with the processor, the memory comprising processor executable program instructions accessible to the processor, the processor executable program instructions are configured to cause the apparatus to perform operations when the processor executable program instructions are executed by the processor, the operations performed by the apparatus comprising: receive a content item from an inquirer; deploy a mobile app configured to present and review the content item in at least one feedback session to a plurality of devices associated with a plurality of users; place the content item on an advertising web platform operably coupled with the inquirer platform interface, said inquirer platform interface comprising a selection and targeting interface configured to permit the inquirer to select from the plurality of users, a predicting group comprising predicting group users identified by a plurality of characteristics comprising a predicting group location and a location radius; said selection and targeting interface further configured to permit the inquirer to select, from the plurality of users, a target group comprising target group members identified by a plurality of characteristics comprising at least one characteristic distinct from the predicting group plurality of characteristics and wherein no member of the target group members is a user of the predicting group users; receive user location information for the predicting group users and the target group members based on sensor data from the devices of the predicting group users and the target group members; initiate a first feedback session comprising: provide an initial visual indication comprising a graphic displayed on the mobile device of each user of the predicting group users within the location radius based on the sensor data from the devices of the predicting group users, said visual indication configured to notify the predicting group users they can submit predictions; present the content item and at least one of the plurality of characteristics of the target group in the first feedback session to the predicting group users, using a plurality of content user interfaces comprising a plurality of graphical user displays in a plurality of answer interfaces configured in each deployed mobile app of the devices of the predicting group users to receive responses to at least one question answered by the predicting group users during the first feedback session; receive, from the predicting group users, a first plurality of responses in the plurality of answer interfaces to the at least one question and a prediction, wherein each of the first plurality of responses received by the processor comprise the predictions of how the target group members will respond to the at least one question concerning the content item; and determine whether the mobile device of any of the predicting group users moves beyond the location radius, based on the sensor data from the devices of the predicting group users; upon determining any of the predicting group users moved beyond the location radius, provide a session ending visual indication of the first feedback session comprising a graphic displayed on the mobile device of each predicting group user that moved beyond the location radius and ending the first feedback session for the predicting group users that moved beyond the location radius, wherein the predicting group users for which the first feedback session was ended are not permitted to submit responses any longer; upon determining any of the predicting group users did not move beyond the location radius, continuing the first feedback session for the predicting group users that did not move beyond the location radius, comprising: determine a first predictive model comprising a first comparison value calculated from the first plurality of responses; determine a first plurality of deviation values in the first predictive model; sort the first plurality of responses according to the first plurality of deviation values; and create and provide to the inquirer an ordered visual representation of the sorted first plurality of responses displayed in a graphical user interface of the inquirer platform interface, whereby the inquirer determines content item effect.

An exemplary apparatus may comprise: a processor; an inquirer platform interface operably coupled with the processor; and a memory that is not a transitory propagating signal, the memory is operably coupled with the processor, the memory comprising processor executable program instructions accessible to the processor, the processor executable program instructions are configured to cause the apparatus to perform operations when the processor executable program instructions are executed by the processor, the operations performed by the apparatus comprising: receive a content item from an inquirer; deploy a mobile app to a plurality of devices associated with a plurality of users; placing the content item on an advertising web platform operably coupled with the inquirer platform interface, said inquirer platform interface comprising a selection and targeting interface configured to permit the inquirer to select from the plurality of users a predicting group comprising predicting group users, a predicting group location, gender, and age, a minimum number or maximum number of the predicting group users and a predetermined radius for a selected location corresponding to the predicting group users; said selection and targeting interface further configured to permit the inquirer to select, from the plurality of users, target group members of a responding target group, a target group location, gender, and age, a minimum number or maximum number of the target group members and a predetermined radius for a selected location corresponding to the target group members, wherein at least one member of the target group members has a location, gender, or age distinct from the predicting group location, gender and age and no user of the predicting group users is a member of the target group members; receive user location information for the predicting group users and the target group members based on sensor data comprising location data from the devices of the predicting group user and the target group members; initiate a first feedback session to the predicting group users within the predetermined radius based on the sensor data from the devices of the predicting group users, so that the predicting group users can submit predictions, present the content item in the first feedback session to the predicting group users, using a plurality of content user interfaces, a plurality of answer interfaces operable in a plurality of displays configured in the deployed mobile app of the devices of the predicting group users, wherein each content user interface comprises a plurality of user operable content display controls comprising: a volume scale, pause button, play button, and full size button configured to make the content item fit the content interface display, wherein each answer interface of the plurality of answer interfaces is inoperable until a predicting group user of the predicting group users completes viewing the content item presented in the content user interface, said content item comprising at least one question directed to the predicting group users own responses concerning the content item and a requirement for each of the predicting group users to provide a prediction of how a member of the target group members will respond to the content item if the target group members are presented the content item in the future, wherein the selection and targeting interface is further configured to ensure that no selected member of the target group members will have been previously presented with the content when the predicting group users' predictions are received by the processor, present, to the predicting group users via the content user interface, the target group location, gender and age; receive, from the predicting group users, a first plurality of responses in the plurality of answer interfaces to the at least one question and prediction, wherein each of the first plurality of responses received by the processor comprise a user selected indication, from a user of predicting group users, a prediction of how a member of the target group members will respond in the future to the at least one question concerning the content item, and wherein each answer interface of the plurality of answer interfaces is configured to receive a response comprising at least one of: a bubble response selected from a plurality of bubble responses, a check box response selected from a plurality of checkbox responses, one or more sliding scale response, a response selected from a plurality of predetermined responses, or a fill in or type in response; conclude the first feedback session so that individual users of the predicting group users can no longer submit predictions if the individual users of the predicting group users moves beyond the predetermined radius, determined by the processor using the sensor data from the devices of the predicting group users, otherwise, continuing the first feedback session, comprising: determine a first predictive model comprising a first comparison value calculated from the first plurality of responses; determine a first plurality of deviation values in the first predictive model, wherein each deviation value of the first plurality of deviation values is respectively a deviation between each response of the first plurality of responses and the first comparison value; sort and store in a database operably coupled with an analysis server operably coupled to the inquirer platform interface, the first plurality of responses according to the respective first plurality of deviation values, wherein a lower position in the sorted first plurality of responses corresponds to a lower deviation value; and use the inquirer platform interface to provide the inquirer the stored data for the inquirer to measure content item effect.

Conclusion

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated. The scope of the invention is therefore defined by the following claims.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method comprising:
receiving a content item from an inquirer, using a processor;
deploying a mobile app configured to present and review the content item in at least one feedback session to a plurality of devices associated with a plurality of users;
placing the content item on an advertising web platform comprising an inquirer platform interface, using the processor, said inquirer platform interface comprising a selection and targeting interface configured to permit the inquirer to select from the plurality of users, a predicting group comprising predicting group users identified by a plurality of characteristics comprising a predicting group location and a location radius;
said selection and targeting interface further configured to permit the inquirer to select, from the plurality of users, a target group comprising target group members identified by a plurality of characteristics comprising at least one characteristic distinct from the predicting group plurality of characteristics and wherein no member of the target group members is a user of the predicting group users, and said selection and targeting interface further configured to visually display on a graphical user interface results display a plurality of responder icons individually representing individual predicting group users;

receiving user location information for the predicting group users and the target group members based on sensor data from the devices of the predicting group users and the target group members, using the processor;

displaying on the results display an initial arrangement of the responder icons representing predicting group users located within the location radius determined as a function of the sensor data from the devices of the predicting group users, wherein the initial arrangement is determined as a function of historical prediction accuracy of predicting group users, using the processor; and initiating a first feedback session comprising:
providing an initial visual indication comprising a graphic displayed on the mobile device of each user of the predicting group users within the location radius based on the sensor data from the devices of the predicting group users, said visual indication configured to notify the predicting group users they can submit predictions, using the processor;
presenting the content item and at least one of the plurality of characteristics of the target group in the first feedback session to the predicting group users, using a plurality of content user interfaces comprising a plurality of graphical user displays in a plurality of answer interfaces configured in each deployed mobile app of the devices of the predicting group users to receive responses to at least one question answered by the predicting group users during the first feedback session, using the processor;
receiving, from the predicting group users, a first plurality of responses in the plurality of answer interfaces to the at least one question and a prediction, using the processor, wherein each of the first plurality of responses received by the processor comprise the predictions of how the target group members will respond to the at least one question concerning the content item; and
providing a session ending visual indication of the first feedback session comprising a graphic displayed on the mobile device of each of the predicting group users that moves beyond the location radius, using the processor and the sensor data from the devices of the predicting group users; otherwise, continuing the first feedback session, comprising:
determining a first predictive model comprising a first comparison value calculated from the first plurality of responses, using the processor;
determining a first plurality of deviation values in the first predictive model, using the processor;
sorting the first plurality of responses according to the first plurality of deviation values, using the processor; and
creating and providing to the inquirer an ordered visual representation of the sorted first plurality of responses and an updated arrangement of the responder icons, wherein the responder icons are rearranged as a function of prediction accuracy measured in the first feedback session based on the first plurality of responses for the predicting group users located within the location radius determined as a function of the sensor data from the mobile devices, and wherein the sorted first plurality of responses and updated arrangement of the responder icons are displayed in the graphical user interface results display of the inquirer platform interface, using the processor, whereby the inquirer determines content item effect.

2. The method of claim 1, wherein the plurality of characteristics of the predicting group users further comprises gender, age, and a minimum number or maximum number of the predicting group users.

3. The method of claim 1, wherein the plurality of characteristics of the target members further comprises gender, age, and a minimum number or maximum number of the target group members.

4. The method of claim 1, wherein the sensor data from the devices further comprises data selected from the group consisting of data received from a GPS sensor, data received from at least one satellite orbiting Earth, data received from a wireless network access point, data received from a motor vehicle, data received from an electronic billboard and data received from a wireless communication interface configured in a mobile computing device.

5. The method of claim 1, wherein each content user interface comprises a plurality of user operable content display controls comprising at least one of a volume scale, a pause button, a play button, or a full-size button configured to make the content item fit the content user interface graphical display.

6. The method of claim 1, wherein each answer interface of the plurality of answer interfaces is inoperable until the predicting group user completes viewing the content item presented in the content user interface, said content item comprising at least one question directed to a plurality of responses representing predicting group users' own responses concerning the content item and a requirement for each of the predicting group users to provide a prediction of how a member of the target group members will respond to the content item if the target group members are presented the content item, using the processor.

7. The method of claim 1, wherein the selection and targeting interface is further configured to ensure that no selected member of the target group members will have been previously presented with the content when predicting group users' predictions are received by the processor.

8. The method of claim 1, wherein the graphical user display is configured to receive a response comprising at least one of: a bubble response selected from a plurality of bubble responses, a check box response selected from a plurality of checkbox responses, one or more sliding scale response, a response selected from a plurality of predetermined responses, or a fill in or type in response.

9. The method of claim 1, wherein each deviation value of the first plurality of deviation values is respectively a deviation between each response of the first plurality of responses and the first comparison value.

10. The method of claim 1 wherein a lower position in the sorted first plurality of responses corresponds to a lower deviation value.

11. The method of claim 1, wherein the first plurality of responses only comprises a plurality of responses directed to predicting group users' own responses concerning the content item, wherein the responses are received with a plurality of user selected indications that the responses are predicting group user's own responses, using the processor, and wherein the method further comprises:

- determining a second predictive model comprising a second comparison value calculated from the plurality of responses directed to the predicting group users' own responses concerning the content item, using the processor;
- determining a second plurality of deviation values in the second predictive model, wherein each deviation value of the second plurality of deviation values is respectively a deviation between the second comparison value and each response of the plurality of responses directed to the predicting group users' own responses concerning the content item, using the processor;
- sorting the first plurality of responses according to the respective second plurality of deviation values, wherein a lower position in the sorted first plurality of responses corresponds to a lower deviation value, using the processor; and
- creating and providing to the inquirer an ordered visual representation of at least a portion of the sorted first plurality of responses selected as a function of the second comparison value, wherein the ordered visual representation is displayed in the graphical user interface of the inquirer platform interface, using the processor, whereby the inquirer determines content item effect.

12. The method of claim 1, wherein the first plurality of responses only comprises a plurality of responses representing predicting group users' predictions of how a member of the target group members will respond to the content item, wherein the responses are received with a plurality of user selected indications that the responses are predicting group user's predictions of how a member of the target group members will respond, using the processor, and wherein the method further comprises:

- determining a third predictive model comprising a third comparison value calculated from the plurality of responses representing the predicting group users' predictions of how a member of the target group members will respond to the content item, using the processor;
- determining a third plurality of deviation values in the third predictive model, wherein each deviation value of the third plurality of deviation values is respectively a deviation between the third comparison value and each response of the plurality of responses representing the predicting group users' predictions of how a member of the target group members will respond to the content item, using the processor;
- sorting the first plurality of responses according to the respective third plurality of deviation values, wherein a lower position in the sorted first plurality of responses corresponds to a lower deviation value, using the processor; and
- creating and providing to the inquirer an ordered visual representation of at least a portion of the sorted first plurality of responses selected as a function of the third comparison value, wherein the ordered visual representation is displayed in the graphical user interface of the inquirer platform interface, using the processor, whereby the inquirer determines content item effect.

13. The method of claim 11, wherein the method further comprises:

- presenting the content item and the at least one question to a plurality of selected members of the target group members during a second feedback session with a requirement for each member of the target group members to provide a response representing their own response concerning the content item, using the processor;
- receiving, from the plurality of selected members of the target group members during the second feedback session, a second plurality of responses to the at least one question, using the processor, wherein the responses are received with a plurality of member selected indications that the responses are their own responses concerning the content item, using the processor;
- determining a fourth predictive model comprising a fourth comparison value calculated from the second plurality of responses, using the processor; and
- creating and providing to the inquirer an ordered visual representation of the second plurality of responses, wherein the ordered visual representation is displayed in the graphical user interface of the inquirer platform interface, using the processor, whereby the inquirer determines content item effect.

14. The method of claim 13, wherein the method further comprises:

- determining a fourth plurality of deviation values in the fourth predictive model, wherein each deviation value of the fourth plurality of deviation values is respectively a deviation between the fourth comparison value and each response of the plurality of responses representing the users' predictions of how a member of the responding target group members will respond to the content item, using the processor, wherein the predictions were received from users of the predicting group during the first feedback session;
- sorting the plurality of predictions received from users of the predicting group during the first feedback session according to the respective fourth plurality of deviation values, wherein a lower position in the sorted plurality of predictions corresponds to a lower deviation value, using the processor; and
- creating and providing to the inquirer an ordered visual representation of at least a portion of the sorted plurality of predictions selected as a function of the fourth comparison value, wherein the ordered visual representation is displayed in the graphical user interface of the inquirer platform interface, whereby the inquirer determines content item effect based on the ordered visual representation comprising the responses to the at least one question during the first feedback session and the second feedback session and the predictions during the first feedback session, using the processor.

15. The method of claim 14, wherein the at least a portion of the sorted plurality of predictions further comprises predictions that have respective deviations not greater than a predetermined percentage deviation from the fourth comparison value, using the processor.

16. The method of claim 15, wherein the predetermined percentage deviation is received from the inquirer.

17. The method of claim 15, wherein the predetermined percentage deviation is in a range of ten to twenty-five percent.

18. The method of claim 1, wherein the content item is selected by the inquirer from a plurality of content items.

19. The method of claim 1, wherein the first comparison value further comprises an average, median, or mode.

20. The method of claim 1, wherein each deviation value is a difference between the first plurality of responses and the first comparison value.

21. The method of claim 1, wherein the first comparison value is calculated when the first feedback session concludes, using the processor.

22. The method of claim 1, wherein the method further comprises concluding the first feedback session when a predetermined number of responses have been received, using the processor.

23. The method of claim 1, wherein the content item further comprises an advertisement, a poll, a political question, a song, a lyric, a video, an image, a sound, a portion of text, a movie, a book, a title, a product design, or a logo.

24. The method of claim 1, wherein the predicting group users are selected based on a location, gender or age distinct from a respective location, gender or age of the target group members, using the processor.

25. The method of claim 1, wherein the method further comprises receiving an indication via a user interface from at least one responding target group member of the target group members that the respective response received from the at least one responding target group member might deviate substantially from an average response of a majority of the target group members, using the processor, wherein determining the first predictive model further comprises calculating the first comparison value when a predetermined number of responses from the target group members have been received, using the processor, and wherein calculating the first comparison value further comprises removing the respective response received from the at least one responding target group member from the plurality of responses from the target group members before calculating the first comparison value.

* * * * *